United States Patent
Gardner et al.

(10) Patent No.: US 12,420,522 B2
(45) Date of Patent: Sep. 23, 2025

(54) MULTILAYERED SUPPORTED ELASTOMERIC FOAMS AND PROCESSES FOR MAKING SAME

(71) Applicant: W. L. Gore & Associates, Inc., Newark, DE (US)

(72) Inventors: John C. Gardner, Wilmington, DE (US); Steven Speck, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 70 days.

(21) Appl. No.: 18/039,016

(22) PCT Filed: Nov. 30, 2021

(86) PCT No.: PCT/IB2021/061136
§ 371 (c)(1),
(2) Date: May 26, 2023

(87) PCT Pub. No.: WO2022/118196
PCT Pub. Date: Jun. 9, 2022

(65) Prior Publication Data
US 2024/0208178 A1 Jun. 27, 2024

Related U.S. Application Data

(60) Provisional application No. 63/119,942, filed on Dec. 1, 2020.

(51) Int. Cl.
*B32B 5/32* (2006.01)
*B32B 7/12* (2006.01)
(Continued)

(52) U.S. Cl.
CPC .................. *B32B 5/32* (2013.01); *B32B 7/12* (2013.01); *B32B 27/065* (2013.01);
(Continued)

(58) Field of Classification Search
CPC ....... B32B 15/04; B32B 15/046; B32B 15/14; B32B 2250/02; B32B 2250/03;
(Continued)

(56) References Cited

U.S. PATENT DOCUMENTS

| | | | |
|---|---|---|---|
| 2004/0157035 A1* | 8/2004 | Guizzetti | B32B 27/322 |
| | | | 428/66.6 |
| 2013/0071644 A1 | 3/2013 | Wilson et al. | |

(Continued)

FOREIGN PATENT DOCUMENTS

| | | |
|---|---|---|
| EP | 2960056 A1 | 12/2015 |
| EP | 2593298 B1 | 2/2020 |

(Continued)

OTHER PUBLICATIONS

International Preliminary Report on Patentability received for PCT Patent Application No. PCT/IB2021/061136, mailed on Jun. 15, 2023, 11 pages.

(Continued)

*Primary Examiner* — Hai Vo
(74) *Attorney, Agent, or Firm* — Faegre Drinker Biddle & Reath LLP

(57) ABSTRACT

A multilayered supported elastomeric foam is disclosed, the multilayered supported elastomeric foam comprising at least two foamed regions, each said foamed regions comprising a plurality of gas filled cells defined by elastomer; and at least one reinforcement region, said at least one reinforcement region comprising a porous layer having an interconnected network of pores at least partially imbibed with the elastomer; and wherein said at least two foamed regions are separated by one or more of said at least one reinforcement region.

16 Claims, 25 Drawing Sheets

(51) Int. Cl.
  *B32B 27/06* (2006.01)
  *B32B 27/32* (2006.01)
(52) U.S. Cl.
  CPC ....... *B32B 27/322* (2013.01); *B32B 2305/022* (2013.01); *B32B 2305/026* (2013.01); *B32B 2305/073* (2013.01); *B32B 2305/08* (2013.01); *B32B 2307/7376* (2023.05)
(58) Field of Classification Search
  CPC ............ B32B 2250/04; B32B 2250/05; B32B 2250/22; B32B 2250/40; B32B 2260/021; B32B 2260/023; B32B 2260/046; B32B 2262/0276; B32B 2262/101; B32B 2266/0207; B32B 2266/0235; B32B 2266/06; B32B 2266/08; B32B 2266/14; B32B 2305/022; B32B 2305/026; B32B 2305/073; B32B 2305/08; B32B 2307/51; B32B 2307/518; B32B 2307/546; B32B 2307/714; B32B 2307/72; B32B 2307/7376; B32B 2581/00; B32B 27/065; B32B 27/12; B32B 27/32; B32B 27/322; B32B 3/06; B32B 3/08; B32B 3/263; B32B 3/266; B32B 5/022; B32B 5/024; B32B 5/20; B32B 5/22; B32B 5/245; B32B 5/26; B32B 5/32; B32B 7/02; B32B 7/12; F16J 15/022
  See application file for complete search history.

(56) References Cited

U.S. PATENT DOCUMENTS

| | | |
|---|---|---|
| 2013/0273341 A1 | 10/2013 | Albertelli et al. |
| 2015/0376840 A1 | 12/2015 | Shih |
| 2016/0131259 A1 | 5/2016 | Boyd et al. |
| 2020/0190278 A1* | 6/2020 | Gardner .................. B32B 5/18 |

FOREIGN PATENT DOCUMENTS

| | | |
|---|---|---|
| WO | 2018/169851 A1 | 9/2018 |
| WO | 2018/231267 A1 | 12/2018 |
| WO | 2020/106745 A1 | 5/2020 |

OTHER PUBLICATIONS

International Search Report and Written Opinion received for PCT Patent Application No. PCT/IB2021/061136, mailed on Feb. 24, 2022, 14 pages.

* cited by examiner

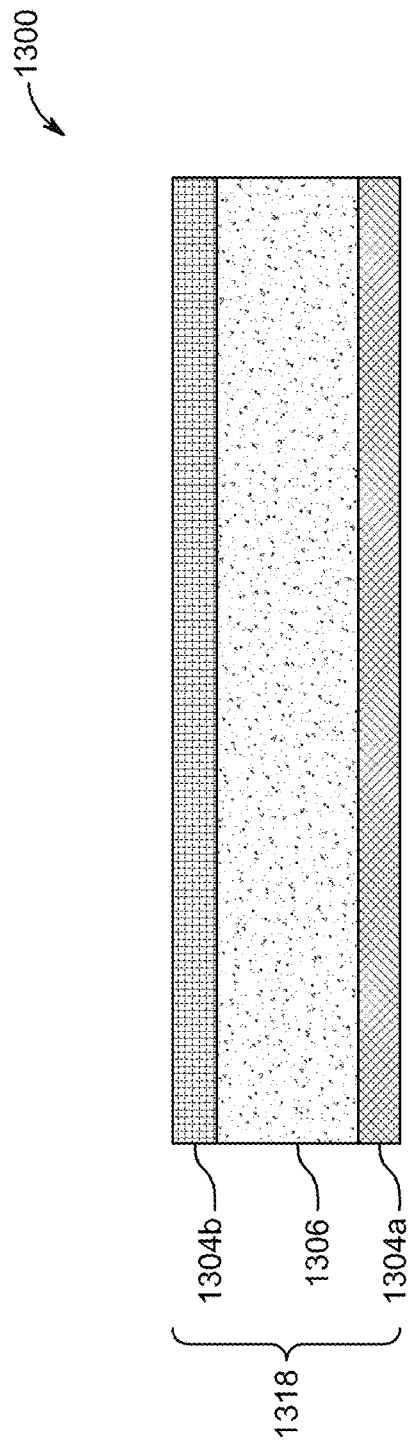
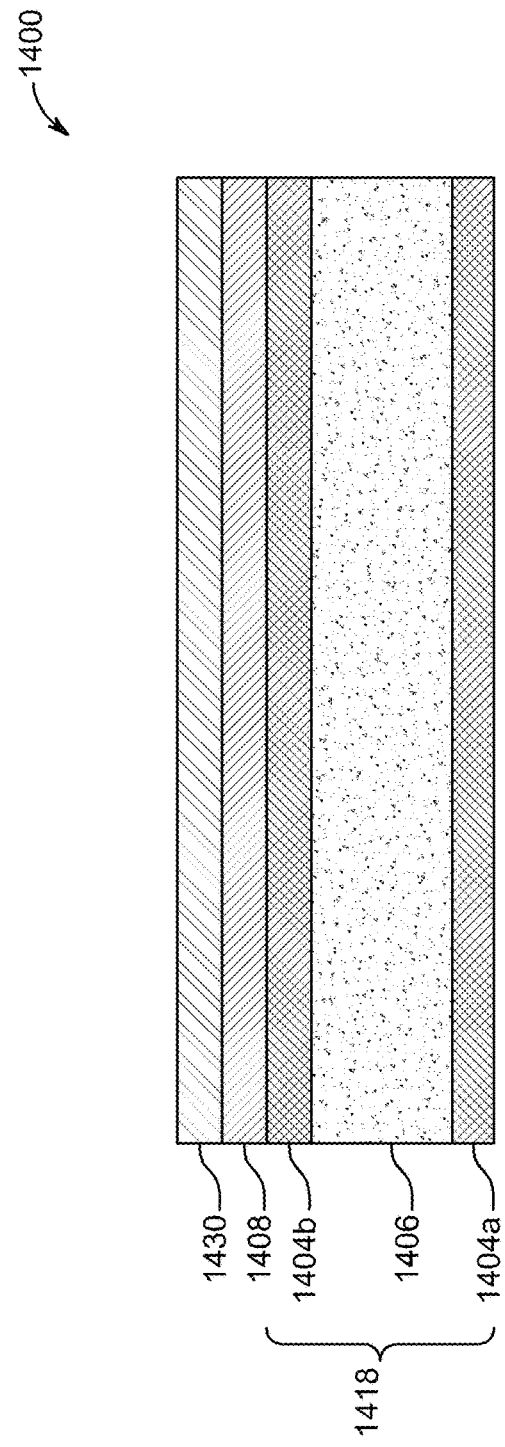

MULTILAYERED SUPPORTED ELASTOMERIC FOAMS AND PROCESSES FOR MAKING SAME

CROSS-REFERENCE TO RELATED APPLICATION

This application is a national phase application of PCT Application No. PCT/IB2021/061136, internationally filed on Nov. 30, 2021, which claims the benefit of U.S. Provisional No. 63/119,942, filed Dec. 1, 2020, which are herein incorporated by reference in their entireties for all purposes.

TECHNICAL FIELD

The present disclosure generally relates to multilayered supported elastomeric foams. More specifically, the disclosure relates to a multilayered supported elastomeric foam for sealing connections.

BACKGROUND

Many industries employ sealants to prevent liquid intrusion between physical elements in products or structures. Common sealants include paints, caulks, polymeric materials, O-rings and gaskets or the like, and vary according to the specific application. The airline industry, in particular, employs sealants for protecting various interfaces in order to prevent corrosion and surface degradation, e.g., due to water or chemical intrusion.

One of the materials often employed by the aircraft industry is a 2 part liquid polysulfide material, used to increase the protection of various interfaces from corrosion and surface degradation. This practice can be used to protect installed brackets along the airframe, among other assemblies. For example, a material (such as aluminum, fiber reinforced plastic, or carbon composite) can be attached to a section of the aircraft frame using bolts or rivets. An installer can apply liquid sealant between the connected parts, and then affix the bracket to the frame using fasteners. As the fasteners are tightened, the pressure from the fastener heads spreads the sealant. The sealant typically must be allowed to cure at room temperature for long periods of time, e.g., 72 hours or more, depending on the sealant grade. This process is time consuming, requires careful mixing and application techniques, and typically requires personal protective equipment (PPE) and ventilation due to the volatile organic compounds (VOCs) that are emitted.

Traditional designs that make use of "dry sealing" materials, such as O-rings, gaskets, or other pliable structures, require precise placement and pressure to be effective, and can suffer from degradation over time due to chemical attack. Dry sealing materials that can resist chemical attack often have deficiencies with cold operating temperatures and level of conformability. Liquid sealants, which can conform more easily to specific interface geometries, suffer from deficiencies of challenging installation procedures, and cannot readily be removed once adjusted without breaking the seal. Further, polysulfide liquid sealants alone often cannot be effective after prolonged exposure to certain harsh chemistries like phosphate ester hydraulic fluid. Accordingly, the need exists for sealing technologies that can operate in a variety of interface profiles without sacrificing durability or resistance to chemical attack.

WO 2018/231267 discloses a supported elastomeric foam including an elastomeric matrix formed of an elastomer and a reinforcement region and a foamed region. The foamed region includes gas filled cells in the elastomer and the reinforcement region includes a porous layer having an interconnected network of pores at least partially imbibed with the elastomer. A compressible seal including a compressible body which may be formed of the supported elastomeric foam and a pattern of discontinuous regions is also disclosed. As the thickness of such a seal in increased, the increased strength to the overall structure provided by the reinforcement region is reduced. Accordingly, the need exists for sealing technologies which can operate in a variety of thickness profiles whilst retaining the strength of the compressible seal.

SUMMARY

In one aspect, the present disclosure relates to a multilayered supported elastomeric foam, comprising:
- at least two foamed regions, each said foamed regions comprising a plurality of gas filled cells defined by elastomer; and
- at least one reinforcement region, said at least one reinforcement region comprising a porous layer having an interconnected network of pores at least partially imbibed with the elastomer; and
- wherein said at least two foamed regions are separated by one or more of said at least one reinforcement region.

The provision of multiple foamed regions allows the thickness of the multilayered supported elastomeric foam to be increased to meet the size requirements of a mechanical interface to be filled by the multilayered supported elastomeric foam. In addition, the presence of at least one reinforcement region provides increased mechanical strength to the multilayered supported elastomeric foam.

In one embodiment of the foam, the at least two foamed regions comprise a first foamed region comprising a plurality of gas filled cells defined by elastomer and a second foamed region comprising a plurality of gas filled cells defined by elastomer, the at least one reinforcement region comprising a first reinforcement region comprising a first porous layer having an interconnected network of pores at least partially imbibed with the elastomer, and a second reinforcement region comprising a second porous layer having a second interconnected network of pores at least partially imbibed with the elastomer, wherein the first reinforcement region is positioned at a first side of the first foamed region, and the second reinforcement region is positioned at a second side of the first foamed region opposite to the first side of the first foamed region and between the first and second foamed regions. In a further embodiment of the foam, the first and second porous layers may be the same, for instance made from the same material or may be different, for instance made from different materials. The elastomer of the first foamed region may be a first elastomer and the elastomer of the second foamed region may be a second elastomer. The first and second elastomers may be the same or different. As used herein, the term "same" when referring to an element of the supported elastomeric foam which may be present more than once, such as a porous layer, elastomer, foam etc. may have the same chemical composition and properties as another occurrence of this element. The term "different" when referring to an element of the supported elastomeric foam which may be present more than once may have a different chemical composition and/or different properties such as density, pore or cell size etc. When the first and second elastomers are different, and there is only a single reinforcement region between the first and second foamed regions, the second porous layer may be at least partially imbibed with both the first and second elastomers on opposite sides abutting the respective first and second foamed regions. Placing a reinforcement region on each side of the first foamed region increases the mechanical strength of the multilayered supported elastomeric foam.

In another embodiment of the foam, the regions of the interconnected networks of pores in the porous layers which are imbibed with elastomer in the reinforcement regions are generally free from voids. This can be achieved by excluding the foaming agent from the reinforcement regions, such as the porous layers, for instance by providing the foaming agent in the form of particles which are larger than the pore size of the porous layers.

In another embodiment of the foam, each of the porous layers may be fully imbibed with the elastomer. Fully imbibing the interconnected networks of pores in the porous layers with elastomer reduces the fluid permeability of the porous layer and corresponding reinforcement region, improving its resistance to the passage of fluids, such as liquids.

In another embodiment of the foam, each of the at least two foamed regions comprise a plurality of closed gas filled cells defined by an elastomer. By providing foamed regions with closed gas filled cells, the fluid permeabilities of the foamed regions are reduced, improving the resistance of the foamed regions to the passage of fluids, such as liquids.

In another embodiment, the foam may comprise at least two reinforcement regions, in which two adjacent foamed regions are separated by two reinforcement regions of the at least two reinforcement regions. In a further embodiment, such a foam may further comprise an adhesive region between said two reinforcement regions which separate the two adjacent foamed regions. For instance, the adhesive region may be a layer of adhesive. The layer of adhesive may separate the two adjacent foamed regions. In a further embodiment, such a foam may further comprise one or more stiffening regions, wherein the one or more stiffening regions are between at least a portion of the two reinforcement regions of the at least two reinforcement regions. In a further embodiment, the stiffening region may be a stiffening layer, wherein the two reinforcement regions of the at least two reinforcement regions are separated by the stiffening layer. In a further embodiment, the foam may further comprise at least two regions of adhesive, such as layers of adhesive, with one of the at least two regions of adhesive lying between one of the two reinforcement regions and the stiffening region or stiffening layer and the other of the at least two regions of adhesive lying between the other of the two reinforcement regions and the stiffening region or stiffening layer. In this way, the stiffening region or layer is bonded to each of the two reinforcement regions by a layer of adhesive.

In another embodiment, two adjacent foamed regions may be separated by one reinforcement region. In this way, a multilayer supported elastomeric foam of alternating foamed regions and reinforcement regions having interconnected networks of pores at least partially imbibed with the elastomer of abutting foamed regions are provided. In a further embodiment, the two adjacent foamed regions and the one reinforcement region may form a laminate. In a further embodiment, all foamed regions and reinforcement regions present in the foam may form a laminate. Such laminate structures are advantageous because they provide a contiguous elastomeric matrix, which does not require the presence of adhesive regions to join individual regions.

In another embodiment, the foam may comprise two outer reinforcement regions, wherein each of the two outer reinforcement regions comprises a porous layer having an interconnected network of pores at least partially imbibed with the elastomer, and the two outer reinforcement regions may be located on opposite first and second sides of the multilayered supported elastomeric foam. In a further embodiment, the foam may further comprise at least one surface region, such as a surface layer, positioned on one or more of the two outer reinforcement regions. In a further embodiment, the foam may comprise two surface regions, such as two surface layers, with a surface region positioned on each of the two outer reinforcement regions. In a further embodiment, the two surface regions, such as surface layers are the same, for instance made of the same material or alternatively they may be different, for instance made of different materials. In a further embodiment, the foam may further comprise a region of adhesive, such as a layer of adhesive, between the surface layer and outer reinforcement region.

In another embodiment, the foam may comprise two outer foamed regions, wherein each of the two outer foamed regions comprise a plurality of gas filled cells defined by an elastomer, and said two outer foamed regions may be located on opposite first and second sides of the multilayered supported elastomeric foam. In a further embodiment, the foam may further comprise at least one surface region, such as a surface layer, located on and in direct contact with at least one of the two outer foamed regions. In a further embodiment, the foam may comprise two surface regions, such as two surface layers, with a surface region located on and in direct contact with each of the two outer foamed regions. In a further embodiment, the two surface regions, such as two surface layers, may be the same, for instance made of the same material or alternatively the two surface regions may be different, for instance made of different materials.

In another embodiment, the foam may comprise at least three foamed regions or at least four foamed regions, or at least five foamed regions, or at least six foamed regions, in which each pair of adjacent foamed regions are separated by at least one reinforcement region.

In another embodiment of the foam, each of the at least one reinforcement regions separating each pair of adjacent foamed regions may be the same, for instance made from the same material.

In another embodiment of the foam, at least one of said at least one reinforcement region has stiffening characteristics.

In another embodiment, the foam may further comprise one of more holes extending through at least one of the regions of the multilayered supported elastomeric foam, such as the at least two foamed regions, the at least one reinforcement region and/or any other regions described herein.

In another embodiment, the foam may further comprise one or more stiffening regions.

In another embodiment, the foam may comprise at least two reinforcement regions and the one or more stiffening regions are located between two reinforcement regions. Preferably, the one or more stiffening regions are between two inner reinforcement regions.

In another embodiment of the foam, the one or more stiffening regions may comprise one or more cavities, for instance a stiffening region may have one or more holes. Additionally or alternatively, when there are at least two stiffening regions, the stiffening regions may be separated by one or more cavities.

In another embodiment of the foam, the one or more cavities may be independently filled with an elastomeric matrix comprising two reinforcement regions separated by a foamed region as described herein or with an electronic component.

In another embodiment, the one or more cavities may be unfilled, such that reinforcement regions and/or foamed regions adjacent to the one or more cavities may conform to fill any unfilled cavities. For instance, reinforcement and/or foamed regions which do not lie in the plane of the one or more stiffening regions and one or more cavities, but are in parallel planes above and below the one or more stiffening regions and one or more cavities may conform to fill the unfilled cavities, for instance by deforming out of plane.

In another embodiment of the foam, the reinforcement region may be substantially free of gas filled cells. This can be achieved by excluding the foaming agent from the reinforcement regions, such as the porous layers, for instance by providing the foaming agent in the form of particles which are larger than the pore size of the porous layers.

In another embodiment of the foam, the plurality of gas filled cells defined by the elastomer which form each of the foamed regions are closed gas filled cells.

In another embodiment of the foam, the elastomer may be a first elastomer and the foam may further comprise a second elastomer, wherein the first and second elastomers are mixed to form one or more of the at least two foamed regions.

In another embodiment of the foam, the porous layer may comprise one of a woven material, such as a polyether ether ketone (PEEK) fiber woven, a fiberglass woven or an expanded polytetrafluoroethylene (ePTFE) fiber woven, a non-woven material, such as non-woven fiberglass, or a porous film, such as a porous polymer membrane or a porous polymer film like an expanded fluoropolymer film, particularly an expanded polytetrafluoroethylene (ePTFE) film.

In another embodiment of the foam, the porous layer may comprise ePTFE.

In another embodiment of the foam, the porous layer, such as a layer comprising ePTFE, may have a thickness of from about 1 to 100 μm, preferably from 8 to 35 μm.

In another embodiment of the foam, the elastomer may comprise a silicone, such as a fluorosilicone, or a fluoroelastomer, such as a perfluoropolyether.

In another embodiment of the foam, the foamed region may be formed from one of: a foamed mixture comprising the elastomer and a foaming agent, a chemical foaming agent added to the elastomer, or a foamed mixture comprising the elastomer and a heat activated dry foaming agent optionally comprising heat activated expanding polymer spheres.

In another aspect, the present disclosure relates to a supported elastomeric foam, comprising:
an elastomeric matrix comprising an elastomer, and comprising:
a foamed region comprising a plurality of gas filled cells defined by the elastomer; and
a first reinforcement region comprising a first porous layer having a first interconnected network of pores at least partially imbibed with the elastomer,
a second reinforcement region comprising a second porous layer having a second interconnected network of pores at least partially imbibed with the elastomer,
wherein the first reinforcement region is positioned at a first side of the foamed region, and
the second reinforcement region is positioned at a second side of the foamed region opposite the first side and the first and second porous layers are different.

For instance, the first and second porous layers may be made from different materials, or they may be made from the same materials with different properties, such as density, pore size etc.

In another embodiment of the foam, the interconnected network of pores of one or both of the first and second porous layers may be fully imbibed with the elastomer.

In another aspect, the present disclosure relates to a supported elastomeric foam, comprising:
an elastomeric matrix comprising an elastomer, and comprising:
a foamed region comprising a plurality of gas filled cells defined by the elastomer, the foamed region having first and second sides positioned opposite one another; and
a reinforcement region comprising a porous layer having an interconnected network of pores at least partially imbibed with the elastomer on the first side of the foamed region; and
a surface region, such as a surface layer, oriented on the second side of the foamed region.

In another embodiment of the foam, the surface region, such as a surface layer, may be in contact with the second side of the foamed region. In an alternative embodiment, an adhesive, such as an adhesive layer, may be present between the second side of the foamed region and the surface layer. In another embodiment of the foam, the surface region, such as a surface layer, may be a non-porous layer. The non-porous layer may be selected from dense polymer, such as a densified fluoropolymer such as densified ePTFE (expanded polytetrafluoroethylene), dense polyolefins such as BOPP (bi-axially oriented polypropylene) and metal foil.

In another embodiment of the foam, the reinforcement region comprising the porous layer may be a first reinforcement region comprising a first porous layer and the surface region such as a surface layer may be a first surface region, such as a first surface layer, and the foam may further comprise a second reinforcement region comprising a second porous layer having an interconnected network of pores at least partially imbibed with the elastomer on the second side of the foamed region, the second reinforcement region and second porous layer being located between the second side of the foamed region and the first surface layer. In a further embodiment, the foam may further comprise an adhesive region, such as an adhesive layer, between the second porous layer and the first surface region, such as a first surface layer.

In another embodiment of the foam, the surface region, such as a surface layer, oriented on the second side of the foamed region may be a first surface region, such as a first surface layer, and the reinforcement region comprising the porous layer may be a first reinforcement region comprising a first porous layer. The first porous layer may have a first side and a second side positioned opposite one another, in which the first side of the first porous layer is adjacent to the first the foam, and wherein the foam further comprises a second surface region, such as a second surface layer, the second surface region oriented on the second side of the first porous layer. In a further embodiment, the foam may further comprise an adhesive region, such as an adhesive layer between the first porous layer and the second surface region, such as a second surface layer.

In another embodiment of the foam, the interconnected network of pores of the porous layer may be fully imbibed with the elastomer.

In another aspect, the present disclosure provides a supported elastomeric foam comprising:
- at least two foamed regions, each said at least two foamed regions comprising a plurality of gas filled cells defined by elastomer;
- at least two reinforcement regions each said at least two reinforcement regions comprising a porous layer having an interconnected network of pores at least partially imbibed with the elastomer; and
- a stiffening region wherein said at least two foamed regions are positioned at opposing first and second sides of the stiffening region.

In one embodiment of the supported elastomeric foam the at least two foamed regions comprise a first foamed region comprising a plurality of gas filled cells defined by elastomer and a second foamed region comprising a plurality of gas filled cells defined by elastomer. The at least two reinforcement regions may comprise a first reinforcement region comprising a first porous layer having a first interconnected network of pores at least partially imbibed with the elastomer and a second reinforcement region comprising a second porous layer having a second interconnected network of pores at least partially imbibed with the elastomer. The first foamed region may be positioned at a first side of the stiffening region, and the second foamed region may be positioned at a second side of the stiffening region opposite the first side. The first foamed region may be positioned between the first reinforcement region and the stiffening region and the second foamed region may be positioned between the second reinforcement region and the stiffening region.

In another aspect, the present disclosure provides a dry sealing gasket or dry sealing washer comprising the foam of any of the preceding aspects and embodiments.

In another aspect, the present disclosure provides a method of forming a multilayered supported elastomeric foam, the method comprising:
- a) providing a first porous layer comprising a first interconnected network of pores and a second porous layer comprising a second interconnected network of pores;
- b) casting a first liquid elastomer mixture of a first elastomer and a first foaming agent with the first porous layer, positioning a first side of the first porous layer at a first side of the first liquid elastomer mixture, such that the first liquid elastomer mixture wets the first side of the first porous layer;
- c) positioning a first side of the second porous layer on the second side of the first liquid elastomer mixture opposite to that of the first side of the liquid mixture, such that the first liquid elastomer mixture wets the first side of the second porous layer;
- d) activating the first foaming agent to create a plurality of closed gas-filled cells in the liquid mixture;
- e) curing the first elastomer to form first and second reinforcement regions that include the first and second porous layers respectively and a first foamed region containing the plurality of gas-filled cells therebetween to provide a first elastomeric matrix;
- f) repeating steps a)-e) at least once to provide at least a second elastomeric matrix;
- g) attaching the first and the at least a second elastomeric matrices to form a multilayered supported elastomeric foam.

In one embodiment, the method may further comprise:
- in step f), providing a third porous layer having a first side and comprising a third interconnected network of pores in repeated step a) and a fourth porous layer having a first side and comprising a fourth interconnected network of pores in repeated step c) to form third and fourth reinforcement regions that include the third and fourth porous layers respectively and a second foamed region containing a plurality of gas-filled cells therebetween to provide the second elastomeric matrix.

In another embodiment, the method may further comprise:
- in step g) applying a first adhesive between a second side of one of the first and second porous layers and a second side of one of the third and fourth porous layers, wherein the second sides are opposite to that of the first sides of the respective porous layers.

In another embodiment, the method may further comprise:
- in step g) contacting the second side of one of the first and second porous layers and a second side of one of the third and fourth porous layers with the first adhesive therebetween to bond the second side of one of the first and second porous layers to the second side of one of the third and fourth porous layers.

In another embodiment, the method may further comprise:
- in step g) inserting a first stiffening region between the second side of one of the first and second porous layers and the second side of one of the third and fourth porous layers, such that the first adhesive is between the second side of one of the first and second porous layers and a first side of the first stiffening region to bond the second side of one of the first and second porous layers to the first side of the first stiffening region, and
- applying a second adhesive between a second side of the first stiffening region opposite to that of the first side of the first stiffening region and the second side of one of the third and fourth porous layers to bond the second side of one of the third and fourth porous layers to the second side of the first stiffening region.

In another embodiment, the method may further comprise:
- in step g) attaching the first and the at least second elastomeric matrices with at least one fastening means.

The fastening means may provide for the mechanical attachment of the elastomeric matrices to form the multilayered supported elastomeric foam. For instance each of the first and second elastomeric matrices may comprise at least one through hole extending from an outer surface of first reinforcement region through the first foamed region to an outer surface of the second reinforcement region and from an outer surface of the third reinforcement region through the second foamed region to an outer surface of the fourth reinforcement region. The fastening means may extend though the through-holes of first and second elastomeric matrices to attach them together, such as when the reinforcement regions are placed in a substantially parallel orientation with the through-holes aligned. The fastening means may be, for instance a fastener comprising a head and a connected shank, and a corresponding collar, such as a bolt and nut.

In another embodiment, the method may further comprise:
- in step f) providing a fifth porous layer having a first side and comprising a fifth interconnected network of pores in repeated step a) and a sixth porous layer having a first side and comprising a sixth interconnected network of pores in repeated step c) to form fifth and sixth reinforcement regions that include the fifth and sixth porous layers respectively and a third foamed region containing a plurality of gas-filled cells therebetween to provide a third elastomeric matrix.

In another embodiment, the method may further comprise:

in step g) applying a third adhesive between a free second side of one of the first to fourth porous layers and a second side of one of the fifth and sixth porous layers, wherein the second sides are opposite to that of the first sides of the respective porous layers.

As used herein, the term "free side" is intended to represent an uncovered side of a porous layer i.e. a side which is not in contact with another layer such as an adhesive layer, a foamed region, another porous layer or a stiffening layer.

In another embodiment, the method may further comprise:

in step g) contacting the second free side of one of the first to fourth porous layers and a second side of one of the fifth and sixth porous layers with the third adhesive therebetween to bond the second free side of one of the first to fourth porous layers to the second side of one of the fifth and sixth porous layers.

In another embodiment, the method may further comprise:

in step g) inserting a second stiffening region between the second free side of one of the first to fourth porous layers and the second side of one of the fifth and sixth porous layers, such that the third adhesive is between the second free side of one of the first to fourth porous layers and a first side of the second stiffening region to bond the second free side of one of the first to fourth porous layers to the first side of the second stiffening region, and applying a fourth adhesive between a second side of the second stiffening region opposite to that of the first side of the second stiffening region and the second side of one of the fifth and sixth porous layers to bond the second side of one of the fifth and sixth porous layers to the second side of the second stiffening region.

In another aspect, the present disclosure provides a method of forming a multilayered supported elastomeric foam, the method comprising:

a) providing a first outer layer, a second outer layer and at least one inner porous layer comprising an interconnected network of pores;

b) casting a first liquid elastomer mixture of a first elastomer and a first foaming agent with the first outer layer, positioning a first side of the first outer layer at a first side of the first liquid elastomer mixture, such that the first liquid elastomer mixture wets the first side of the first outer layer;

c) casting a second liquid mixture of a second elastomer and a second foaming agent with the first inner porous layer, positioning a second side of the first inner porous layer, which second side is opposite that of the first side of the first inner porous layer, at a first side of the second liquid mixture, such that the second liquid mixture wets the second side of the first inner porous layer;

positioning the first side of the first inner porous layer on a second side of the first liquid elastomer mixture opposite to that of the first side of the first liquid elastomer mixture, such that the first liquid mixture may wet the first side of the first inner porous layer;

d) optionally providing a second or further inner porous layer comprising a further interconnected network of pores and casting a third or further liquid mixture of a third or further elastomer and a third or further foaming agent with the second or further inner porous layer, positioning a second side of the second or further inner porous layer, which second side is opposite that of the first side of the second or further inner porous layer, at a first side of the third or further liquid mixture, such that the third or further liquid mixture wets the second side of the second or further inner porous layer;

positioning the first side of the second or further inner porous layer on a second side of the second or further liquid elastomer mixture opposite to that of the first side of the second or further liquid elastomer mixture;

e) positioning a first side of the second outer layer on a second side of the second or further liquid mixture opposite to that of the first side of the second or further liquid mixture such that the second or further liquid mixture wets the first side of the second outer layer;

f) activating the first foaming agent to create a plurality of closed gas-filled cells in the first liquid elastomer mixture and activating the second and any further foaming agent to create a plurality of closed gas-filled cells in the second and any further liquid elastomer mixture;

g) curing the first elastomer to form a first inner reinforcement region that includes the first inner porous layer and a first foamed region containing the plurality of gas-filled cells between the first inner reinforcement region and the first outer layer and curing the second elastomer to form a second foamed region containing the plurality of gas-filled cells in contact with the first inner reinforcement region, the second foamed region being separated from the first foamed region by the second reinforcement region to form a multilayered supported elastomeric foam, and optionally curing any third and further elastomers to form third and any further foamed regions containing the plurality of gas-filled cells and second and any further inner reinforcement regions between the first inner reinforcement region and the second outer layer.

The interconnected network of pores of the first inner reinforcement region may be imbibed with the first and second elastomer.

In one embodiment of the method, both of the first and second outer layers may be a first outer porous layer comprising an interconnected network of pores and a second outer porous layer comprising an interconnected network of pores respectively, wherein when the first outer layer is a first outer porous layer, curing the first elastomer forms a first outer reinforcement region that includes the first outer porous layer having the interconnected network of pores at least partially imbibed with first elastomer, and when the second outer layer is a second outer porous layer, curing the second or further elastomer forms a second outer reinforcement region that includes the second outer porous layer having the interconnected network of pores at least partially imbibed with second or further elastomer.

In another embodiment of the method, both of the first and second outer layers may be a first outer non-porous layer and a second outer non-porous layer respectively.

In another embodiment of the method, first outer layer may be a first outer porous layer comprising an interconnected network of pores and the second outer layer may be a second outer non-porous layer, such that curing the first elastomer forms a first outer reinforcement region that includes the first outer porous layer having the interconnected network of pores at least partially imbibed with the first elastomer.

In another embodiment, the method may further comprise placing the porous layers under tension during one or more of the positioning, casting activating and curing steps.

In another embodiment, the method may further comprise:
in step e) positioning a first side of the second outer layer on a second side of the second liquid mixture opposite to that of the first side of the second liquid mixture such that the second liquid mixture wets the first side of the second outer layer;
in step f) activating the first foaming agent to create a plurality of closed gas-filled cells in the first liquid elastomer mixture and activating the second foaming agent to create a plurality of closed gas-filled cells in the second liquid elastomer mixture; and
in step g) curing the first elastomer to form a first inner reinforcement region that includes the first inner porous layer comprising an interconnected network of pores imbibed with the first and second elastomers and a first foamed region containing the plurality of gas-filled cells between the first inner reinforcement region and the first outer layer and curing the second elastomer to form a second foamed region containing the plurality of gas-filled cells between the first inner reinforcement region and the second outer layer, the second foamed region being separated from the first foamed region by the first inner reinforcement region.

In another embodiment, the method may comprise:
in step d) providing a second inner porous layer comprising an interconnected network of pores and casting a third liquid mixture of a third elastomer and a third foaming agent with the second inner porous layer, positioning a second side of the second inner porous layer, which second side is opposite that of the first side of the second inner porous layer, at a first side of the third liquid mixture, such that the third liquid mixture wets the second side of the second inner porous layer;
positioning the first side of the second inner porous layer on a second side of the second liquid elastomer mixture opposite to that of the first side of the second liquid elastomer mixture.

In another embodiment, the method may further comprise:
in step e) positioning a first side of the second outer layer on a second side of the third liquid mixture opposite to that of the first side of the third liquid mixture such that the third liquid mixture wets the first side of the second outer layer;
in step f) activating the first foaming agent to create a plurality of closed gas-filled cells in the first liquid elastomer mixture, activating the second foaming agent to create a plurality of closed gas-filled cells in the second liquid elastomer mixture and activating the third foaming agent to create a plurality of closed gas-filled cells in the third liquid elastomer mixture; and
in step g) curing the first elastomer to form a first inner reinforcement region that includes the first inner porous layer having the interconnected network of pores imbibed with the first and second elastomers and a first foamed region containing the plurality of gas-filled cells between the first inner reinforcement region and the first outer layer, curing the second elastomer to form a second inner reinforcement region that includes the second inner porous layer having the interconnected network of pores imbibed with the second and third elastomers and a second foamed region containing the plurality of gas-filled cells between the first inner reinforcement region and the second inner reinforcement region, the second foamed region being separated from the first foamed region by the first inner reinforcement region and curing the third elastomer to form a third foamed region containing the plurality of gas filled cells between the second inner reinforcement region and the second outer layer.

In another embodiment, the method may further comprise:
in step d) further providing a third inner porous layer comprising an interconnected network of pores and casting a fourth liquid mixture of a fourth elastomer and a fourth foaming agent with the third inner porous layer, positioning a second side of the third inner porous layer, which second side is opposite that of the first side of the third inner porous layer, at a first side of the fourth liquid mixture, such that the fourth liquid mixture wets the second side of the third inner porous layer;
positioning the first side of the third inner porous layer on a second side of the third liquid elastomer mixture opposite to that of the first side of the third liquid elastomer mixture.

In another embodiment, the method may further comprise:
in step e) positioning a first side of the second outer layer on a second side of the fourth liquid mixture opposite to that of the first side of the fourth liquid mixture such that the fourth liquid mixture wets the first side of the second outer layer;
in step f) activating the first foaming agent to create a plurality of closed gas-filled cells in the first liquid elastomer mixture, activating the second foaming agent to create a plurality of closed gas-filled cells in the second liquid elastomer mixture, activating the third foaming agent to create a plurality of closed gas-filled cells in the third liquid elastomer mixture and activating the fourth foaming agent to create a plurality of closed gas-filled cells in the fourth liquid elastomer mixture;
in step g) curing the first elastomer to form a first inner reinforcement region that includes the first inner porous layer having the interconnected network of pores imbibed with first and second elastomers and a first foamed region containing the plurality of gas-filled cells between the first inner reinforcement region and the first outer layer, curing the second elastomer to form a second inner reinforcement region that includes the second inner porous layer having the interconnected network of pores imbibed with the second and third elastomers and a second foamed region containing the plurality of gas-filled cells between the first inner reinforcement region and the second inner reinforcement region, the second foamed region being separated from the first foamed region by the first inner reinforcement region, curing the third elastomer to form a third inner reinforcement region that includes the third inner porous layer having the interconnected network of pores imbibed with the third and fourth elastomers and a third foamed region containing the plurality of gas filled cells between the third inner reinforcement region and the fourth inner reinforcement region, the third foamed region being separated from the second foamed region by the second inner reinforcement region and curing the fourth elastomer to form a fourth foamed region containing the plurality of gas-filled cells between the third inner reinforcement region and the second outer layer, the fourth foamed region being separated from the third foamed region by the third inner reinforcement region.

The present disclosure also encompasses combinations of the two previous method aspects. In particular, that the activating and curing steps need not only be carried out either after each casting step or after all the casting steps. Activating and curing may be carried out after two or more casting steps, but before all the casting steps are carried out.

These and other embodiments, along with many of their advantages and features, are described in more detail in conjunction with the below description and attached figures.

BRIEF DESCRIPTION OF THE DRAWINGS

The present disclosure will be better understood in view of the appended non-limiting figures.

FIG. 13 is a side cross-sectional view showing an embodiment of supported elastomeric foam having two different imbibed support regions.

FIG. 14 is a side cross-sectional view showing an embodiment of supported elastomeric foam having two imbibed support regions and a surface layer.

DETAILED DESCRIPTION

Figure 1:
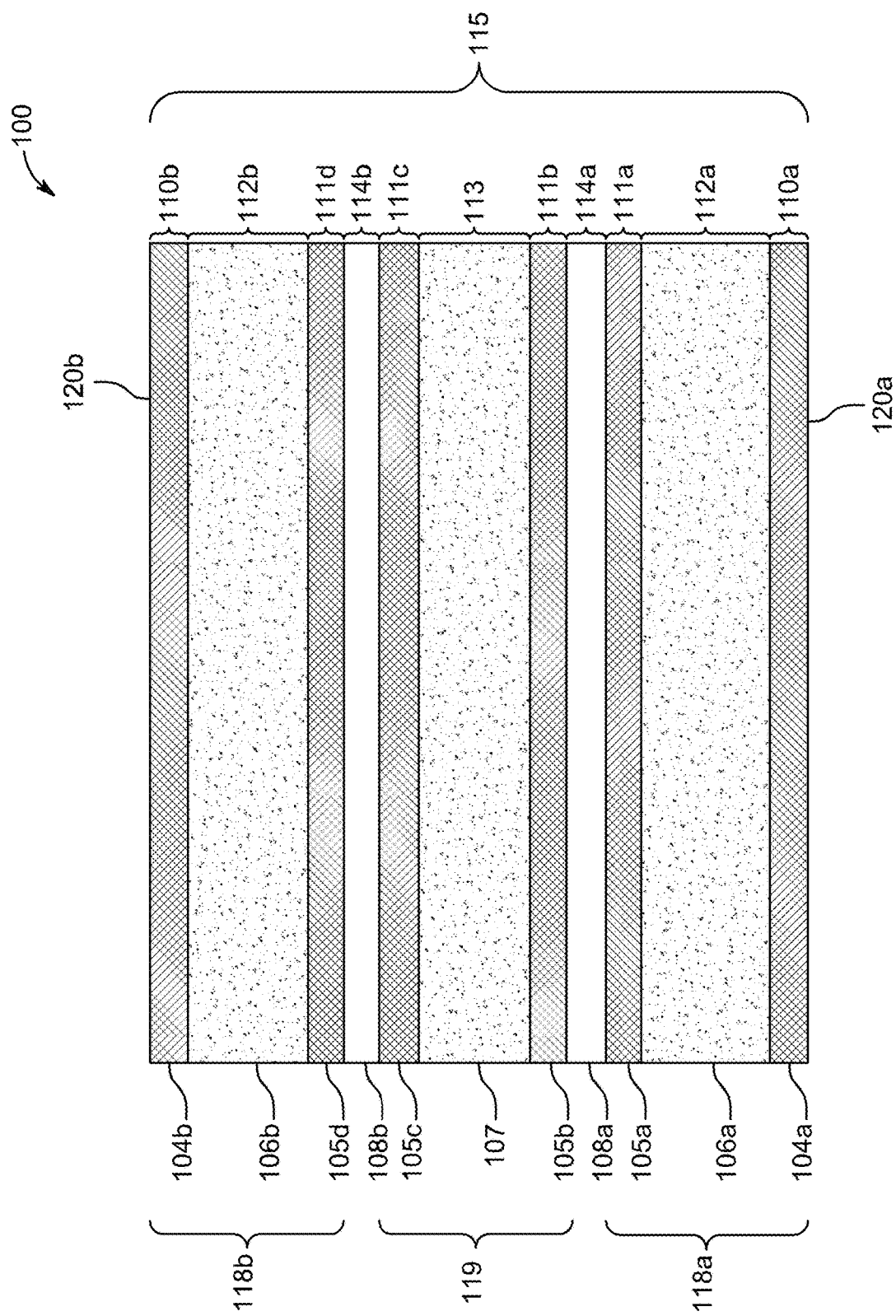
FIG. 1 is a side cross sectional view of an embodiment of the multi-layered supported elastomeric foam.

Various embodiments disclosed herein relate generally to dry sealants for protecting a mechanical interface, e.g., in an airframe structure or comparable structure. In specific embodiments, a dry sealant can be formed of multilayered supported elastomeric foam. Suitable elastomeric foams can limit the ability of liquids to penetrate the interface, in order to prevent corrosion, liquid intrusion, or other issues. The elastomeric foam can be formed of a chemically inert material for preventing intrusion by water, jet fuel, hydraulic fluids (including phosphate ester based), oils, de-icing agents, or other materials.

The provision of a supported elastomeric foam in multi-layered form allows the number of foamed regions to be varied in order to alter the thickness of the multilayer structure, for instance to seal a gap of specific size in a mechanical interface, whilst still retaining the sealant properties and mechanical strength of the foam. In a similar manner, the number of reinforcement regions can be varied in order to provide particular physical properties, such as mechanical strength to the foam.

Specific embodiments of multilayered supported elastomeric foam include or comprise at least two foamed regions and at least one reinforcement region, in which the at least two foamed regions are separated by at least one reinforcement region. Each of the at least two foamed regions include or comprise an elastomer which defines a plurality of gas filled cells. The at least one reinforcement region includes or comprises a porous layer defined by an interconnected network of pores, such as in a porous or microporous material, where the pores are at least partially imbibed with the elastomer. At least partially imbibing the porous layer with the elastomer provides an anchoring effect on the porous layer, securing the reinforcement region to the abutting foamed region. According to various embodiments, the porous layer can be imbibed with elastomer until the elastomer penetrates a thickness of the porous layer, even if not all pores are filled with the elastomer. According to some embodiments, the porous layer can be fully imbibed with the elastomer, until all of the pores are filled with elastomer. According to various embodiments, the porous layer can be a porous polymer or fluoropolymer, e.g., a porous membrane such as an expanded polytetrafluoroethylene (ePTFE) membrane, a woven, a nonwoven, or other suitable porous layer. According to some embodiments, the porous layer can be a porous fiberglass layer, e.g., a fiberglass woven or a fiberglass nonwoven. The at least two foamed regions are formed of the elastomer and a plurality of gas-filled, cells in the elastomer, in which preferably the cells in the elastomer are closed cells. The at least one reinforcement region and an adjoining foamed region are connected together by way of the elastomer, forming a composite structure. The reinforcement region provides increased strength to the overall structure of the multilayered supported elastomeric foam, while the at least two foamed regions are operable to contract under load to provide sealing capabilities with a high working range, i.e., being capable of sealing a gap in an interface at a wide range of clamping pressures or between uneven surfaces.

The disclosure may be better understood with reference to the Figures, in which like parts have like numbering. In addition, like parts across different embodiments share the same final two reference numerals and if present associated letter. The Figures are a qualitative representation of embodiments of the invention and the relative size of any layers shown are not to scale.

FIG. 1 is a side cross sectional view of an embodiment of multilayered supported elastomeric foam 100. The elastomeric foam 100 is formed of reinforcement regions 104a, b and 105a, b, c and d, foamed regions 106a, b and 107 and adhesive regions 108a, b. The reinforcement regions and foamed regions form an elastomeric matrix, such as a foamed region between and abutting two reinforcement regions. As shown herein, the foamed region 106a is positioned adjacent to and between the reinforcement regions 104a and 105a, however, the foamed and reinforcement regions can generally adopt any suitable configuration with respect to one another, e.g., with the reinforcement region at either a top or bottom side of the foamed region, embedded in the foamed region, or as one of multiple reinforcement regions sandwiching or positioned at varying depths in the foamed region as long as at least one reinforcement region separates two adjacent foamed regions in at least one part of the foam. As used herein, the term "adjacent" is intended to mean two neighboring regions of a given type, such as reinforcement or foamed regions, which do not have any other regions of the same type between them, for instance when viewed along an axis perpendicular to the planes of the layered reinforcement and foamed regions. For example, pairs of foamed regions 106a and 107 or 107 and 106b are adjacent, whilst the pair of foamed regions 106a and 106b is not adjacent due to intervening inner foamed region 107. Similarly, pairs of reinforcement regions 104a and 105a or 105a and 105b are adjacent, whilst the pair of reinforcement regions 104a and 105b is not adjacent due to intervening inner reinforcement region 105a. As used herein, the term "abut" is intended to describe two regions in physical contact, also referred to herein as being in direct contact. For instance, reinforcement layer 104a and foamed region 106a or foamed region 106a and reinforcement region 105a abut one-another and are in physical contact.

FIG. 1 shows first and second outer reinforcement regions 104a, b and internal reinforcement regions 105a-d. Also shown are first and second outer foamed regions 106a, b and inner foamed region 107. As used herein, the term "outer" refers to the region of a particular type, such as a reinforcement or foamed region, nearest to an external surface of the elastomeric foam 100, for instance when viewed along an axis perpendicular to the planes of the layered reinforcement and foamed regions. Thus, the elastomeric foam 100 may have opposite first and second external surfaces 120a, b lying on first and second outer reinforcement regions 104a, b respectively. Thus, the external surfaces are those which terminate the foam when viewed along an axis perpendicular to the planes of the layered reinforcement and foamed regions. Similarly, reference to "inner" regions of a given type, such as reinforcement or foamed regions, mean that at least one other region of the same type is situated between the inner region and an external surface of the foam. For instance, inner foamed region 107 is an inner region because outer foamed regions 106a, b lie between it and the external surfaces 120a, b of the foam.

The reinforcement regions 104a, b and 105a-d include a porous layer generally formed of a polymer, optionally in the form of a porous polymer membrane, that possess an interconnected network of pores, optionally an interconnected matrix of nodes and fibrils, or only fibrils, into which an elastomer is at least partially imbibed. The porous layer of each reinforcement region may each independently be the same or different. By the same or different it is meant that porous layers may be made of the same material with the same properties, such as pore size or they may be made of different materials and/or may have different properties, such as pore size.

In FIG. 1, three elastomeric matrices are shown 118a, b and 119a, each formed from a foamed region 106a, b and 107a and two reinforcement regions 104a, b and 105a-d located on opposite surfaces of the foamed region. Thus, first outer elastomeric matrix 118a is formed from first outer foamed region 106a between first outer reinforcement region 104a and first inner reinforcement region 105a (which may also be referred to as a second reinforcement region). The first outer reinforcement region 104a and first inner reinforcement region 105a each comprise a porous layer (such as first outer and first inner porous layers respectively) having an interconnected network of pores at least partially imbibed with the elastomer of the first outer foamed region 106a. Similarly, second outer elastomeric matrix 118b is formed from second outer foamed region 106b between second outer reinforcement region 104b and fourth inner reinforcement region 105d. The second outer reinforcement region 104b and fourth inner reinforcement region 105d each comprise a porous layer (such as second outer and fourth inner porous layers respectively) having an interconnected network of pores at least partially imbibed with the elastomer of the second outer foamed region 106b. Also shown is a single inner elastomeric matrix 119 formed from inner foamed region 107 between second inner reinforcement region 105b (which may also be referred to as a third reinforcement region) and third inner reinforcement region 105c. The second inner reinforcement region 105b and third inner reinforcement region 105c each comprise a porous layer (such as second and third inner porous layers) having an interconnected network of pores at least partially imbibed with the elastomer of the inner foamed region 107.

In other embodiments not shown in FIG. 1, the foam may not comprise an inner elastomeric matrix, such that it comprises first and second outer elastomeric matrices, or the foam may comprise a plurality of inner elastomeric matrices, such as at least two inner elastomeric matrices, at least three inner elastomeric matrices, at least four inner elastomeric matrices, at least five inner elastomeric matrices etc., each of which comprise an inner foamed region between at least two inner reinforcement regions are present. Such further inner elastomeric matrices may be similar to the first inner elastomeric matrix discussed above. In this way, a multilayered supported elastomeric foam may be provided with elastomeric matrices which are stacked to provide a specific thickness to match the size of a particular mechanical interface, by selecting an appropriate number of inner elastomeric matrices comprising inner foamed regions and inner reinforcement regions.

Returning to FIG. 1, first and second inner reinforcement regions 105a, b lie between adjacent first outer and inner foamed region 106a and 107. Similarly, third and fourth inner reinforcement regions 105c, d lie between adjacent inner and second outer foamed regions 107 and 106b. Pairs of adjacent inner reinforcement regions 105a, b and 105c, d may be joined by adhesive regions 108a, b. The adhesive regions 108a, b may be discontinuous portions of adhesive or, preferably a continuous region of adhesive, such as a layer. One suitable adhesive is a silicone adhesive such as ARSEAL 8026 (Adhesives Research, Glen Rock, PA), which can be applied by way of a transfer tape, either by way of firm hand pressure or lamination pressure. Another suitable adhesive is an acrylic adhesive such as 9482PC (3M, St. Paul, MN), which can be applied by way of a transfer tape. A liquid adhesive may also be used, such as a silicone pressure sensitive adhesive with a curing catalyst, which can be applied to a surface of one or both of the inner reinforcement regions 105a, b and 105c, d and then cured with heat. Alternatively, the liquid elastomer used to form the foamed regions and to imbibe the porous layers of the reinforcement regions may also be used as an adhesive. The use of an adhesive, particularly a contact adhesive, allows the multilayered supported elastomeric foam to be built up, for instance in situ, to provide the required thickness to seal a mechanical interface, and provides structural integrity to the stacked elastomeric matrices 118a, b, 119.

The foamed regions 106a, b and 107a may be expanded by way of a series of closed-cell, gas-filled voids in the elastomer formed by way of a foaming agent in the elastomer or in an elastomer precursor that forms an elastomeric matrix. In some embodiments, the foaming agent used to expand the foamed region is mixed with the elastomer and is formed of particles that are larger than a pore size of the porous layer positioned in the reinforcement regions 104a, b and 105a-d. Thus, foaming agent is generally excluded from the reinforcement regions 104a, b and 105a-d, preventing expansion of voids within the reinforcement regions. Thus, although voids may abut the reinforcement regions 104a, b and 105a-d, the reinforcement regions will remain substantially devoid of large voids formed by the foaming agent. The closed cell, gas-filled voids can vary in size according to the foaming agent selected. According to some embodiments, the voids have an average cell size ranging from diameters of about 5 μm to 700 μm as measured by SEM cross section. According to certain embodiments, the average cell size of the voids, by diameter, can vary from 5 μm to 100 μm, or from 5 μm to 50 μm. Suitable foaming agents can include heat activated expanding polymer spheres, hollow sphere fillers, heat activated chemical foaming agents, gas injection foaming agents, or the like.

A total thickness 115 of the supported elastomeric foam 100 can include first thicknesses 110a, b and 111a-d corresponding to the reinforcement regions 104a, b and 105a-d respectively, second thicknesses 112a, b and 113a corresponding to foamed regions 106a, b and 107a respectively and third thicknesses 114a, b corresponding to adhesive regions 108a, b respectively, all of which may vary independently. According to certain embodiments, the total thickness 115 at a pressure of about 0.5 kPa can vary from about 100 μm to 5000 μm (5.0 mm), 100 μm to about 2000 μm (2.0 mm), e.g., from 200 μm to 600 μm, or from 220 μm to 380 μm. A ratio between the first thickness 110 of the reinforcement region 104 to the total thickness 115 may optionally vary from 0.5% to 50%, of the total thickness, e.g., from 1% to 50%, 2% to 20%, or from 4% to 8%.

According to some embodiments, the reinforcement regions 104a, b and 105a-d include a fluoropolymer membrane as the porous layer. In some specific embodiments, the reinforcement region includes as the porous layer an expanded polytetrafluoroethylene (ePTFE) membrane. Such ePTFE membranes are advantageously strong and chemically resistant, while being sufficiently porous to imbibe a liquid elastomer or elastomer precursor in order to form an elastomeric matrix. In some specific embodiments, a suitable ePTFE membrane can have a thickness on the order of 1 μm to 100 μm, e.g., 4 μm to 40 μm, or about 34 μm, a density on the order of 0.02 to 1.5 g/cm$^3$, e.g. 0.1 to 0.5 g/cm$^3$ or about 0.27 g/cm$^3$, porosity on the order of 30% to 98%, e.g. 80-95%, or about 88%, and maximum matrix tensile strength of from 30 MPa to 1500 MPa, e.g. from 240 MPa to 440 MPa, or at least 320 MPa in a first direction and at least 30 MPa to 1500 MPa, e.g. from 130 MPa to 350 MPa, or at least 160 MPa in a second direction. The maximum matrix tensile strengths described herein refer to the cross-sectional area of the polymer only, not the pore structure or total cross-sectional area. According to various embodiments, suitable ePTFE membranes can vary in thickness down to about 8 μm or thinner, with densities ranging down to about 0.18 g/cm$^3$. Suitable ePTFE membranes can be made, in accordance with embodiments, according to methods as discussed in, e.g., U.S. Pat. No. 3,953,566, which is hereby incorporated by reference. In alternative embodiments, the reinforcement regions 104a, b and 105a-d can include as porous layer a non-ePTFE porous layer, such as an alternative porous polymer membrane, a woven or nonwoven material, such as a fiberglass woven or nonwoven, or the like. For example, in some embodiments, the porous layers of reinforcement regions 104a, b and 105a-d are a polyether ether ketone (PEEK) fiber woven. One suitable PEEK woven is a high-temperature chemical-resistant PEEK mesh, such as PEEK mesh, part no. 9289T12 (McMaster-Carr, Santa Fe Springs, CA), which is formed of PEEK plastic in a woven mesh of a plastic wire having diameter of 60 to 80 μm, e.g., from about 65 to 75 μm or about 71 μm and an open area of 12 to 32%, e.g., 15 to 29% or approximately 22%. However, various other PEEK fiber wovens, ePTFE fiber wovens, nonwovens, or other, similar porous polymer layers may be used. Thus, the porous layer of the reinforcement region may be selected from a porous polymer membrane such as ePTFE, a woven material such as a ePTFE fiber, PEEK fiber or fiberglass woven or a non-woven material such as fiberglass non-woven.

Each of the first and second outer elastomeric matrices 118a, b and inner elastomeric matrix 119 may be constructed as follows. A first porous layer comprising a first interconnected network of pores and a second porous layer comprising a second interconnected network of pores which will become the first and second reinforcement regions in the ultimately formed supported elastomeric foam (such as first outer reinforcement region 104a and first inner reinforcement region 105a), may be provided or prepared and combined with a first liquid elastomer mixture, which will become the first outer foamed region 106a, in a first process step. In particular, a first liquid elastomer mixture comprising a first elastomer and a first foaming agent may be cast on the first porous layer, in which a first side of the first porous layer is positioned at a first side of the first liquid elastomer mixture, such that the first liquid elastomer mixture wets the first side of the first porous layer. The first elastomer can then be imbibed into the pores of the first porous layer. The first porous layer can be placed in tension, e.g., within a frame, until the layer adopts a flat, wrinkle-free state before being cast with the first liquid elastomer mixture. The first foaming agent may be a chemical foaming agent diffused throughout the mixture, or may be a powdered, dry foaming agent mixed throughout the elastomer. In some embodiments, the first foaming agent and first elastomer are mixed to a target mass fraction by weighing each component when mixing. The first foaming agent may include a combination of different foaming agents having different properties, e.g., foaming agents designed to produce differently sized gas cavities. A second porous layer can be tensioned and then laid on top of the first liquid elastomer mixture, such as on a second side of the first liquid elastomer mixture opposite to that of the first side, such that the first liquid elastomer mixture wets a first side of the second porous layer. The first elastomer can then be imbibed into the pores of the second porous layer.

Thus, the first liquid elastomer mixture is cast on the first and second tensioned porous layers, such as a first outer porous layer and a first inner porous layer and allowed to wet or fill some or all of the porous layers until each porous layer is at least partially imbibed (i.e., filled) with first elastomer, i.e. until at least some pores throughout the thickness of the porous layers are filled with the first elastomer mixture (leaving few if any isolated gas pockets in the porous structure of the reinforcement region), or fully imbibed (in which case no gas remains in the pores of the porous layers). Once assembled, the reinforcement regions and first liquid elastomer layer are optionally set to a predetermined thickness by any suitable combination of processing steps including, but not limited to, the selected coating method (e.g., rolling, brushing, spraying), liquid elastomer removal (e.g. by passing the assembly through a tool gap), or process parameters (e.g., line speed, tool gap, etc.).

The first foaming agent can then be activated to create a plurality of closed gas-filled cells in the first liquid elastomer mixture. This may be a first, foaming heating cycle to activate the first foaming agent in a second process step. The specific parameters of the foaming heating cycle can also impact the final thickness of the composition, depending on the concentration of foaming agent used, and on the degree and duration of heat exposure. Depending on the first foaming agent chosen, the first heating cycle may be skipped or conducted at room temperature, i.e., for a contact or room-temperature foaming agent, or when the foaming agent is operable to activate fully at a curing temperature for the entire supported foam. In some embodiments, a specific heating cycle may be required to activate the first foaming agent. For example, in some cases the assembly can be heat-cycled at a temperature of from 125 to 175° C., e.g., at about 150° C. for 1 to 10 minutes. According to some embodiments, the first, foaming heating cycle can at least partially cure the elastomeric matrix. In some embodiments, various parameters of the foaming heating cycle can be adjusted to maintain at least a degree of mobility in the partially cured first elastomer during the foaming process, in order to avoid cracking, deformation, or other issues.

Once the first liquid elastomer mixture has been expanded via the embedded first foaming agent, the first elastomer can be cured to form first and second reinforcement regions that include the first and second porous layers respectively and a first foamed region containing the plurality of gas-filled cells therebetween. In this way, a first outer elastomeric matrix 118a can be provided with the first outer porous layer as the first porous layer and a first inner porous layer as the second porous layer. The curing may occur in place by way of a curing heat cycle to solidify the first elastomer mixture into a first elastomeric foam in a third process step. Depending on the specific first foaming agent and first liquid elastomer mixture chosen, the curing step may not require temperatures above room temperature. However, in some cases, the curing step may require a different action as dictated by the specific elastomer, such as UV exposure. According to some embodiments, the curing step can include heating the liquid mixture to a curing temperature of approximately 75° C. to 125° C. for 5 to 180 minutes.

Repeating this process with a second liquid elastomer mixture comprising a second elastomer and a second foaming agent, second inner porous layer 105b and third inner porous layer 105c as third and fourth porous layers, an inner elastomeric matrix 119 can be provided. Repeating this process again, with a third liquid elastomer mixture comprising a third elastomer and a third foaming agent, fourth inner porous layer 105d and second outer porous layer 104b as fifth and sixth porous layers, a second outer elastomeric matrix 118b can be provided. It will be apparent that first-six porous layers may independently be the same or different as discussed above. Similarly the first-third elastomers and first-third foaming agents may be independently the same or different. For instance, the first-third elastomers may be made of the same or different compounds and the first-third foaming agents may be made of the same or different compounds.

Then, a first adhesive, such as a first layer of adhesive 108a, can be applied between (i) a second side of the first inner reinforcing region 105a and (ii) a second side of the second inner reinforcing region 105b, to bond the first outer elastomeric matrix 118a and the inner elastomeric matrix 119. Similarly, a second adhesive, such as a second layer of adhesive 108b, can be applied between (i) a second side of the third inner reinforcing region 105c and (ii) a second side of the fourth inner reinforcing region 105d, to bond the inner elastomeric matrix 119 to the second outer elastomeric matrix 118b. It will be apparent that the first and second adhesives may be the same or different adhesive material.

Thus, each foamed region and each reinforcement region of the multilayered supported elastomeric foam may be selected independently. For instance, the first and second outer foamed regions 106a, b, may be prepared from a different elastomer than any inner foamed region 107 of an inner elastomeric matrix 119. Similarly, first and second outer reinforcement regions 104a, b may comprise a different porous layer than those of the inner reinforcement regions 105a, d, or the inner reinforcement regions 105b, c of any inner elastomeric matrix 119. This can provide different properties, such as chemical resistance, to the outer elastomeric matrices 118a, b of the elastomeric foam 100 compared to any inner elastomeric matrices 119.

It will be apparent that the features described for FIG. 1 may be applicable to the following further embodiments.

Figure 2:
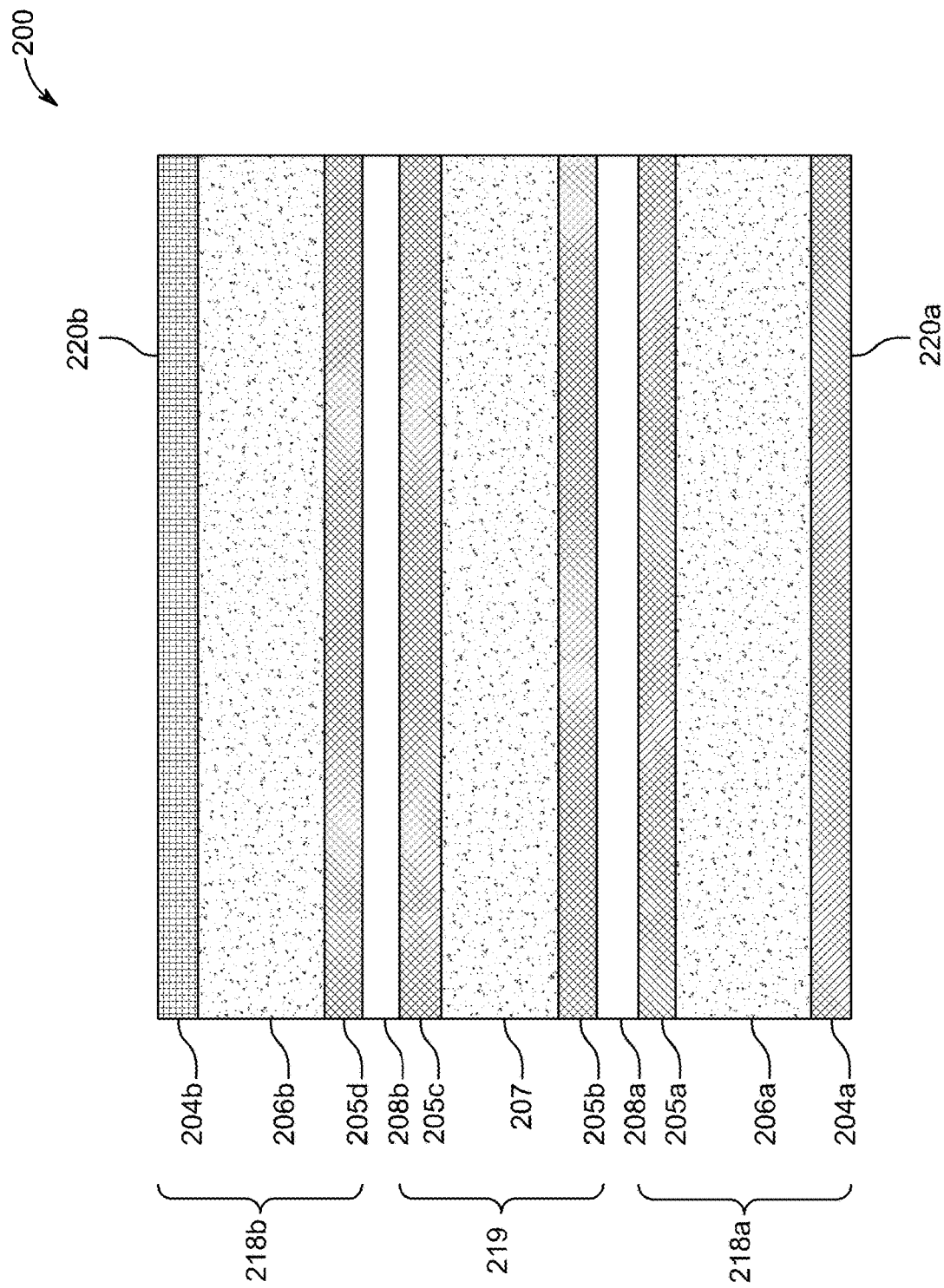
FIG. 2 is a side cross sectional view of an embodiment of the multi-layered supported elastomeric foam having different types of reinforcement regions.

FIG. 2 is a side cross sectional view of a multilayered supported elastomeric foam 200 having an elastomeric matrix 218b with an asymmetric structure. Three elastomeric matrices are shown 218a, b and 219, each matrix formed from a foamed region 206a, b and 207 and reinforcement regions 204a, b and 205a-d located on opposite surfaces of the foamed region. Thus, first outer elastomeric matrix 218a is provided in which a first outer elastomeric matrix 218a is formed from first outer foamed region 206a between first outer reinforcement region 204a and first inner reinforcement region 205a. The first outer reinforcement region 204a and first inner reinforcement region 205a each have a porous layer (first outer and first inner porous layers respectively) having an interconnected network of pores at least partially imbibed with the elastomer of the first outer foamed region 206a. Similarly, second outer elastomeric matrix 218b is formed from second outer foamed region 206b between second outer reinforcement region 204b and fourth inner reinforcement region 205d. The second outer reinforcement region 204b and fourth inner reinforcement region 205d each have a porous layer (second outer and fourth inner porous layers respectively) having an interconnected network of pores at least partially imbibed with the elastomer of the second outer foamed region 206b. Also shown is a single inner elastomeric matrix 219 formed from inner foamed region 207 between second inner reinforcement region 205b and third inner reinforcement region 205c. The second inner reinforcement region 205b and third inner reinforcement region 205c each have a porous layer (second and third inner porous layers respectively) having an interconnected network of pores at least partially imbibed with the elastomer of the inner foamed region 207.

The asymmetric structure can be achieved as follows. Second outer elastomeric matrix 218b comprises a second outer foamed region 206b comprising a plurality of gas filled cells defined by an elastomer between a fourth inner reinforcement region 205d comprising a fourth inner porous layer having an interconnected network of pores at least partially imbibed with the elastomer and a second outer reinforcement region 204b comprising a second outer porous layer having an interconnected network of pores at least partially imbibed with the elastomer. In this embodiment, the second outer reinforcement region 204b may be different from the fourth inner reinforcement region 205d, such that an asymmetric second outer elastomeric matrix 218b is provided. Thus, the second outer porous layer may be different from the fourth inner porous layer. For instance, the second outer porous layer may be made from a different material than that of the fourth inner porous layer and/or may have different properties such as pore size, for same or different materials. The remaining porous layers of the other reinforcement regions 204a and 205a-c in the elastomeric foam may be identical but different from that of the porous layer of the second outer reinforcement region 204b.

For instance, the second outer porous layer of the second outer reinforcement region 204b may be a woven porous layer, such as a woven ePTFE fiber porous layer, particularly a woven ePTFE twisted fiber porous layer. An example of such a woven porous layer is disclosed below in Example 6. The fourth inner porous layer of the first inner reinforcement region 205d may be a woven PEEK fiber porous layer or an ePTFE membrane. An example of such a woven PEEK fiber porous layer is disclosed below in Example 5. Woven PEEK fiber porous layers have good chemical resistance and thermal properties, and can be obtained in many different thicknesses allowing the thickness of the inner reinforcement region to be selected as required, for instance to provide a desired stiffening thickness. In some embodiments, the remaining first-third inner porous layers of the first-third inner reinforcement regions 205a-c and/or the first outer porous layer of the first outer reinforcement region 204a may be the same as that of the fourth inner porous layer. In a similar manner to the embodiment of FIG. 1, the first elastomeric matrix 218a is bonded to the inner elastomeric matrix 219 by an adhesive region 208a or layer between the first and second inner reinforcement regions 205a, b. Similarly, the inner elastomeric matrix 219 is bonded to the second outer elastomeric matrix 218b by an adhesive region 208b or layer between the third and fourth inner reinforcement regions 205c, d.

Alternatively, in an embodiment not shown in FIG. 2, both the first and second outer porous layers of the first and second outer reinforcement regions 204a, b may be the same, and the first-fourth inner porous layers of the first-fourth inner reinforcement regions 205a-d may be the same, but different from the first and second outer porous layers of the first and second outer reinforcement regions 204a, b. For instance, the first and second outer porous layers may be made from a different material and/or have different properties such as pore size, compared to the first-fourth inner porous layers.

In a further alternative embodiment not shown in FIG. 2, the first and second outer elastomeric matrices 218a, b may be identical, but different from the inner elastomeric matrix 219a. For instance, the first and second outer reinforcement layers 204a, b and corresponding first and fourth inner reinforcement layers 205a, d of the first and second outer elastomeric matrices 218a, b may have identical porous layers, which may be different from those of the second and third inner reinforcement layers 205b, c of the inner elastomeric matrix 219, for instance in terms of the materials from which they are made and/or the properties of the porous layers such as pore size.

In some embodiments, the first or second external surfaces 220a, b of the supported elastomeric foam 200 may be treated, e.g. with adhesive or other material, to improve a connection between the elastomeric foam with a sealed component. For instance, the multilayered supported elastomeric foam may be dotted with multiple adhesive regions (not shown in FIG. 2). The adhesive regions may be printed, cast, or otherwise individually deposited along any suitable external surface 220a, b of the supported elastomeric foam 200, including adjacent to or in direct contact with one or both of the first and second outer reinforcement regions 204a, b. In use, the adhesive regions are pressed into the elastomeric matrix 218a, b when the elastomeric foam 200 is compressed, so that the adhesive regions and elastomeric matrix are brought roughly flush with one another and with an interface surface. Even if small pockets of air form directly adjacent adhesive regions, intervening space between the adhesive regions will inhibit transverse liquid intrusion along the supported elastomeric foam 200. Thus, liquid intrusion is inhibited or prevented at most to all of the adhesive regions, preventing chemical attack of the adhesive regions.

Embodiments of supported elastomeric foams can also employ adhesive films or full surface treatments. For example, an adhesive layer may cover an entire external surface 220a, b of the elastomeric foam 200. The adhesive layer may be printed, cast, or otherwise deposited adjacent to or in contact with one or both of the first or second reinforcement regions 204a, b. According to some embodiments, an adhesive can be applied to an entire external surface of elastomeric foam via transfer tape, lamination, or other comparable means. One suitable adhesive is ARSEAL 8026 (Adhesives Research, Glen Rock, PA), which can be applied by way of a transfer tape, either by way of firm hand pressure or lamination pressure. Another suitable adhesive is an acrylic adhesive such as 9482PC (3M, St. Paul, MN), which can be applied by way of a transfer tape. A liquid adhesive may also be used, such as a silicone pressure sensitive adhesive with a curing catalyst, which can be applied to a surface of one or both of the inner reinforcement regions 205a, b and 205c, d and then cured with heat. Alternatively, the liquid elastomer used to form the foamed regions and to imbibe the porous layers of the reinforcement regions, such as the liquid elastomer of the first or second outer foamed regions may also be used as an adhesive.

The adhesive layer can be applied to one or both external surfaces of the elastomeric foam for use as a compressible seal to aid in placement of the seal during manufacturing of an assembly. According to various embodiments, the adhesive layer may be applied to a compressible seal formed of an elastomeric foam, such as the supported elastomeric foams described above. Using an adhesive with the seal can provide advantages during installation, e.g., allowing a technician to affix the seal to a mounting location where it might otherwise fall, and then fixing a mating surface to the seal and tightening any fasteners. A discontinuous adhesive can be added to achieve these advantages without compromising liquid compatibility of the seal. In the case of a continuous adhesive layer, the edges of the adhesive layer are exposed to the challenge fluid. If the adhesive has less chemical compatibility than the outer reinforcement region, the adhesive could allow wetting into the interface by allowing the challenge fluid to wick into the adhesive layer, by the adhesive layer dissolving in the fluid and becoming replaced with the fluid, or by other mechanisms. In contrast, by utilizing a discontinuous adhesive layer, a supported elastomeric foam in a sealed interface will form a liquid tight seal to the challenge fluid, since the bulk foam is chemically stable in the challenge fluid. Therefore, only discrete sections of adhesive exposed at the edge of the seal will allow for fluid ingress and the bulk elastomeric foam will allow for the adhesive to be protected from the fluid. In accordance with various embodiments, any suitable supported elastomeric foam as described herein may be combined with a surface adhesive for securing the supported elastomeric foam when used to seal an interface. According to some embodiments, supported elastomeric foam can include applied discontinuous adhesive regions, i.e. adhesive "dots," as described above.

In other embodiments not shown in FIG. 2, the supported elastomeric foam may not comprise an inner elastomeric matrix, such that it comprises first and second outer elastomeric matrices, or the foam may comprise a plurality of inner elastomeric matrices, such as at least two inner elastomeric matrices, at least three inner elastomeric matrices, at least four inner elastomeric matrices, at least five inner elastomeric matrices etc., each of which comprise an inner foamed region between at least two inner reinforcement regions. Such further inner elastomeric matrices may be similar to the first inner elastomeric matrix discussed above. In this way, a multilayered supported elastomeric foam may be provided with elastomeric matrices which are stacked to provide a specific thickness to match the size of a particular mechanical interface, by selecting an appropriate number of inner elastomeric matrices comprising inner foamed regions and inner reinforcement regions.

Figure 3:
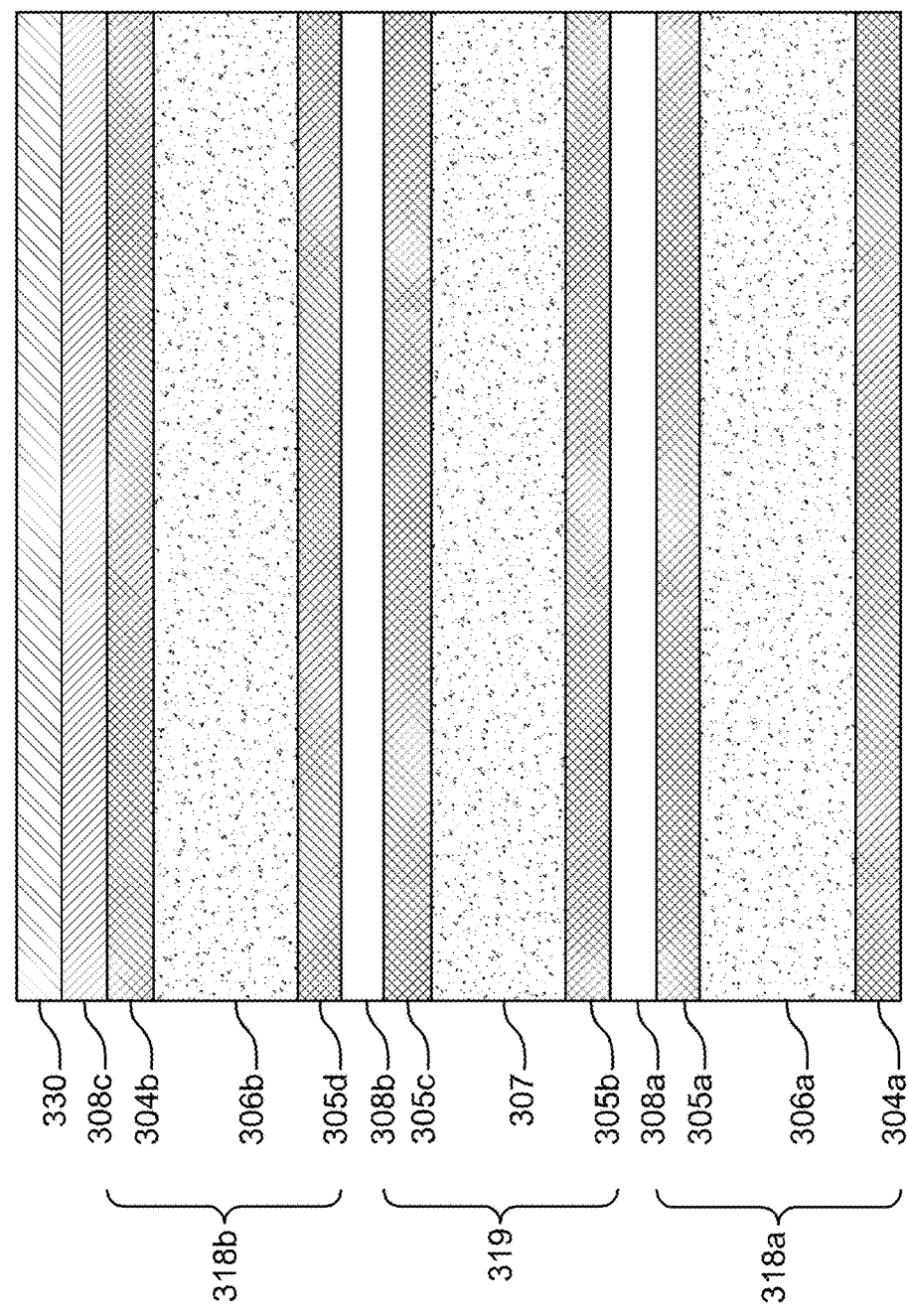
FIG. 3 is a side cross sectional view of an embodiment of the multi-layered supported elastomeric foam having a surface film.

FIG. 3 is a side cross sectional view of an embodiment of multilayered supported elastomeric foam 300, having a first surface layer 330. Three elastomeric matrices are shown 318a, b and 319, each formed from a foamed region 306a, b and 307 and two reinforcement regions 304a, b and 305a-d located on opposite surfaces of the foamed region. Thus, first outer elastomeric matrix 318a is formed from first outer foamed region 306a between first outer reinforcement region 304a and first inner reinforcement region 305a. The first outer reinforcement region 304a and first inner reinforcement region 305a each have a porous layer having an interconnected network of pores at least partially imbibed with the elastomer of the first outer foamed region 306a. Similarly second outer elastomeric matrix 318b is formed from second outer foamed region 306b between second outer reinforcement region 304b and fourth inner reinforcement region 305d. The second outer reinforcement region 304b and fourth inner reinforcement region 305d each have a porous layer having an interconnected network of pores at least partially imbibed with the elastomer of the second outer foamed region 306b. Also shown is a single inner elastomeric matrix 319 formed from inner foamed region 307 between second inner reinforcement region 305b and third inner reinforcement region 305c. The second inner reinforcement region 305b and third inner reinforcement region 305c each have a porous layer having an interconnected network of pores at least partially imbibed with the elastomer of the inner foamed region 307.

In each elastomeric matrix, elastomer penetrates throughout both of the reinforcement regions and throughout the foamed region. The foamed region is expanded by closed-cell, gas-filled voids, similar to the voids described above with reference to FIG. 1. Notably, voids can include voids of different sizes, which may be formed using different foaming agents mixed together with the elastomer. Larger voids can be interspersed with smaller voids. A mixture of large and small voids can be used to promote more complete expansion of the foamed region caused by the arrangement of the large and small voids, which will naturally orient to form in a packed structure as voids interact during expansion. A total thickness of each elastomeric matrix 318a, b, 319 includes respective first and second thicknesses of the first and second reinforcement regions and a third thickness of the foamed region. According to some embodiments, the first and second thicknesses can vary from about 1 µm to 100 µm, e.g. 4 µm to 40 µm or about 34 µm. According to some specific embodiments, the total thickness of each elastomeric matrix 318a, b, 319 can vary from about 100 µm to about 2000 µm.

The first outer elastomeric matrix 318a is bonded to the inner elastomeric matrix 319a by an adhesive region 308a, such as a layer of adhesive between the first and second inner reinforcement regions 305a, b. The inner elastomeric matrix 319 is bonded to the second outer elastomeric matrix 318b by an adhesive region, 308b, such as a layer of adhesive between the third and fourth inner reinforcement regions 305c, d. The first and second elastomeric matrices 318a, b and inner elastomeric matrix 319 may be symmetric or asymmetric, as described above for FIGS. 1 and 2 and their alternative embodiments.

In FIG. 3, a first surface layer 330 is oriented on the second outermost reinforcement region 304b. The first surface layer 330 may be a non-porous surface layer. Preferred non-porous surface layers may be selected from dense polymers, such as dense polyolefins such as BOPP, densified fluoropolymers such as densified ePTFE and metal foils. The first surface layer 330 is preferably a BOPP. An example of such a BOPP surface layer is shown in Example 8. Such a surface layer can provide a low friction surface which acts as a barrier which can inhibit imbibed elastomer leaching from the adjacent second outer reinforcement region 304b and also prevent compounds from the external environment reaching the second outer reinforcement region 304b or underlying second outer foamed region 306b. A multilayered supported elastomeric foam with a low friction surface, such as BOPP is less likely to adhere to a mating surface immediately adjacent to the first surface layer upon installation, and would thus have a lower peel strength. This is advantageous should it be necessary to remove the multilayered supported elastomeric foam from an adjacent mating surface which is in direct contact with the low friction surface layer, for instance for servicing or inspection. The BOPP allows for forming extremely thin barrier films if required. The films are preferentially less than 30 µm in thickness. Barrier films can be preferably made with thicknesses ranging from 0.5 µm to 20 µm. The film may be untreated. Alternatively the film can optionally be pretreated or post treated with chemical etching, plasma treating, corona, roughening or the like to improve bonding to the second outer reinforcement layer 304b.

The bonding of the first surface layer 330 to the second outer reinforcement layer 304b can be achieved via an adhesive region, 308c, such as an adhesive layer. The adhesive may be a silicone adhesive such as ARSEAL 8026 (Adhesives Research, Glen Rock, PA), which can be applied by way of a transfer tape, either by way of firm hand pressure or lamination pressure. Another suitable adhesive is an acrylic adhesive such as 9482PC (3M, St. Paul, MN), which can be applied by way of a transfer tape. A liquid adhesive may also be used, such as a silicone pressure sensitive adhesive with a curing catalyst, which can be applied to a surface of one or both of the first surface layer 330 and second outer reinforcement layer 304b and then cured with heat. Another example of a liquid adhesive is a liquid elastomer, such as a fluoroelastomer or the liquid elastomer used to produce one of the foamed regions, such as that of the second outer foamed region 306b. Also useful as an adhesive is a melt flowable thermoplastic, which may flow under heat. BOPP may be coextruded with a melt-flowable thermoplastic, such that an adhesive may not be required if the melt flowable thermoplastic is provided as a surface layer and heat is applied to render it flowable to adhere to the second outer reinforcement layer.

In other embodiments not shown in FIG. 3, the foam may not comprise an inner elastomeric matrix, such that it comprises first and second outer elastomeric matrices, or the foam may comprise a plurality of inner elastomeric matrices, such as at least two inner elastomeric matrices, at least three inner elastomeric matrices, at least four inner elastomeric matrices, at least five inner elastomeric matrices etc., each of which comprise an inner foamed region between at least two inner reinforcement regions. Such further inner elastomeric matrices may be similar to the first inner elastomeric matrix discussed above. In this way, a multilayered supported elastomeric foam may be provided with elastomeric matrices which are stacked to provide a specific thickness to match the size of a particular mechanical interface, by selecting an appropriate number of inner elastomeric matrices comprising inner foamed regions and inner reinforcement regions.

Figure 4:
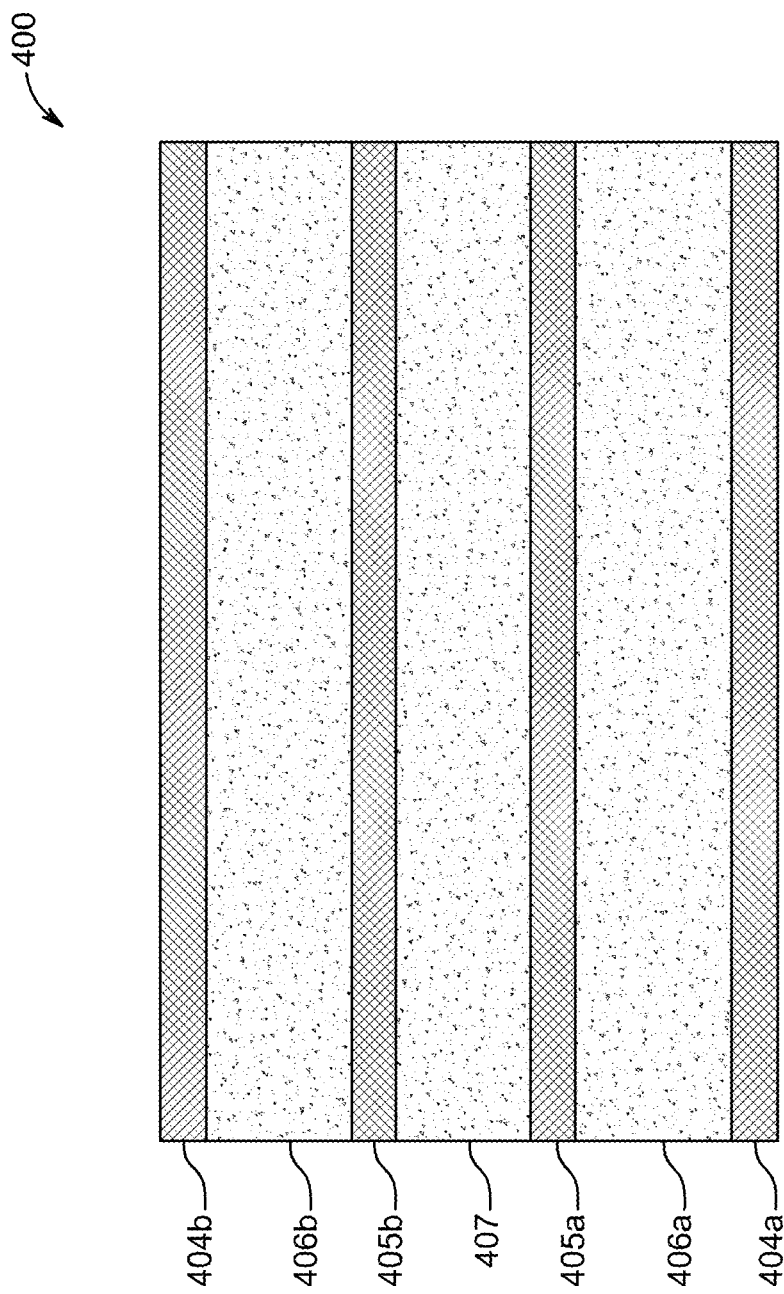
FIG. 4 is a side cross sectional view of an embodiment of the multi-layered supported elastomeric foam as a laminate.

FIG. 4 is a side cross sectional view of an alternative embodiment of multilayered supported elastomeric foam 400, which may be a laminate. The elastomeric foam 400 is a single elastomeric matrix formed of alternating reinforcement regions and foamed regions. The networks of interconnecting pores of the porous layers of first outer reinforcement region 404a and first inner reinforcement region 405a are at least partially imbibed with elastomer from the first outer foamed region 406a. The networks of interconnecting pores of the porous layers of the first and second inner reinforcement regions 405a, b are at least partially imbibed with elastomer from the inner foamed region 407. The networks of interconnecting pores of the porous layers of the second inner reinforcement region 405b and the second outer reinforcement region 404b are at least partially imbibed with the elastomer from the second outer foamed region 406b. Viewed another way, the network of interconnecting pores of the porous layer of the first inner reinforcement region 405a is at least partially imbibed with elastomer of the first outer foamed region 406a and elastomer of the inner foamed region 407. The two elastomers may imbibe the network of interconnecting pores on opposite sides of the porous layer. Similarly, the network of interconnecting pores of the porous layer of the second inner reinforcement region 405b is at least partially imbibed with elastomer of the inner foamed region 407 and the second outer foamed region 406b. The two elastomers may imbibe the network of interconnecting pores on opposite sides of the porous layer. Thus, first and second inner reinforcement regions 405a, b lie between and bond neighboring foamed regions 406a and 407, and 407 and 406b respectively because they are at least partially imbibed with elastomer from the two abutting foamed regions.

It is apparent that the multilayered supported elastomeric foam 400 of FIG. 4 does not require the presence of adhesive regions to bond abutting regions, in contrast to the embodiments of FIGS. 1-3, because the construction of the elastomeric foam 400 of FIG. 4 provides a single elastomeric matrix. In some embodiments, the multilayered supported elastomeric foam 400 is a laminate.

In other embodiments not shown in FIG. 4, the foam is not limited to three foamed regions and 4 reinforcement regions. For instance, the foam may not comprise an inner foamed region, such that it comprises first and second outer foamed regions separated by an inner reinforcement region comprising an inner porous layer having an interconnected network of pores at least partially imbibed with the elastomers from the first and second outer foamed regions. Alternatively, the foam may comprise a plurality of inner foamed regions, with each pair of adjacent inner foamed regions separated by an inner reinforcement region comprising an inner porous layer having an interconnected network of pores at least partially imbibed with the elastomers from abutting foamed regions. For instance, the multilayered supported elastomeric foam may further comprise a second inner foamed region and a third inner reinforcement region and optionally a third inner foamed region and a fourth inner reinforcement region and further optionally a fourth inner foamed region and a fifth inner reinforcement region etc. in which inner foamed regions alternate with inner reinforcement regions. Such further inner foamed regions may be similar to the first inner foamed region discussed above. Similarly, such further inner reinforcement regions may be similar to the first and second inner reinforcement regions discussed above. In this way, a multilayered supported elastomeric foam may be provided with reinforcement and foamed regions to provide a specific thickness to match the size of a particular mechanical interface, by selecting an appropriate number of inner foamed regions and inner reinforcement regions.

The elastomeric foam 400 of FIG. 4 can be obtained as follows. A first porous layer comprising a first interconnected network of pores and a second porous layer comprising a second interconnected network of pores which will become the first and second reinforcement regions in the ultimately formed multilayered supported elastomeric foam (such as first outer reinforcement region 404a and first inner reinforcement region 405a), may be provided or prepared and combined with a first liquid elastomer mixture, which will become the first outer foamed region 406a, in a first process step. In particular, a first liquid elastomer mixture comprising a first elastomer and a first foaming agent may be cast on the first porous layer, such as that forming the first outer reinforcement region 404a, in which a first side of the first porous layer is positioned on a first side of the first liquid elastomer mixture, such that the first liquid elastomer mixture wets the first side of the first porous layer. The first elastomer can then be imbibed into the pores of the first porous layer. The first porous layer can be placed in tension, e.g., within a frame, until the layer adopts a flat, wrinkle-free state before being cast with the first liquid elastomer mixture. A second porous layer, such as that forming the first inner reinforcement layer 405a can be tensioned and then positioned on top of the first liquid elastomer mixture on a second side of the first liquid elastomer mixture opposite to that of the first side of the first liquid elastomer mixture and allowed to wet the first side of the second porous layer. The first elastomer can then be imbibed into the pores of the second porous layer. Thus, the first liquid elastomer mixture is cast on the first and second tensioned porous layers in a similar manner to that of FIG. 1.

A second liquid mixture of a second elastomer and a second foaming agent can then be cast on the second porous layer (such as first inner reinforcement region 405a) to position a second side of the second porous layer, which second side is opposite that of the first side of the second porous layer, on a first side of the second liquid mixture, such that the second liquid mixture wets the second side of the second porous layer, in a second process step. The second elastomer can then be imbibed into the pores of the second porous layer. A third porous layer comprising an interconnected network of pores, such as that forming the second inner reinforcement layer 405b can be tensioned and then positioned on top of the second liquid elastomer mixture on a second side of the second liquid elastomer mixture opposite to that of the first side of the second liquid elastomer mixture and allowed to wet the first side of the third porous layer, in a third process step. The second elastomer can then be imbibed into the pores of the third porous layer.

A third liquid mixture of a third elastomer and a third foaming agent can then be cast on the third porous layer (such as second inner reinforcement region 405b) to position a second side of the third porous layer, which second side is opposite that of the first side of the third porous layer, on a first side of the third liquid mixture, such that the third liquid mixture wets the second side of the third porous layer, in a fourth process step. The third elastomer can then be imbibed into the pores of the third porous layer. A fourth porous layer comprising an interconnected network of pores, such as that forming the second outer reinforcement layer 404b can be tensioned and then positioned on top of the third liquid elastomer mixture on a second side of the third liquid elastomer mixture opposite to that of the first side of the third liquid elastomer mixture and allowed to wet the first side of the fourth porous layer in a fifth porous step. The third elastomer can then be imbibed into the pores of the fourth porous layer.

The first, second and third foaming agents can then be activated to create a plurality of closed gas-filled cells in each liquid mixture. This may be a first, foaming heating cycle to activate the first, second and third foaming agents in a sixth process step. The specific parameters of the foaming heating cycle can also impact the final thickness of the composition as discussed for the process of FIG. 1. According to some embodiments, the first, foaming heating cycle can at least partially cure the elastomers. In some embodiments, various parameters of the foaming heating cycle can be adjusted to maintain at least a degree of mobility in the partially cured elastomer during the foaming process, in order to avoid cracking, deformation, or other issues.

In one embodiment, once the first, second and third liquid elastomer mixtures have been expanded via the embedded first, second and third foaming agents, the first, second and third elastomers can be cured to form first, second, third and fourth reinforcement regions that include the first, second, third and fourth porous layers respectively (such as first outer, first inner, second inner and second outer reinforcement regions 404a, 405a, 405b, 404b) and first, second and third foamed regions each containing the plurality of gas-filled cells (such as first outer foamed region 406a, first inner foamed region 407 and second outer foamed region 406b) therebetween, in a seventh process step. Depending on the specific first, second and third foaming agents and first, second and third liquid elastomers chosen, the curing step may not require temperatures above room temperature. However, in some cases, the curing step may require a different action as dictated by the specific elastomer, such as UV exposure. According to some embodiments, the curing step can include heating the liquid mixtures to a curing temperature of approximately 75° C. to 125° C. for 5 to 180 minutes.

Figure 5:
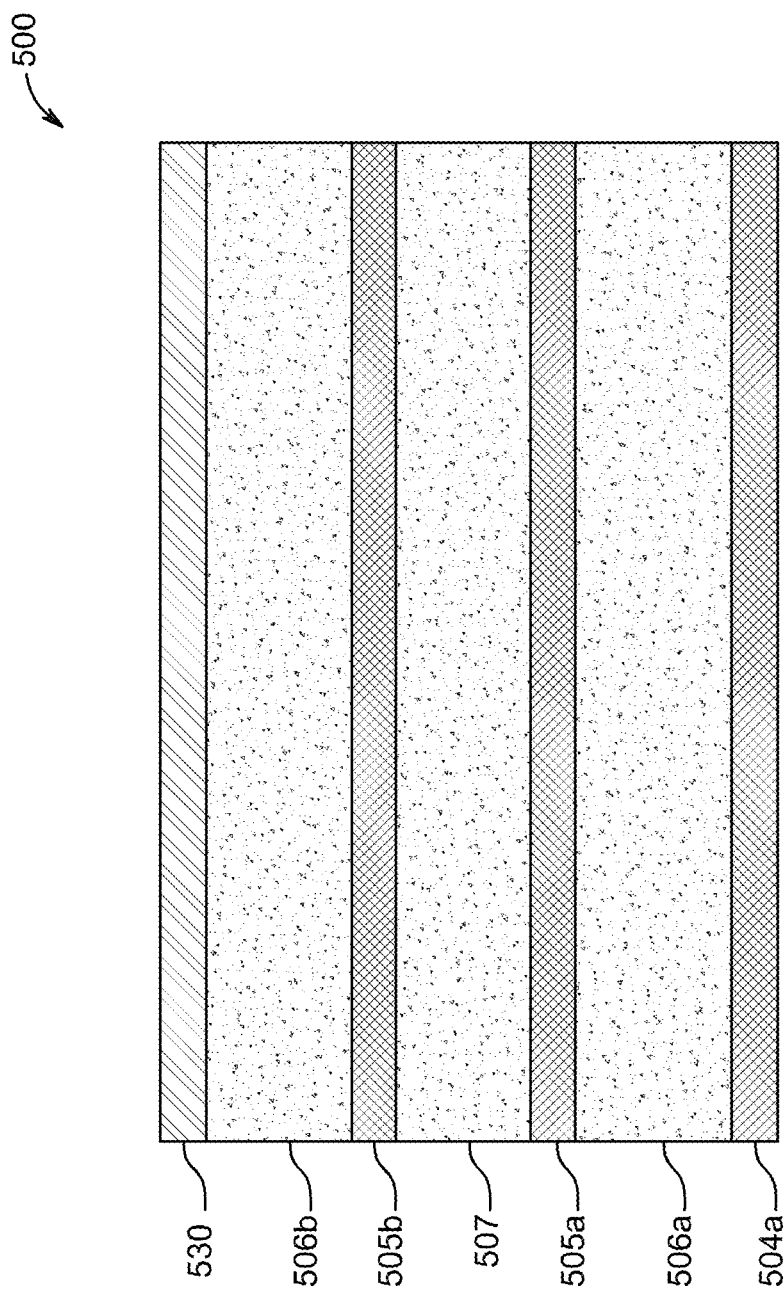
FIG. 5 is a side cross sectional view of an embodiment of the multi-layered supported elastomeric foam as a laminate having a surface film.

FIG. 5 is a side cross sectional view of an embodiment of multilayered supported elastomeric foam 500, having a first surface layer 530. The elastomeric foam 500 is a single elastomeric matrix comprising alternating reinforcement regions and foamed regions. This can be carried out in a similar manner to the process described in the discussion of FIG. 4. The interconnected network of pores of the porous layer of first outer reinforcement region 504a is at least partially imbibed with elastomer from the first outer foamed region 506a. The interconnected network of pores of the porous layer of the first inner reinforcement region 505a is at least partially imbibed with elastomer from the first outer foamed region 506a and the first inner foamed region 507. The interconnected network of pores of the porous layer of the second inner reinforcement region 505b is at least partially imbibed with the elastomer from the second outer foamed region 506b and the first inner foamed region 507. Thus, first and second inner reinforcement regions 505a, b lie between and bond neighboring foamed regions 506a and 507, and 507 and 506b because they are at least partially imbibed with elastomer from the abutting foamed regions.

The supported elastomeric foam 500 may be symmetric or asymmetric, as described above for FIGS. 1 and 2 and their alternative embodiments. In particular, the first and second outer foamed regions 506a, b and the inner foamed region 507 may be independently the same or different. For instance, the foamed regions may be formed of the same elastomer with same cell structure or may be formed of different elastomers and/or have different cell structures. Similarly, the first outer reinforcement region 504a and the first and second inner reinforcement regions 505a, b may be independently the same or different. For instance, the porous layers of the reinforcement regions may be formed of the same material with the same pore size or may be formed from different materials and/or have different pore sizes.

In FIG. 5, a first surface layer 530 is oriented on the second outer foamed region 506b. The first surface layer 530 may be selected from the same materials as the first surface layer of FIG. 3. The first surface layer 530 is preferably a densified expanded fluoropolymer, such as densified ePTFE. The first surface layer 530 may be laminated to the second outer foamed region 506b, for instance by one or both of heat and pressure. Alternatively, in an embodiment not shown in FIG. 5, the first surface layer 530 may be secured to the second outer foamed region 506b by one or more adhesive regions, such as an adhesive layer. Examples of such adhesives are provided for the attachment of the first surface layer to the first foamed region in the discussion of FIG. 3.

In other embodiments not shown in FIG. 5, the supported elastomeric foam is not limited to three foamed regions and three reinforcement regions. For instance, the foam may not comprise an inner foamed region, such that it comprises first and second outer foamed regions separated by an inner reinforcement region comprising an inner porous layer having an interconnected network of pores at least partially imbibed with the elastomers and a first outer reinforcement region. Alternatively, the foam may comprise a plurality of inner foamed regions, with each pair of adjacent inner foamed regions separated by an inner reinforcement region comprising an inner porous layer having an interconnected network of pores at least partially imbibed with the elastomers. For instance, the multilayered supported elastomeric foam may further comprise a second inner foamed region and a third inner reinforcement region and optionally a third inner foamed region and a fourth inner reinforcement region and further optionally a fourth inner foamed region and a fifth inner reinforcement region etc. in which inner foamed regions alternate with inner reinforcement regions. Such further inner foamed regions may be similar to the first inner foamed region discussed above. Similarly, such further inner reinforcement regions may be similar to the first and second inner reinforcement regions discussed above. In this way, a multilayered supported elastomeric foam may be provided with reinforcement and foamed regions to provide a specific thickness to match the size of a particular mechanical interface, by selecting an appropriate number of inner foamed regions and inner reinforcement regions.

According to some embodiments, the multilayered supported elastomeric foam can be stacked together with additional elements, such as stiffening layers, spacers, washers, etc.

Figure 6:
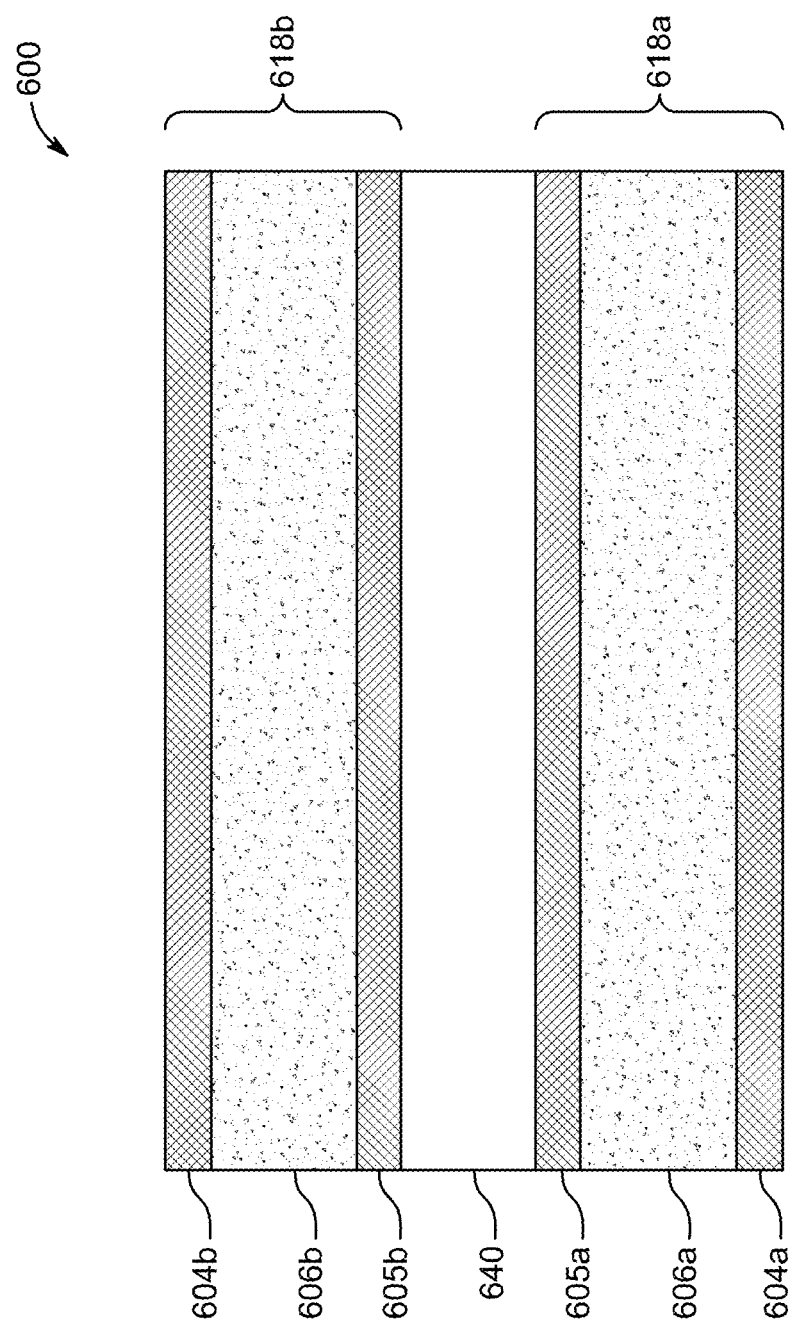
FIG. 6 is a side cross sectional view of an embodiment of the multi-layered supported elastomeric foam containing a stiffening center layer.

FIG. 6 is a side cross sectional view of an embodiment of multilayered supported elastomeric foam 600, having a first stiffening region 640, such as a first stiffening region layer. The elastomeric foam 600 comprises first and second outer elastomeric matrices each formed from an outer foamed region 606a, b and two reinforcement regions 604a, b and 605a, b located on opposite surfaces of the foamed region. Thus, outer elastomeric matrices 618a, b provide a first outer elastomeric matrix 618a being formed from first outer foamed region 606a between first outer reinforcement region 604a and first inner reinforcement region 605a. The first outer reinforcement region 604a and first inner reinforcement region 605a each have an interconnected network of pores at least partially imbibed with the elastomer of the first outer foamed region 606a. Similarly second outer elastomeric matrix 618b is formed from second outer foamed region 606b between second outer reinforcement region 604b and second inner reinforcement region 605b. The second outer reinforcement region 604b and second inner reinforcement region 605d each have an interconnected network of pores at least partially imbibed with the elastomer of the second outer foamed region 606b.

The elastomeric foam 600 may be symmetric or asymmetric, as described above for FIGS. 1 and 2 and their alternative embodiments. In particular, the first and second outer foamed regions 606a, b may be independently the same or different. For instance, the first and second outer foamed regions 606a, b may be formed of the same elastomer with same cell structure or may be formed of different elastomers and/or have different cell structures. Similarly, the first and second outer reinforcement regions 604a, b and the first and second inner reinforcement regions 605a, b may be independently the same or different. For instance, the porous layers of the reinforcement regions may be formed of the same material with the same pore size or may be formed from different material and/or have different pore sizes.

Also shown in FIG. 6 is a first stiffening region 640. The first stiffening region 640 is oriented between the first and second outer elastomeric matrices 618a, b. Specifically, the first stiffening region 640 may be located between the first and second inner reinforcement regions 605a, b. The first stiffening region 640 may be selected from porous stiff polymers, non-porous stiff polymers, such as modified tetrafluoroethylene polymers (TFM) and metals. The porous stiff polymers may be woven or non-woven stiff polymers, such as those made of PEEK, particularly PEEK fibers, and may be unimbibed with elastomer, or may be imbibed with elastomer. As used herein, the term "stiff" is intended to represent materials which exhibit a compression of less than 25% when placed under a stress of less than or equal to 100 MPa, particularly a stress of from 10 to 100 MPa.

The bonding of the first stiffening region 640 to the first and second inner reinforcement regions 605a, b can be achieved via lamination, for instance with one or both of heat and pressure. Alternatively, in an embodiment not shown in FIG. 6, the bonding may be achieved by one or more adhesive regions, such as one or more adhesive layers. One suitable adhesive is a silicone adhesive such as ARSEAL 8026 (Adhesives Research, Glen Rock, PA), which can be applied by way of a transfer tape, either by way of firm hand pressure or lamination pressure. Another suitable adhesive is an acrylic adhesive such as 9482PC (3M, St. Paul, MN), which can be applied by way of a transfer tape. A liquid adhesive may also be used, such as a silicone pressure sensitive adhesive with a curing catalyst, which can be applied to a surface of one or both of the inner reinforcement regions 605a, b and then cured with heat. Alternatively, the elastomer used to form the foamed regions and to imbibe the porous layers of the reinforcement regions may also be used as an adhesive, and is another example of a liquid elastomer. In an alternative embodiment, rather than using an adhesive or equivalent to attach the first stiffening region 640 to the first and second inner reinforcement regions 605a,

*b*, a fastening means may be used. For instance, one or more through-holes may be provided through the first and second outer elastomeric matrices 618*a, b* and first stiffening region 640, for instance in a direction orthogonal to the plane of the first and second outer reinforcement regions 604*a, b* and the first and second inner reinforcement regions 605*a, b* and the first and second outer foamed regions 606*a, b* and first stiffening region 640, allowing the first and second outer elastomeric matrices 618*a, b* and the first stiffening region 640 to be attached by fastening means, such as a nut and bolt.

In some embodiments, the stiffening region can be shaped. For instance, the stiffening region may be discontinuous, such that two or more stiffening regions may be present separated by cavities and/or the stiffening region may be continuous such that one or more stiffening regions may independently contain one or more cavities The cavities between two or more stiffening regions or within one or more stiffening regions may be unfilled, or may be filled. The cavities may be filled with further components, such as reinforcement and foamed regions, such as one or more elastomeric matrices of the types already described or an electronic component. Examples of such embodiments are discussed in relation to FIGS. 7-12 below. The embodiments of FIGS. 7-11 provide a portion of the cavities between the stiffening regions filled with elastomeric matrices. The embodiment of FIG. 12 shows a cavity between stiffening regions containing an electronic component. When cavities either within a stiffening region or between stiffening regions are unfilled, the adjacent reinforcement regions and foamed regions (e.g. those lying above and below the plane of the reinforcement regions), such as adjacent elastomeric matrices, may conform around the stiffening regions to fill and seal the cavity, as shown in the embodiment of FIG. 12. In all cases, the interface between the stiffening region and adjacent reinforcement or foamed regions can be optionally joined with adhesive and/or attached by a fastening means. Similarly, if the cavities are filled with additional components, such as reinforcement or foamed regions, the interface between the additional components and adjacent reinforcement or foamed regions can be optionally joined with adhesive and/or attached by a fastening means.

In other embodiments not shown in FIG. 6, the supported elastomeric foam may comprise one or more inner elastomeric matrices, such as at least two inner elastomeric matrices, at least three inner elastomeric matrices, at least four inner elastomeric matrices, at least five inner elastomeric matrices etc., each of which comprise an inner foamed region between at least two inner reinforcement regions. Such further inner elastomeric matrices may be similar to the first inner elastomeric matrix discussed for the embodiment of FIG. 2 above. In this way, a multilayered supported elastomeric foam may be provided with elastomeric matrices which are stacked to provide a specific thickness to match the size of a particular mechanical interface, by selecting an appropriate number of inner elastomeric matrices comprising inner foamed regions and inner reinforcement regions. Similarly, the supported elastomeric foam may comprise at least two stiffening regions, such as at least three stiffening regions, at least four stiffening regions, at least five stiffening regions etc. Each stiffening region may be situated between two elastomeric matrices, such as between an inner elastomeric matrix and an outer elastomeric matrix for a second stiffening region and between two inner elastomeric matrices for a third or further stiffening region.

Figure 7:
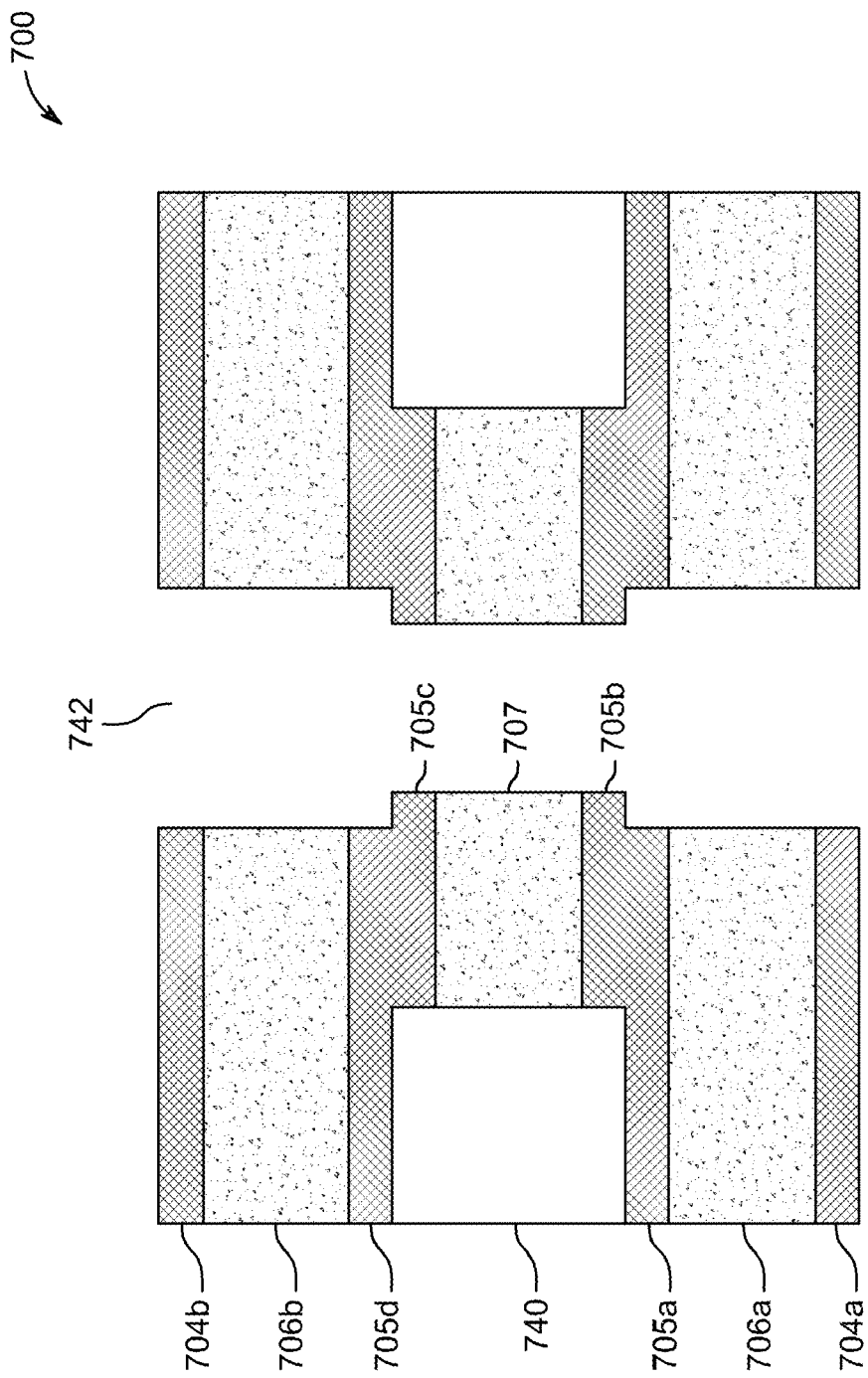
FIG. 7 is a side cross sectional view of an embodiment of the multi-layered supported elastomeric foam containing a stiffening center layer and a bore for a fastener shank.
Figure 8:
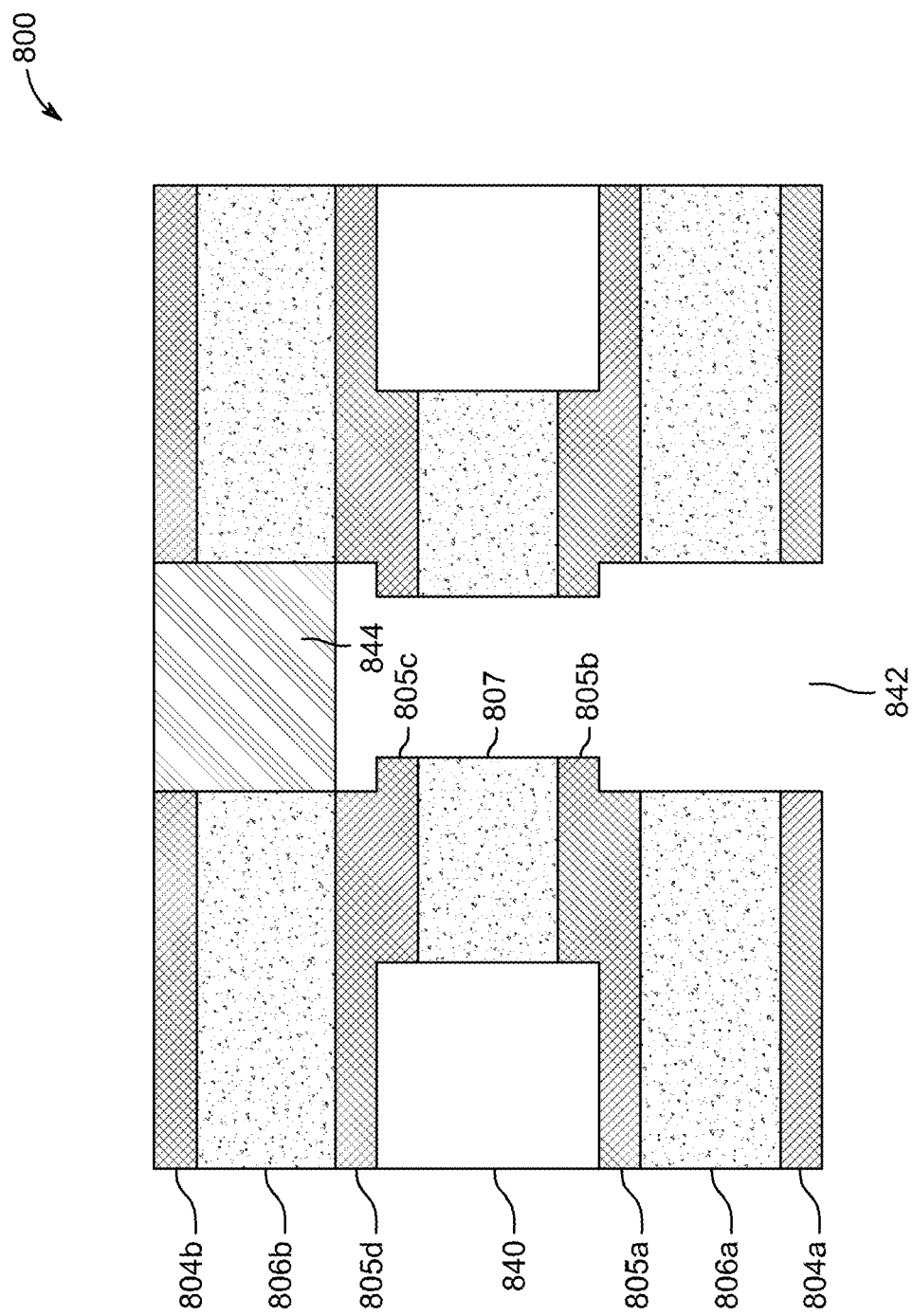
FIG. 8 is a side cross sectional view of an embodiment of the multi-layered supported elastomeric foam containing a stiffening center layer for a fastener shank.
Figure 9:
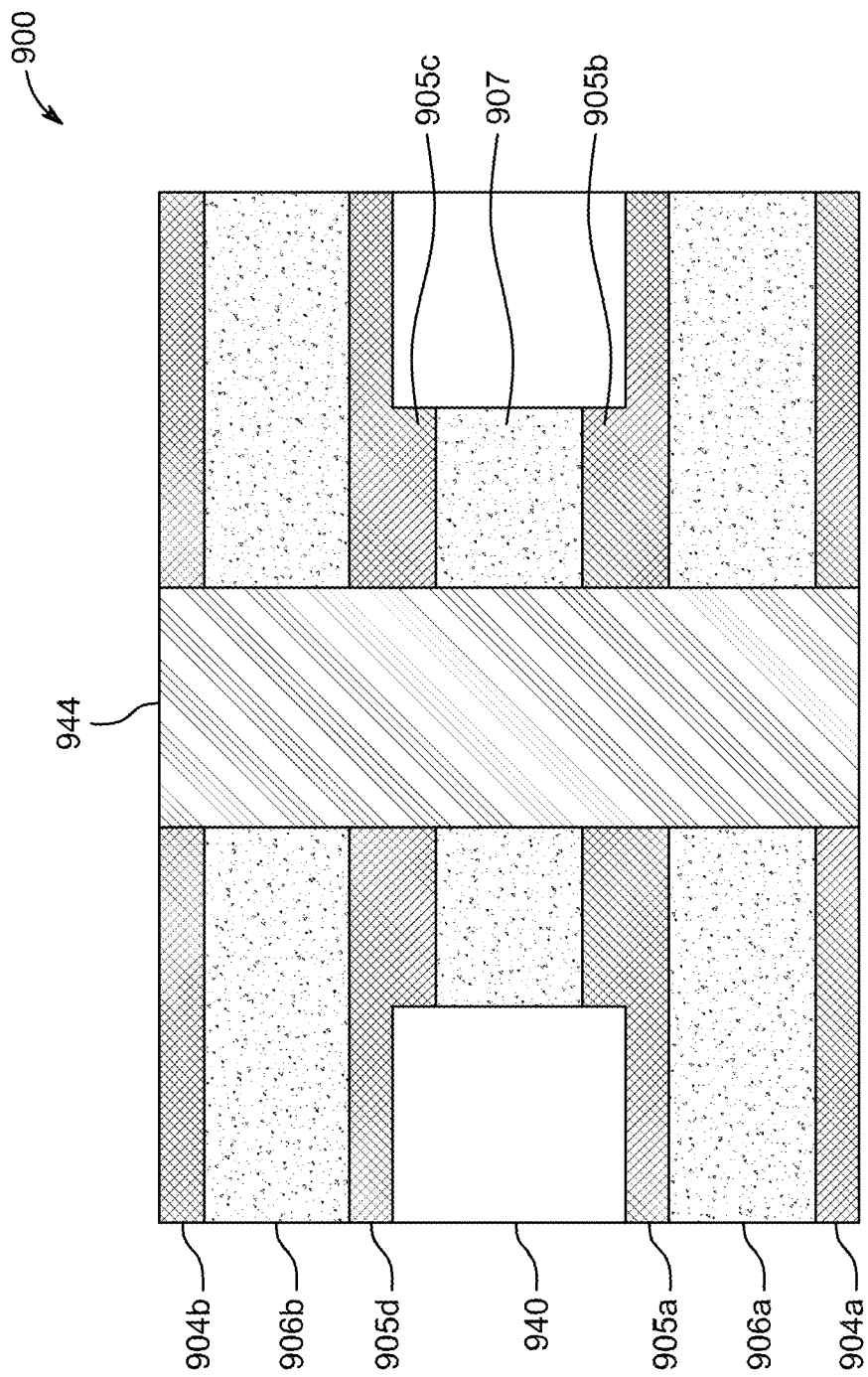
FIG. 9 is a side cross sectional view of another embodiment of the multi-layered supported elastomeric foam containing a stiffening center layer for a fastener shank.

FIGS. 7-9 show cross sectional views of a multilayered supported elastomeric foam 700, 800, 900 comprising three elastomeric matrices including one or more stiffening regions 740, 840, 940. Three elastomeric matrices may be bonded together with two or more adhesive regions (not shown). The three elastomeric matrices may comprise first and second outer elastomeric matrices and an inner elastomeric matrix.

The first outer elastomeric matrix comprises first outer foamed region 706*a*, 806*a*, 906*a* comprising a plurality of gas filled cells defined by elastomer between first outer reinforcement region 704*a*, 804*a*, 904*a* and first inner reinforcement region 705*a*, 805*a*, 905*a*. The first outer reinforcement region 704*a*, 804*a*, 904*a* and first inner reinforcement region 705*a*, 805*a*, 905*a* each comprise a porous layer having an interconnected network of pores at least partially imbibed with the elastomer of the first outer foamed region 706*a*, 806*a*, 906*a*. The first and second outer elastomeric matrices are provided with an opening 742, 842, 942, extending through the first outer reinforcement region 704*a*, 804*a*, 904*a*, the first outer foamed region 706*a*, 806*a*, 906*a* and first inner reinforcement region 705*a*, 805*a*, 905*a* and the second outer reinforcement region 704*b*, 804*b*, 904*b*, the second outer foamed region 706*b*, 806*b*, 906*b* and fourth inner reinforcement region 705*d*, 805*d*, 905*d*. The opening is sized to contain the shaft 844, 944 of a fastening means and the shaft of the fastening means is shown occupying the opening in the second outer elastomeric matrix in FIG. 8, and fully occupying the opening in the first and second outer elastomeric matrices and the first inner elastomeric matrix in FIG. 9.

The first inner elastomeric matrix comprises first inner foamed region 707, 807, 907 comprising a plurality of gas filled cells defined by elastomer between second inner reinforcement region 705*b*, 805*b*, 905*b* and third inner reinforcement region 705*c*, 805*c*, 905*c*. The second inner reinforcement region 705*b*, 805*b*, 905*b* and third inner reinforcement region 705*c*, 805*c*, 905*c* each comprise a porous layer having an interconnected network of pores at least partially imbibed with the elastomer of the first inner foamed region 707, 807, 907. The first inner elastomeric matrix is provided with one or more stiffening regions 740, 840, 940, extending through the second inner reinforcement region 705*b*, 805*b*, 905*b*, the first inner foamed region 707, 807, 907 and third inner reinforcement region 705*c*, 805*c*, 905*c*. The one or more stiffening regions 740, 840, 940 may be surrounding hole 742, 842, 942 which accommodates the shank 844, 944 of the fastening means. However, the one or more stiffening regions 740, 840, 940 need not be in contact with hole 742, 842, 942, such that the inner elastomeric matrix forms the lumen of the hole. The stiffening region may have any suitable cross-section, such as circular, polygonal etc. Preferably the one or more stiffening regions have the shape of an annular tube in which the annular hole accommodates the shank of the fastening means. The first and second inner reinforcement regions 705*a, b*, 805*a, b*, 905*a, b* of the respective first outer and first inner elastomeric matrices may be bonded together by one or more adhesive regions (not shown).

The second outer elastomeric matrix is provided with an opening, extending through the second outer reinforcement region 704*b*, 804*b*, 904*b*, the second outer foamed region 706*b*, 806*b*, 906*b* and the fourth inner reinforcement region 705*d*, 805*d*, 905*d*. The opening is sized to contain the shaft 844, 944 of a fastening means. The third and fourth inner reinforcement regions 705*c, d*, 805*c, d*, 905*c, d* of the respective first inner and second outer elastomeric matrices may be bonded together by one or more adhesive regions (not shown).

The holes in the first and second outer elastomeric matrices and inner elastomeric matrix are co-axial to allow the shaft of the fastening means to pass through the multilayered supported elastomeric foam 700, 800, 900. In the embodiment of FIGS. 7-9, the one or more stiffening regions 740, 840, 940 do not contact the hole 742, 842, 942, but are located within the first inner elastomeric matrix, such that portions of the second and third inner reinforcement regions 705$b$, $c$, 805$b$, $c$, 905$b$, $c$ and inner foamed region 707, 807, 907 lie between the one or more stiffening regions 740, 840, 940 and the hole. To put this another way, the cavities between the one or more stiffening regions 740, 840, 940 are partially filled by the first inner elastomeric matrix comprising second and third inner reinforcement regions 705$b$, $c$, 805$b$, $c$, 905$b$, $c$ and inner foamed region 707, 807, 907. The cavity also contains the hole 742, 842, 942, located within the first inner elastomeric matrix. The inner elastomeric matrix which contains the one or more stiffening regions can be configured with a hole of narrower diameter than the diameter of the shank 844, 944 of the fastening means, to provide an interference fit between the shank 844, 944 and the second and third inner reinforcement regions 705$b$, $c$, 805$b$, $c$, 905$b$, $c$ and inner foamed region 707, 807, 907 to improve the sealing properties of the foam 700, 800, 900.

The multilayered supported elastomeric foam 700 may be manufactured as follows. In a first step, a first outer elastomeric matrix is provided. The first outer elastomeric matrix can be pre-formed as discussed herein. The first outer elastomeric matrix is provided with an opening 742, 842, extending through the first outer reinforcement region 704$a$, the first outer foamed region 706$a$ and first inner reinforcement region 705$a$. The opening 742 may be provided by drilling, punching or any other suitable means. The opening 742 may be created once the first outer elastomeric matrix has been formed, or formed in each of the individual regions 704$a$, 706$a$, 705$a$ and aligned during the manufacture of the first outer elastomeric matrix.

In a second step, a first inner elastomeric matrix is provided. The first inner elastomeric matrix can be pre-formed as discussed herein, with the introduction of one or more reinforcement regions 740. The one or more reinforcement regions may be introduced into the first inner elastomeric matrix by forming one or more holes through the first inner elastomeric matrix to fit the one or more reinforcement regions and inserting the one or more reinforcement regions into the one or more holes, such as annular holes, optionally with the application of adhesive to one or both of the one or more reinforcement regions and the sides of the one or more holes to secure the one or more reinforcement regions. The first inner elastomeric matrix is provided with an opening 742 extending through the second inner reinforcement region 705$b$, the first inner foamed region 707 and third inner reinforcement region 705$c$. The opening 742 may be provided by drilling, punching or any other suitable means. The opening 742 may be created once the first inner elastomeric matrix has been formed, or created in each of the individual regions 705$b$, $c$, 707 and aligned during the manufacture of the first inner elastomeric matrix. The opening in the first inner elastomeric matrix is of smaller diameter to that of the first and second outer elastomeric matrices.

In an optional third step, adhesive can be applied to one or both free surfaces of the first inner reinforcement region 705$a$ of the first outer elastomeric matrix and optionally one or more reinforcement regions 740 and of the second inner reinforcement region 705$b$ of the first inner elastomeric matrix to provide an adhesive region to bond the first outer elastomeric matrix to the first inner elastomeric matrix (not shown).

In a fourth step, the first inner reinforcement region 705$a$ of the first outer elastomeric matrix is contacted with the second inner reinforcement region 705$b$ of the first inner elastomeric matrix such that the holes in the first outer and first inner elastomeric matrices are aligned to bond the first outer and first inner elastomeric matrices.

In a fifth step, a second outer elastomeric matrix can be provided. The second outer elastomeric matrix 700 can be pre-formed as discussed herein. The second outer elastomeric matrix is provided with an opening 742, extending through the second outer reinforcement region 704$b$, the second outer foamed region 706$b$ and the fourth inner reinforcement region 705$d$. The opening 742 may be provided by drilling, punching or any other suitable means. The opening 742 may be created once the second inner elastomeric matrix has been formed, or created in each of the individual regions 704$b$, 705$d$, 706$b$ and aligned during the manufacture of the second inner elastomeric matrix. The opening in the second inner elastomeric matrix can be the same diameter to that of the first outer elastomeric matrix In an optional sixth step, adhesive can be applied to one or both free surfaces of the third inner reinforcement region 705$c$ of the first inner elastomeric matrix and optionally one or more reinforcement regions 740 and fourth inner reinforcement region 705$d$ of the second outer elastomeric matrix to provide an adhesive region (not shown) to bond the first inner elastomeric matrix to the second outer elastomeric matrix.

In a seventh step, a second outer elastomeric matrix is contacted with to the first inner elastomeric matrix to provide multilayered supported elastomeric foam 700.

Whilst a single opening 742 is shown in the multilayered supported elastomeric foam 700, more than one opening may be present, such as a plurality of openings, preferably, two or more, three or more, four or more, five or more, six or more etc. The number of openings to be provided can be determined by the nature of the interface to be sealed. For instance, six or more such openings may be provided for fastening means. The openings may be symmetrically distributed across the multilayered supported elastomeric foam 700. For instance, the openings may be evenly distributed around the circumference of a circle.

In an alternative embodiment, rather than applying layers of adhesive between one or both free surfaces of the first inner reinforcement region 705$a$ of the first outer elastomeric matrix and the second inner reinforcement region 705$b$ of the first inner elastomeric matrix (and optionally one or more reinforcement regions 740) and one or both free surfaces of the third inner reinforcement region 705$c$ of the first inner elastomeric matrix and fourth inner reinforcement region 705$d$ of the second outer elastomeric matrix (and optionally one or more reinforcement regions 740), one or more fastening means can be used to attach the first and second outer elastomeric matrices, inner elastomeric matrix, and one or more reinforcement regions 740 by inserting the shank of a fastener through the through-holes shown by one or more openings 742 as discussed below.

In an alternative embodiment, the multilayered supported elastomeric foam may be provided as an integral composite in which a single inner reinforcement region is provided between adjacent foamed regions. In this construction, all but one of the porous layers of the reinforcement regions can be provided with a layer of liquid elastomer and allowed to become imbibed with elastomer before each subsequent porous layer and elastomer coating is added on top to form a stack, as described above for the final aspect of the Summary of Invention. With regard to the introduction of the one or more reinforcement regions, the one or more reinforcement regions may be applied to the liquid elastomer forming the first inner foamed region and pressed into place to allow the one or more reinforcement regions to become imbibed with the liquid elastomer before it is foamed and cured. The final porous layer to form the second outer reinforcement region can then be laid on top of the liquid elastomer which is to form the second outer foamed region to provide the order of reinforcement and foamed regions shown in FIG. 7 and the stack can then be cured to provide the multilayered supported elastomeric foam. The first inner foamed region is formed around the one or more reinforcement regions upon foaming and curing of the entire stack.

In other embodiments not shown in FIGS. 7-9, the supported elastomeric foam may comprise two or more inner elastomeric matrices, such as at least three inner elastomeric matrices, at least four inner elastomeric matrices, at least five inner elastomeric matrices etc., each of which comprise an inner foamed region between at least two inner reinforcement regions. Such further inner elastomeric matrices may be similar to the first inner elastomeric matrix discussed above. In this way, a multilayered supported elastomeric foam may be provided with elastomeric matrices which are stacked to provide a specific thickness to match the size of a particular mechanical interface, by selecting an appropriate number of inner elastomeric matrices comprising inner foamed regions and inner reinforcement regions. Similarly, the supported elastomeric foam may comprise at least two stiffening regions, such as at least three stiffening regions, at least four stiffening regions, at least five stiffening regions etc. Each stiffening region may be inserted into one of the inner elastomeric matrices as discussed above for the first inner elastomeric matrix. The addition of further stiffening regions can be used to reduce the compressibility of the supported elastomeric foam.

FIG. 8 is a cross sectional view of a multilayered supported elastomeric foam 800 of the embodiment of FIG. 7 showing the partial insertion of the shank 844 of the fastening means into the hole 842 of the foam. The shank 844 is sized appropriately for the hole in the first and second outer elastomeric matrices. For instance, for a cylindrical shank 844, the diameter of the hole 842 in the first and second outer elastomeric matrices may be the diameter of the shank. However, it can be seen that the hole in the first inner elastomeric matrix is of a narrower diameter than the shank 844.

FIG. 9 is a cross sectional view of a multilayered supported elastomeric foam 900 of the embodiment of FIGS. 7 and 8 showing the fully inserted shank 944 of the fastening means into the foam. From a comparison with FIG. 8, it can be seen that the second and third inner reinforcement regions 905b, c and first inner foamed region 907 of the inner elastomeric matrix have been compressed by the shank, which has a diameter wider than that of the hole of the inner elastomeric matrix. The second and third inner reinforcement regions 905b, c and first inner foamed region 907 of the inner elastomeric matrix are compressed against the shank 944 to provide an interference fit and fluid-tight seal.

Figure 10:
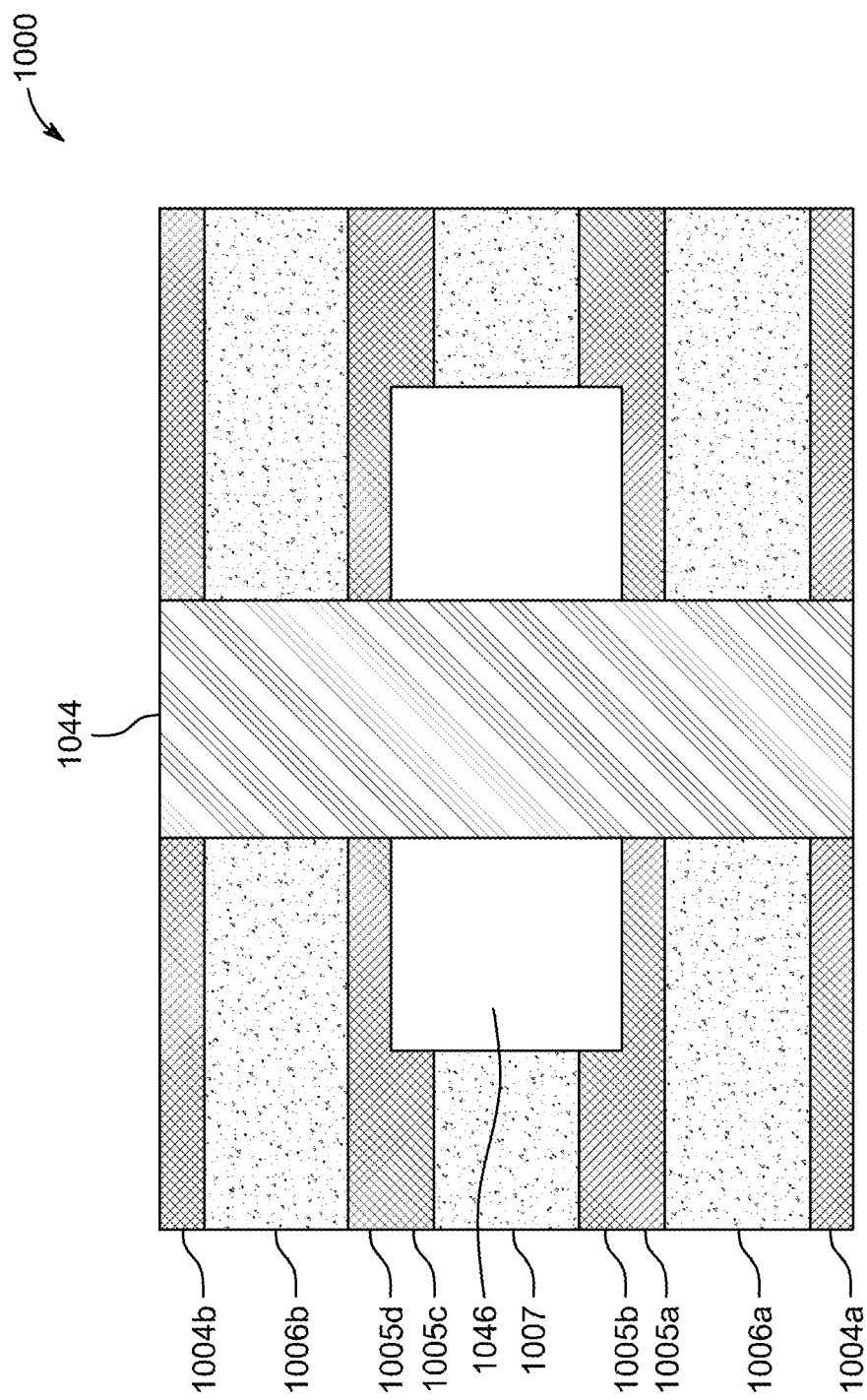
FIG. 10 is a side cross sectional view of an embodiment of the multi-layered supported elastomeric foam containing a washer insert for a fastener shank.

FIG. 10 is a cross sectional view of a multilayered supported elastomeric foam 1000, such as a gasket. The multilayered supported elastomeric foam 1000 comprises three elastomeric matrices including a stiffening region such as a washer 1046. FIG. 10 further shows the presence of a fastening means shank 1044. Three elastomeric matrices may be bonded together with two or more adhesive regions (not shown). The three elastomeric matrices may comprise first and second outer elastomeric matrices and an inner elastomeric matrix. Alternatively, the three elastomeric matrices may be attached not by two or more adhesive regions but by fastening means comprising the fastener shank 1044.

The first outer elastomeric matrix comprises first outer foamed region 1006a comprising a plurality of gas filled cells defined by elastomer between first outer reinforcement region 1004a and first inner reinforcement region 1005a. The first outer reinforcement region 1004a and first inner reinforcement region 1005a each comprise a porous layer having an interconnected network of pores at least partially imbibed with the elastomer of the first outer foamed region 1006a. The first outer elastomeric matrix is provided with an opening, extending through the first outer reinforcement region 1004a, the first outer foamed region 1006a and first inner reinforcement region 1005a. The opening is sized to contain the shaft of a fastening means and the shaft 1044 of the fastening means is shown occupying the opening in FIG. 10.

The first inner elastomeric matrix comprises first inner foamed region 1007 comprising a plurality of gas filled cells defined by elastomer between second inner reinforcement region 1005b and third inner reinforcement region 1005c. The second inner reinforcement region 1005b and third inner reinforcement region 1005c each comprise a porous layer having an interconnected network of pores at least partially imbibed with the elastomer of the first inner foamed region 1007. The first inner elastomeric matrix is provided with a stiffening region 1046, extending through the second inner reinforcement region 1005b, the first inner foamed region 1007 and third inner reinforcement region 1005c. The stiffening region 1046 may be a washer which accommodates the shank 1044 of the fastening means. The stiffening region may have any suitable cross-section, such as circular, polygonal etc. Preferably the stiffening region has the shape of an annular tube in which the annular hole accommodates the shank of the fastening means. To put this another way, the cavity beyond the outer perimeter of the stiffening region 1046 in the plane of the stiffening region is filled by the first inner elastomeric matrix comprising second and third inner reinforcement regions 1005b, c, and inner foamed region 1007. The first and second inner reinforcement regions 1005a, b of the respective first outer and first inner elastomeric matrices may be bonded together by one or more adhesive regions (not shown). In this embodiment the stiffening region 1046, which may be a washer, would be present under the head of the fastening means as the fastener shank passes through the cavity in the stiffening region. This configuration provides an improvement in the load retention of the multilayered supported elastomeric foam 1000.

The second outer elastomeric matrix comprises a second outer foamed region 1006b comprising a plurality of gas filled cells defined by elastomer between second outer reinforcement region 1004b and fourth inner reinforcement region 1005d. The second outer reinforcement region 1004b and fourth inner reinforcement region 1005d each comprise a porous layer having an interconnected network of pores at least partially imbibed with the elastomer of the second outer foamed region 1006b. The second outer elastomeric matrix is provided with an opening, extending through the second outer reinforcement region 1004b, the second outer foamed region 1006b and the fourth inner reinforcement region 1005d. The opening is sized to contain the shaft of a fastening means and the shaft 1044 of the fastening means is shown occupying the opening in FIG. 10. The third and fourth inner reinforcement regions 1005c, d of the respective first inner and second outer elastomeric matrices may be bonded together by one or more adhesive regions (not shown). It is apparent that the holes in the first and second outer elastomeric matrices and that of the stiffening region of the inner elastomeric matrix are co-axial to allow the shaft of the fastening means to pass through the multilayered supported elastomeric foam 1000. In an alternative embodiment, there is no adhesive between the first and second inner reinforcement regions 1005a, b and between the third and fourth inner reinforcement regions 1005c, d. Instead, the first and second outer elastomeric matrices and first inner elastomeric matrix are held together by the fastening means, the shank of which runs through each of the matrices.

In other embodiments not shown in FIG. 10, the supported elastomeric foam may comprise two or more inner elastomeric matrices, such as at least three inner elastomeric matrices, at least four inner elastomeric matrices, at least five inner elastomeric matrices etc., each of which comprise an inner foamed region between at least two inner reinforcement regions. Such further inner elastomeric matrices may be similar to the first inner elastomeric matrix discussed above. Alternatively, second or further additional inner elastomeric matrices may not contain any stiffening regions. In this way, a multilayered supported elastomeric foam may be provided with elastomeric matrices which are stacked to provide a specific thickness to match the size of a particular mechanical interface, by selecting an appropriate number of inner elastomeric matrices comprising inner foamed regions and inner reinforcement regions. Similarly, the supported elastomeric foam may comprise at least two stiffening regions, such as at least three stiffening regions, at least four stiffening regions, at least five stiffening regions etc. Each stiffening region may be inserted into one of the inner elastomeric matrices as discussed above for the first inner elastomeric matrix. The addition of further stiffening regions can be used to reduce the compressibility of the supported elastomeric foam.

FIGS. 11a-11d are cross sectional views of the initial and intermediate and final supported elastomeric foams 1100a, b, c, d provided in the production of a gasket, such as a multilayered supported elastomeric foam 1000 of FIG. 10. The multilayered supported elastomeric foam 1100d is prepared from three elastomeric matrices. The three elastomeric matrices may comprise first and second outer elastomeric matrices and an inner elastomeric matrix.

Figure 11A:
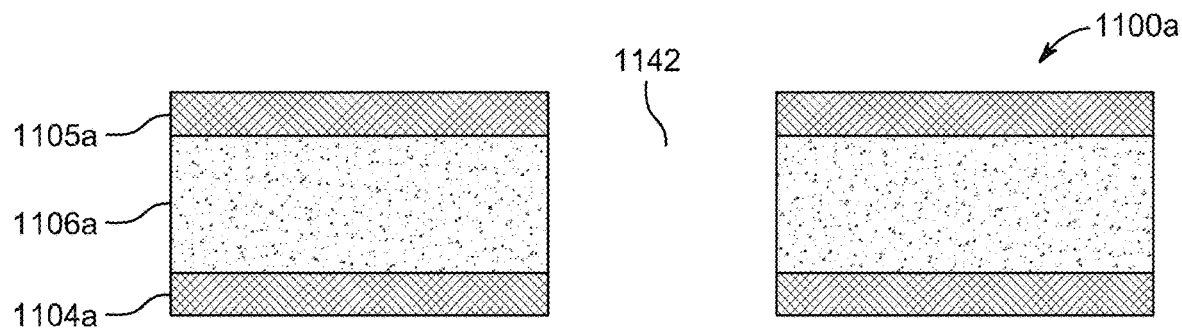
FIG. 11A-D is a side cross sectional view showing example steps for generating the multi-layered supported elastomeric foam of FIG. 10.
Figure 12:
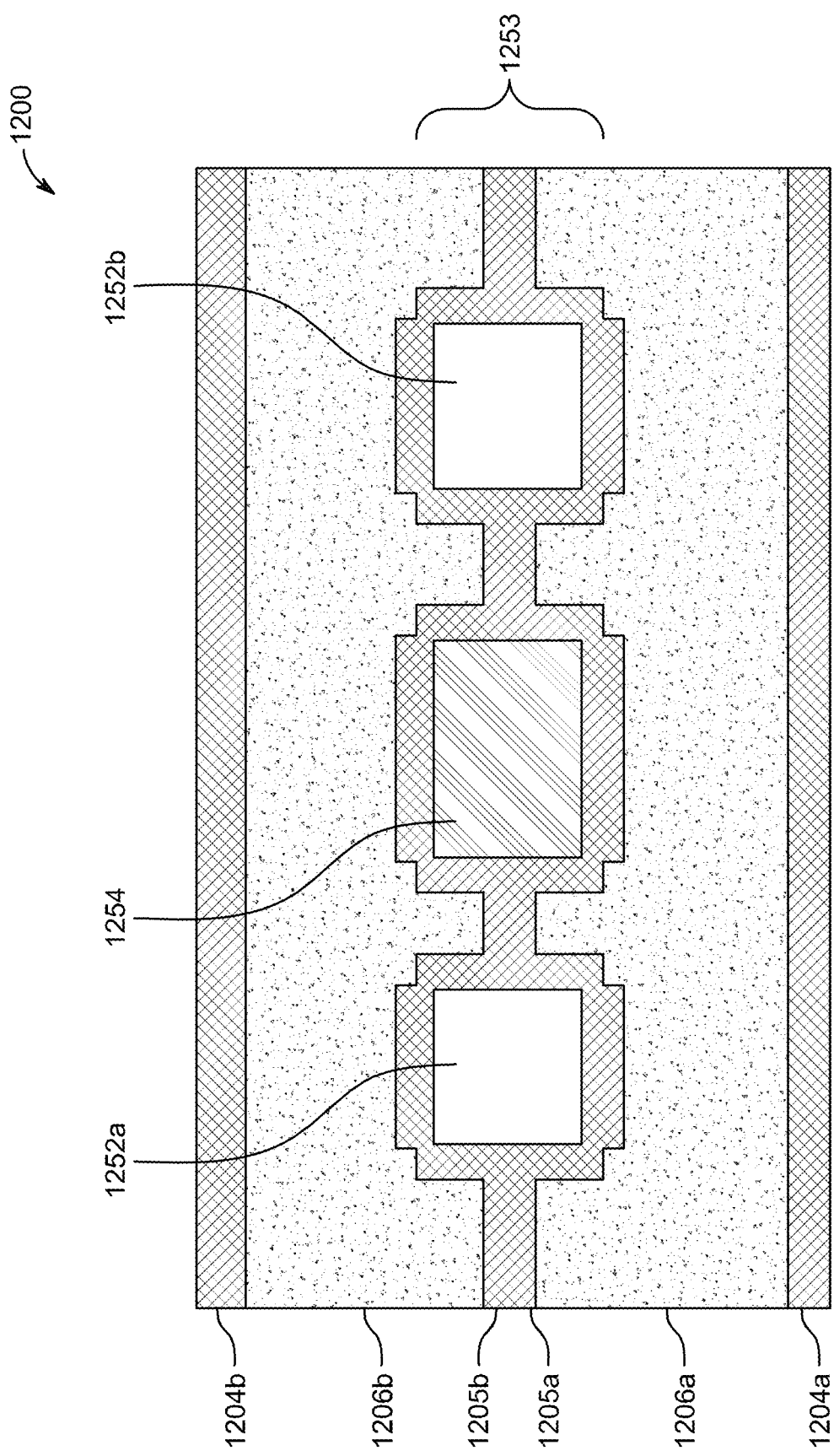
FIG. 12 is a side cross-sectional view showing an embodiment of multi-layered supported elastomeric foam with a compression knee for the protection of an electronic circuit.

In a first step, a first outer elastomeric matrix 1100a is provided as shown in FIG. 11a. The first outer elastomeric matrix 1100a can be pre-formed as discussed herein. The first outer elastomeric matrix 1100a is formed from first outer foamed region 1106a comprising a plurality of gas filled cells defined by elastomer between first outer reinforcement region 1104a and first inner reinforcement region 1105a. The first outer reinforcement region 1104a and first inner reinforcement region 1105a each comprise a porous layer having an interconnected network of pores at least partially imbibed with the elastomer of the first outer foamed region 1106a. The first outer elastomeric matrix is provided with an opening 1142, extending through the first outer reinforcement region 1104a, the first outer foamed region 1106a and first inner reinforcement region 1105a. The opening is sized for the shaft of a fastening means, for instance to fasten the multilayered supported elastomeric foam between a pair of interface surfaces to form a seal. The fastening means may be a bolt, screw or the like. The opening 1142 may be provided by drilling, punching or any other suitable means. The opening 1142 may be created once the first outer elastomeric matrix has been formed, or created in each of the individual regions 1104a, 1106a, 1105a and aligned during the manufacture of the first outer elastomeric matrix 1100a. The opening 1142 forms a lumen running from an external surface of the first outer reinforcement region 1104a to the external surface of the first inner reinforcement region 1105a. The opening may have any suitable cross-section, such as circular, polygonal etc. with circular being preferred.

Figure 11B:
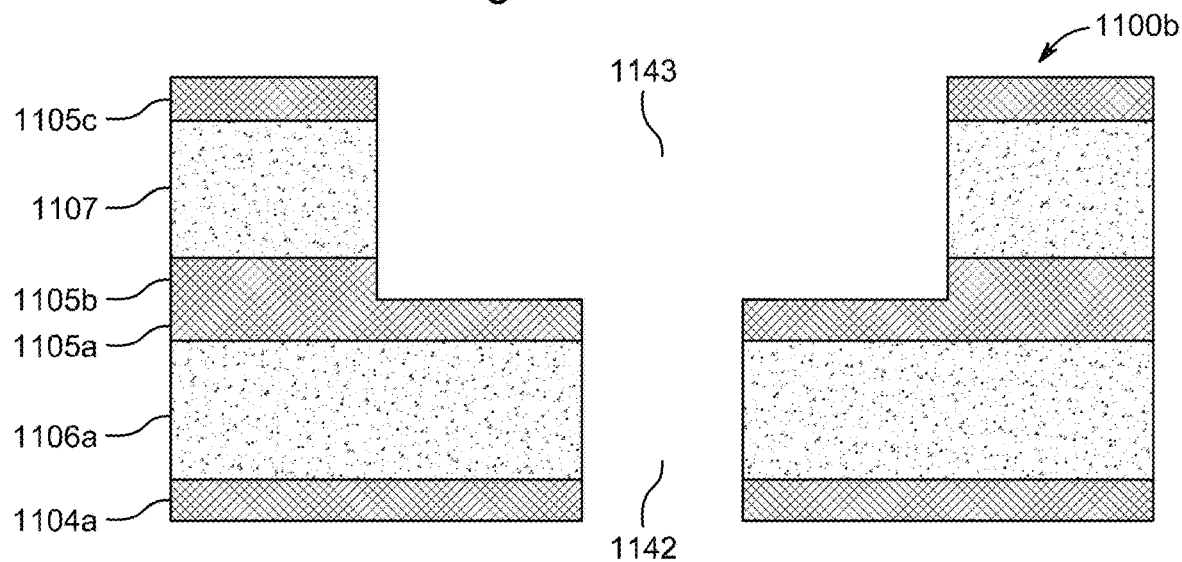

In a second step, a first inner elastomeric matrix is provided as shown in FIG. 11b. The first inner elastomeric matrix can be pre-formed as discussed herein. The first inner elastomeric matrix is formed from first inner foamed region 1107 comprising a plurality of gas filled cells defined by elastomer between second inner reinforcement region 1105b and third inner reinforcement region 1105c. The second inner reinforcement region 1105b and third inner reinforcement region 1105c each comprise a porous layer having an interconnected network of pores at least partially imbibed with the elastomer of the first inner foamed region 1107. The first inner elastomeric matrix is provided with an opening 1143, extending through the second inner reinforcement region 1105b, the first inner foamed region 1107 and third inner reinforcement region 1105c. The opening 1143 is sized for a stiffening region such as a washer to accommodate a fastening means. The opening 1143 may have any suitable cross-section, such as circular, polygonal etc. which should reflect the size and cross section of the stiffening region. The opening 1143 may be provided by drilling, punching or any other suitable means. The opening 1143 may be created once the first inner elastomeric matrix has been formed, or created in each of the individual regions 1105b, c, 1107 and aligned during the manufacture of the first inner elastomeric matrix.

In an optional third step, adhesive can be applied to one or both free surfaces of the first inner reinforcement region 1105a of the first outer elastomeric matrix and of the second inner reinforcement region 1105b of the first inner elastomeric matrix to provide an adhesive region to bond the first outer elastomeric matrix to the first inner elastomeric matrix. For simplicity, the adhesive region between the first inner reinforcement region 1105a and the second inner reinforcement region 1105b is not shown in FIGS. 11b-d. In a fourth step, the first inner reinforcement region 1105a of the first outer elastomeric matrix is contacted with the second inner reinforcement region 1105b of the first inner elastomeric matrix to provide the intermediate multilayered supported elastomeric foam 1100b.

Figure 11C:
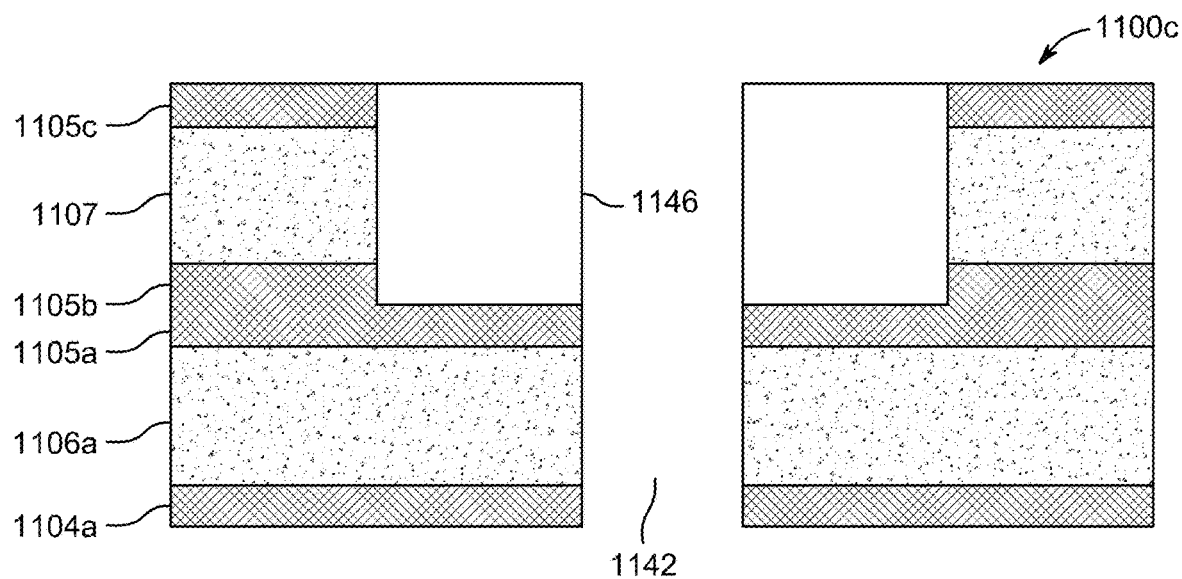

In a fifth step, a stiffening region 1146 such as a washer is inserted into opening 1143 of the first inner elastomeric matrix to provide an intermediate multilayered supported elastomeric foam 1100c as shown in FIG. 11c. The intermediate multilayered supported elastomeric foam 1100c comprises first outer elastomeric matrix, first inner elastomeric matrix and stiffening region 1146. The stiffening region may be a metallic region, such as stainless steel or titanium or a region of stiff polymer, such as modified tetrafluoroethylene or stiff rubber. Optionally, the stiffening region may be secured in place, for instance by adhesive, such as if adhesive was coated on the free surface of the first inner reinforcement region in the third step. Alternatively and again optionally, adhesive can be applied to one or more of the free surfaces of the first inner reinforcement region 1105a of the first outer elastomeric matrix, the stiffening region 1146 and/or to the sides of the second and third inner reinforcement regions 1105b, c and the inner foamed region 1107 of the lumen of the hole 1143 to provide one or more adhesive regions to bond the stiffening region 1146 to one or both of the first outer and first inner elastomeric matrices. In an alternative embodiment, the stiffening region can be replaced with supported elastomeric foam, such as a washer of supported elastomeric foam, for instance formed of an elastomeric matrix.

In an optional sixth step, adhesive can be applied to one or both free surfaces of the third inner reinforcement region 1105c of the first inner elastomeric matrix and optionally washer 1146 and fourth inner reinforcement region 1105d of a second outer elastomeric matrix to provide an adhesive region to bond the first inner elastomeric matrix to the second outer elastomeric matrix. For simplicity, the adhesive region between the third and fourth inner reinforcement regions 1105c, d is not shown in FIG. 11d.

Figure 11D:
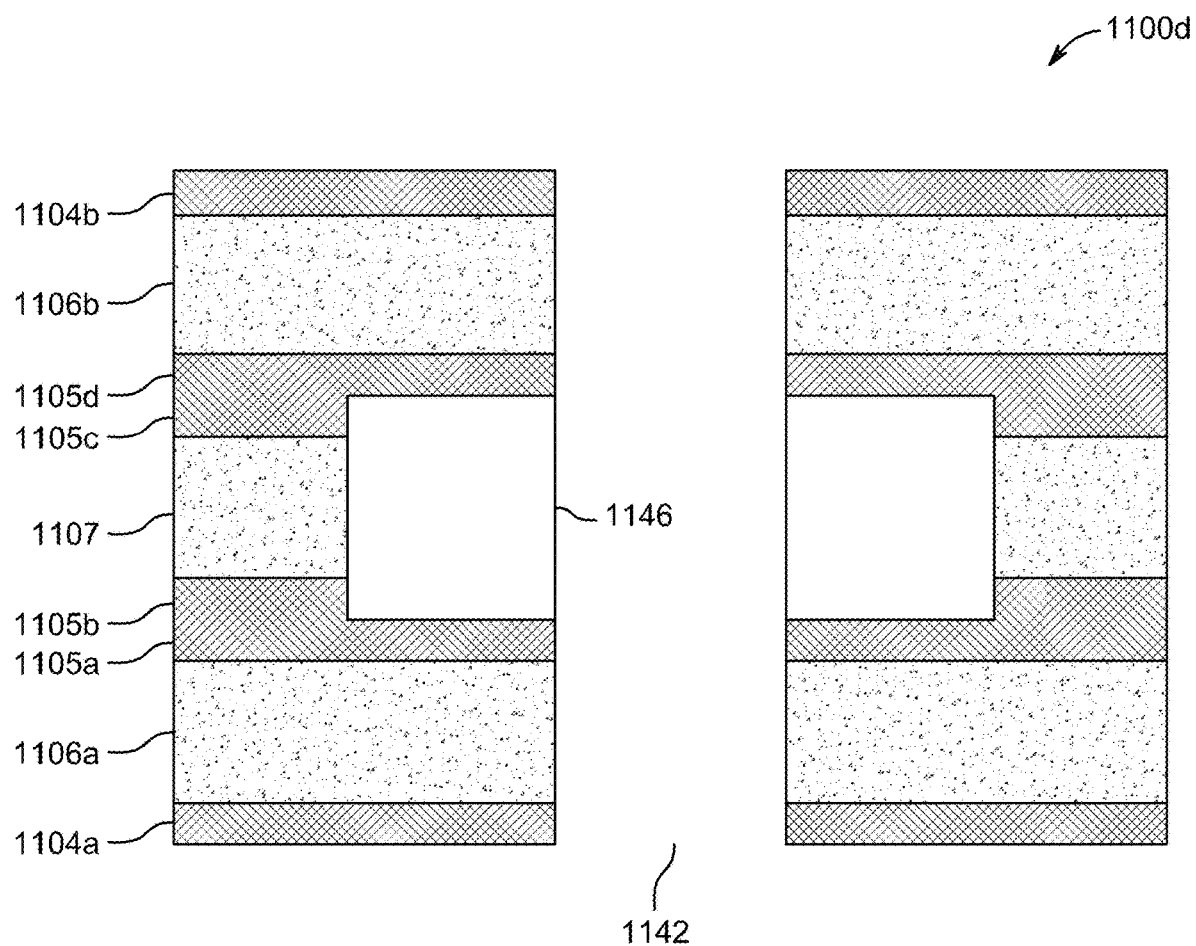

In a seventh step, a second outer elastomeric matrix can be applied to intermediate multilayered supported elastomeric foam 1100c to provide an multilayered supported elastomeric foam 1100d, such as a gasket, as shown in FIG. 11d. The multilayered supported elastomeric foam 1100d comprises first and second outer elastomeric matrices, first inner elastomeric matrix and washer 1146. The second outer elastomeric matrix can be pre-formed as discussed herein. The second outer elastomeric matrix is formed from second outer foamed region 1106b comprising a plurality of gas filled cells defined by elastomer between second outer reinforcement region 1104b and fourth inner reinforcement region 1105d. The second outer reinforcement region 1104b and fourth inner reinforcement region 1105d each comprise a porous layer having an interconnected network of pores at least partially imbibed with the elastomer of the second outer foamed region 1106b. The second outer elastomeric matrix is provided with an opening 1142, extending through the second outer reinforcement region 1104b, the second outer foamed region 1106b and the fourth inner reinforcement region 1105d. The opening is sized for the shaft of a fastening means in a similar manner to the first elastomeric matrix and may be formed as discussed herein.

Whilst a single opening 1142 is shown in the multilayered supported elastomeric foam 1100d, more than one opening may be present, such as a plurality of openings, preferably, two or more, three or more, four or more, five or more, six or more etc. The number of openings to be provided can be determined by the nature of the gasket and the interface to be sealed. For instance, six or more such openings may be provided for fastening means. The openings may be symmetrically distributed across the multilayered supported elastomeric foam 1100d. For instance, the openings may be evenly distributed around the circumference of a circle or polygonal shape. Each opening may have an associated washer in the inner elastomeric matrix. Furthermore, when the multilayered supported elastomeric foam 1100d is a gasket, one or more further holes, extending through the multilayered supported elastomeric foam 1100d may also be present. For instance, a central, e.g. circular, hole may be provided with the same focus as the larger radius circle about which the holes for fastening means are evenly distributed.

In an alternative embodiment not shown in FIGS. 11a-d, the multilayered supported elastomeric foam may be provided as an integral composite in which a single inner reinforcement region is provided between adjacent foamed regions. In this construction, all but one of the porous layers of the reinforcement regions can be provided with a layer of liquid elastomer and allowed to become imbibed with elastomer before each subsequent porous layer and elastomer coating is added on top to form a stack, as described herein for the final aspect of the Summary of Invention. The final porous layer to form the second outer reinforcement region can then be laid on top of the liquid elastomer which is to form the second outer foamed region to provide the order of reinforcement and foamed regions shown in FIG. 11d and the stack can then be cured to provide the multilayered supported elastomeric foam.

FIG. 12 is a side cross sectional view of an embodiment of a multilayered supported elastomeric foam 1200 for the protection of an electronic component 1254 such as an electronic circuit. The multilayered supported elastomeric foam 1200 comprises two elastomeric matrices, an electronic component 1254 and one or more stiffening regions.

The first outer elastomeric matrix comprises first outer foamed region 1206a comprising a plurality of gas filled cells defined by elastomer which is located between first outer reinforcement region 1204a and first inner reinforcement region 1205a. The first outer reinforcement region 1204a and first inner reinforcement region 1205a each comprise a porous layer having an interconnected network of pores at least partially imbibed with the elastomer of the first outer foamed region 1206a. The second outer elastomeric matrix comprises second outer foamed region 1206b comprising a plurality of gas filled cells defined by elastomer which is located between second inner reinforcement region 1205b and second outer reinforcement region 1204b. The second inner reinforcement region 1205b and second outer reinforcement region 1204b each comprise a porous layer having an interconnected network of pores at least partially imbibed with the elastomer of the second outer foamed region 1206b. The electronic component 1254 and one or more stiffening regions 1252a, b are located between the first and second inner reinforcement regions 1205a, b. To put this another way, the electronic component 1254 may be located in a cavity within or between the one or more stiffening regions 1252a, b. The first and second elastomeric matrices may conform around the electronic component 1254 and one or more stiffening regions 1252a, b, such that portions of the first and second inner reinforcement regions 1205a, 1205b may come into contact where they are not separated by the intervening electronic component 1254 or one or more stiffening regions 1252a, b. One or more adhesive regions of adhesive (not shown) can bond contacting areas of the first and second inner reinforcement regions 1205a, b together. The elastomeric matrices, adhesive and one or more stiffening regions may be as described herein. The elastomers, reinforcement regions and one or more stiffening regions may independently be the same or different i.e. each of the elastomers, reinforcement regions (including the porous layers) and one or more stiffening regions may be made of the same materials with the same properties or they may be made of different materials and/or have different properties such as cell or pore size.

The two elastomeric matrices conform about the perimeter of electronic component 1254, to provide protection, particularly from compressive forces acting on the foam. The protection from compressive forces is achieved, at least in part by the one or more stiffening regions 1252a which are located about the electronic component 1254 between the first and second inner reinforcement regions 1205a, b. It is preferred that the thickness 1253 of the one or more stiffening regions 1252a, b, as measured in the direction perpendicular to the two largest dimensions of the multilayered supported elastomeric foam 1200, is the same as or greater than the corresponding thickness of the electronic component. The one or more stiffening regions 1252a, b can be made of any suitable material as described herein e.g. in the embodiment of FIG. 6. The one or more stiffening regions may have any suitable shape. A plurality of stiffening regions may be present arranged regularly around the electronic component. Alternatively, a single stiffening region, such as a stiffening layer, may be provided with the electronic component located in a central cavity or hole in the stiffening region or layer, such as in an annular stiffening region or layer. In another embodiment not shown, inner elastomeric matrix regions comprising a foamed region between two reinforcement regions as described herein could be provided between electronic component 1254 and one of more stiffening regions 1252*a, b* to fill the cavities instead of having the first and second elastomeric matrices conform around the electronic component 1254 and one of more stiffening regions 1252*a, b*.

The multilayered supported elastomeric foam 1200 may be formed as follows. In a first step, first and second elastomeric matrices, an electronic component and one or more reinforcement regions may be provided. The first and second elastomeric matrices may be formed as described herein. In a second step, the electronic component and the one or more reinforcement regions may be placed on one or other of the first and second inner reinforcement regions of the respective first and second elastomeric matrices. In an optional third step, adhesive may be applied to one or more regions of the first and/or second inner reinforcement regions. In a fourth step, the first and second elastomeric matrices are compressed together such that the first and second inner reinforcement regions will come into contact in those regions without an intervening stiffening region or electronic component. The optional one or more adhesive regions can bond the first and second elastomeric matrices together, securing the stiffening regions and electronic component therebetween, particularly between the first and second inner reinforcement regions of the first and second elastomeric matrices.

In an alternative embodiment, the adhesive may be applied as the second step, prior to the placement of the one or more stiffening regions and electronic component in a third step. The adhesive can be applied to the free surface of one or both of the first and second inner reinforcement regions and can secure the one or more stiffening regions and electronic component, as well as bond the first and second elastomeric matrices in the fourth step.

In a still further alternative embodiment, instead of attaching the two elastomeric matrices and first and second inner reinforcement regions with adhesive, one or more fastening means may be used. For instance, one or more through-holes extending through the two elastomeric matrices may be provided for fastening means. Such an embodiment is discussed in Example 10 below.

In other embodiments not shown in FIG. 12, the supported elastomeric foam may comprise at least one inner elastomeric matrix, such as at two inner elastomeric matrices, at least three inner elastomeric matrices, at least four inner elastomeric matrices etc., each of which comprise an inner foamed region between at least two inner reinforcement regions. Such further inner elastomeric matrices may be similar to the first inner elastomeric matrix discussed for FIG. 1 above. An electronic component and one or more stiffening regions can be located between the an inner reinforcement region of an outer elastomeric matrix and an inner reinforcement region of an inner elastomeric matrix or between inner reinforcement regions of adjacent inner elastomeric matrices. To put this another way, the electronic component may be located in a cavity within or between the one or more stiffening regions. Each pair of adjacent elastomeric matrices may conform around the electronic component and one or more stiffening regions, such that portions of the inner reinforcement regions may come into contact where they are not separated by the intervening electronic component or one or more stiffening regions. In this way, multiple electronic components may be stacked whilst being protected from compressive damage by the one or more stiffening regions in each layer.

FIG. 13 is a side cross sectional view of an embodiment of a supported elastomeric foam 1300, having first and second outer reinforcement regions which are different. The elastomeric foam 1300 comprises a single elastomeric matrix 1318 formed from an outer foamed region 1306 comprising a plurality of gas filled cells defined by elastomer and two outer reinforcement regions 1304*a, b* located on opposite surfaces of the foamed region. The first and second outer reinforcement regions 1304*a, b* each comprise a porous layer having an interconnected network of pores at least partially imbibed with the elastomer of the outer foamed region 1306. The supported elastomeric foam 1300 is an integral structure because the elastomer forming the foamed region is also imbibed into the porous layer of each contacting reinforcement regions.

The supported elastomeric foam 1300 is asymmetric. In particular, the first and second outer reinforcement regions 1304*a, b* are different. Thus, the first and second porous layers forming the first and second outer reinforcement regions may be made from different materials and/or have different properties, such as pore size. The first and second porous layers may be independently selected from the group comprising one of a woven material, such as a polyether ether ketone (PEEK) fiber woven or an expanded polytetrafluoroethylene (ePTFE) fiber woven, a fiberglass woven, a non-woven material, such as a non-woven fiberglass material or a porous film, such as a porous polymer membrane, for instance an expanded fluoropolymer film, particularly an expanded polytetrafluoroethylene (ePTFE) film, with the proviso that the first and second porous layers are different. One of the porous layers may be a woven porous layer, such as a woven ePTFE fiber porous layer, particularly a woven ePTFE twisted fiber porous layer. An example of such a woven porous layer is disclosed below in Example 6. Other examples of the porous layer may be a woven PEEK fiber porous layer or an ePTFE membrane. An example of such a woven PEEK fiber porous layer is disclosed below in Example 5. Woven PEEK fiber porous layers have good chemical resistance and thermal properties, and can be obtained in many different thicknesses allowing the thickness of the outer reinforcement regions to be selected as required, for instance to provide a desired stiffening thickness. In one embodiment, the first and second porous layers are different porous membrane materials. Alternatively, it is preferred that one of the first and second porous layers is a porous membrane material, whilst the other is a woven fabric. The woven fabric may be a plain weave or a 2×2 fiber twill. For instance, one of the first and second porous layers may be a ePTFE membrane, whilst the other may be woven ePTFE fibers or woven PEEK fibers. A preferred woven PEEK is a plain weave woven fiber PEEK. A preferred woven fiber ePTFE is a 2×2 fiber twill woven ePTFE. Such a woven ePTFE can impart abrasion resistance to the surface of the supported elastomeric foam.

FIG. 14 is a side cross sectional view of an embodiment of a supported elastomeric foam 1400, comprising an elastomeric matrix and having a surface region. The surface region may be bonded to the elastomeric matrix by an adhesive region. The supported elastomeric foam 1400 comprises a single elastomeric matrix 1418 formed from an outer foamed region 1406 comprising a plurality of gas filled cells defined by elastomer and two outer reinforcement regions 1404*a, b* located on opposite surfaces of the outer foamed region, such as opposing first and second sides of the outer foamed region. The first and second outer reinforcement regions 1404*a, b* each comprise a porous layer having an interconnected network of pores at least partially imbibed with the elastomer of the outer foamed region 1406.

The supported elastomeric foam 1400 may be symmetric or asymmetric, as described above for FIGS. 1 and 2 and their alternative embodiments. In particular, the first and second outer reinforcement regions 1404*a, b* may be independently the same or different. For instance, the first and second porous layers of the first and second outer reinforcement regions may be made of the same material with the same properties or they may be made of different materials and/or have different properties, such as pore size.

Also shown in FIG. 14 is a first surface region 1430. The first surface region 1430 may be a non-porous first surface region, such as a non-porous layer. The first surface region may be selected from densified ePTFE or biaxially oriented polypropylene. The first surface region 1430 is located on the second outer reinforcement region 1404*b*. The bonding of the first surface region 1430 to the second outer reinforcement region 1404*b* can be achieved by an adhesive region 1408, such as an adhesive layer. The adhesive may be a silicone adhesive such as ARSEAL 8026 (Adhesives Research, Glen Rock, PA), which can be applied by way of a transfer tape, either by way of firm hand pressure or lamination pressure. Another suitable adhesive is an acrylic adhesive such as 9482PC (3M, St. Paul, MN), which can be applied by way of a transfer tape. A liquid adhesive may also be used, such as a silicone pressure sensitive adhesive with a curing catalyst, which can be applied to a surface of one or both of the first surface region 1430 and the second outer reinforcement region 1404*b* and then cured with heat. Alternatively, the liquid elastomer used to form the foamed region and to imbibe the porous layers of the reinforcement regions may also be used as an adhesive, and is another example of a liquid elastomer. Alternatively, in an embodiment not shown in FIG. 14, the bonding of the first surface region 1430 to the second outer reinforcement region 1404*b* can be achieved via lamination, for instance with one or both of heat and pressure.

Figure 15:
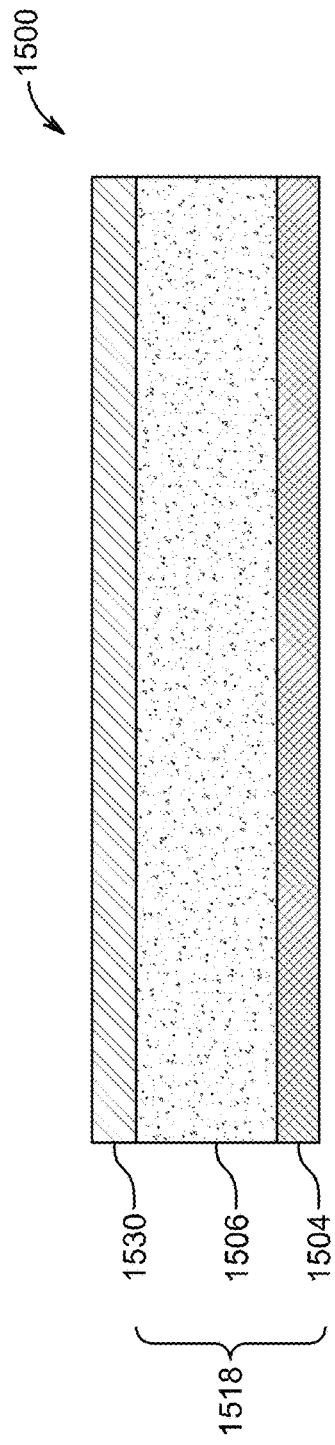
FIG. 15 is a side cross-sectional view showing an embodiment of supported elastomeric foam having a single imbibed support region and a surface layer.

FIG. 15 is a side cross sectional view of an embodiment of a supported elastomeric foam 1500, having an outer reinforcement region 1504 and a surface region 1530 located on opposite surfaces of an outer foamed region 1506, such as first and second opposing sides of the outer foamed region. The outer reinforcement region 1504 comprises a porous layer having an interconnected network of pores at least partially imbibed with the elastomer of the outer foamed region 1506. The outer foamed region 1506 comprises a plurality of gas filled cells defined by the elastomer. The first surface region 1530 may be a non-porous first surface region, such as a non-porous layer. The first surface region may be selected from densified ePTFE or biaxially oriented polypropylene. The first surface region 1530 is located on the foamed region 1506 and may be in direct contact with the foamed region 1506. The bonding of the first surface region 1530 to the foamed region 1506 can be achieved via lamination, for instance with one or both of heat and pressure. If the first surface region 1530 is applied to the outer foamed region 1506 before the liquid elastomer forming the foam is cured, the elastomer may act as an adhesive to secure the first surface region 1530 to the foam. Alternatively, in an embodiment not shown in FIG. 15, the bonding of the first surface region 1530 to the outer foamed region 1506 can be achieved by an adhesive region, such as an adhesive layer. The adhesive may be a silicone adhesive such as ARSEAL 8026 (Adhesives Research, Glen Rock, PA), which can be applied by way of a transfer tape, either by way of firm hand pressure or lamination pressure. Another suitable adhesive is an acrylic adhesive such as 9482PC (3M, St. Paul, MN), which can be applied by way of a transfer tape. A liquid adhesive may also be used, such as a silicone pressure sensitive adhesive with a curing catalyst, which can be applied to a surface of one or both of the first surface region 1530 and the outer foamed region 1506 and then cured with heat.

Figure 16:
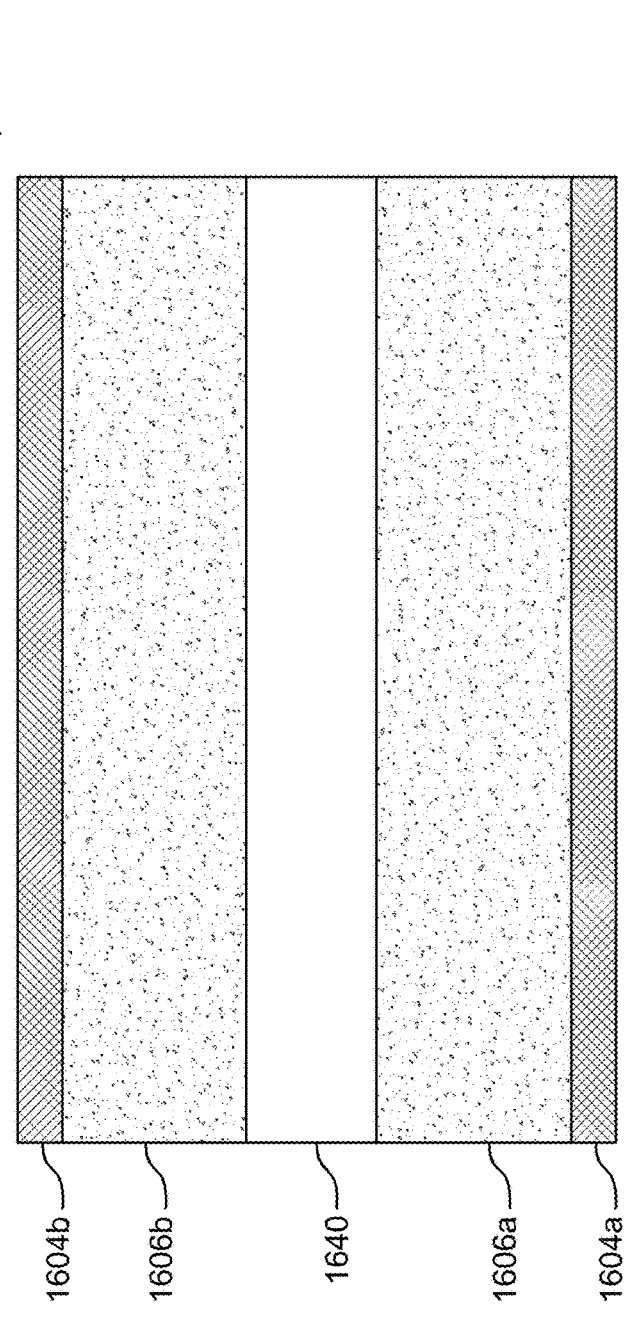
FIG. 16 is a side cross sectional view of an embodiment of supported elastomeric foam containing a stiffening center layer.

FIG. 16 is a side cross sectional view of an embodiment of a supported elastomeric foam 1600, having a stiffening region 1640, such as a stiffening layer. The elastomeric foam 1600 comprises two foamed regions 1606*a, b*, such as two outer foamed regions and two reinforcement regions 1604*a, b*, such as two outer reinforcement regions, with each pair of foamed and reinforcement regions located on opposite surfaces of the stiffening region 1640. The first outer reinforcement region 1604*a* and second outer reinforcement region 1604*b* each have an interconnected network of pores at least partially imbibed with the elastomer of the first outer foamed region 1606*a* and second outer foamed region 1606*b* respectively.

The supported elastomeric foam 1600 may be symmetric or asymmetric, as described above for FIGS. 1 and 2 and their alternative embodiments. In particular, the first and second outer foamed regions 1606*a, b* may be independently the same or different. For instance, these foamed regions may have the same elastomer composition and properties such as cell size or may differ in elastomer composition and/or properties, such as cell size, etc. Similarly, the first and second outer reinforcement regions 1604*a, b* may be independently the same or different. For instance, the porous layers of the reinforcement regions may have the same chemical composition and properties, or may differ in chemical composition and/or properties, such that the porous layers may be made of the same materials or of different materials and/or have different pore sizes etc.

Also shown in FIG. 16 there is a stiffening region 1640. The stiffening region 1640 is oriented between the first and second outer foamed regions 1606*a, b* and may be in direct contact with them. The stiffening region 1640 may be selected from porous stiff polymers, non-porous stiff polymers, such as modified tetrafluoroethylene polymers (TFM) and metals. The porous stiff polymers may be woven or non-woven stiff polymers, such as those made of PEEK, particularly PEEK fibers, and may be unimbibed with elastomer, or may be imbibed with elastomer. As used herein, the term "stiff" is intended to represent materials which exhibit a compression of less than 25% when placed under a stress of less than or equal to 100 MPa, particularly a stress of from 10 to 100 MPa.

The bonding of the stiffening region 1640*a* to the first and second inner foamed regions 1606*a, b* can be achieved via lamination, for instance with one or both of heat and pressure. Alternatively, in an embodiment not shown in FIG. 16, the bonding may be achieved by one or more adhesive regions, such as an adhesive layer. One suitable adhesive is a silicone adhesive such as ARSEAL 8026 (Adhesives Research, Glen Rock, PA), which can be applied by way of a transfer tape, either by way of firm hand pressure or lamination pressure. Another suitable adhesive is an acrylic adhesive such as 9482PC (3M, St. Paul, MN), which can be applied by way of a transfer tape. A liquid adhesive may also be used, such as a silicone pressure sensitive adhesive with a curing catalyst, which can be applied to a surface of one or both of the first and second outer foamed regions 1606a, b and then cured with heat. Alternatively, the elastomer used to form the foamed regions and to imbibe the porous layers of the reinforcement regions may also be used as an adhesive and is another example of a liquid elastomer. In an alternative embodiment, rather than using an adhesive or equivalent to attach the stiffening region 1640 to the first and second outer foamed regions 1606a, b, a fastening means may be used. For instance, one or more through-holes may be provided through the supported elastomeric foam 1600, for instance in a direction orthogonal to the plane of the first and second outer reinforcement regions 1604a, b and the first and second inner foamed regions 1606a, b and stiffening region 1640, allowing the first and second outer reinforcement regions 1603a, b, the first and second outer foamed regions 1606a, b and the stiffening region 1640 to be attached by fastening means, such as a nut and bolt.

In some embodiments, the stiffening region can be shaped. For instance, the stiffening region may be discontinuous, such that two or more stiffening regions may be present in a plane separated by cavities and/or the stiffening region may be continuous such that the stiffening region may contain one or more cavities. The cavities between the portions of stiffening regions or within the stiffening region may be unfilled or may be filled. The cavities may be filled with further components, such as reinforcement and foamed regions, such as one or more elastomeric matrices of the types already described or an electronic component. The embodiments of FIGS. 7-11 are applicable to the supported elastomeric foam 1600 of FIG. 16 and disclose embodiments in which a portion of the cavities between portions of the stiffening region are filled with elastomeric matrices as described herein. The embodiment of FIG. 12 is also applicable to the supported elastomeric foam 1600 in which a cavity between portions of the stiffening region may contain an electronic component.

When cavities either within a stiffening region or between portions of stiffening regions are unfilled or contain unfilled portions, the adjacent foamed regions (e.g. those lying above and below the plane of the reinforcement region, such as a reinforcement region layer), may conform around the stiffening regions to fill and seal the cavity or a portion thereof. In all cases, the interface between the stiffening region and adjacent foamed regions can be optionally joined with adhesive and/or attached by a fastening means. Similarly, if the cavities are filled with additional components, such as elastomeric matrices or electronic components, the interface between the additional components and adjacent foamed regions can be optionally joined with adhesive and/or attached by a fastening means.

In other embodiments not shown in FIG. 16, the foam is not limited to two foamed regions and two reinforcement regions. For instance, the foam may comprise at least one inner foamed region and at least one further stiffening region, such that foamed regions and stiffening regions alternate in a direction orthogonal to the plane of the first and second outer reinforcement regions and first stiffening layer, For instance, the multilayered supported elastomeric foam may further comprise a first inner foamed region and a second stiffening region and optionally a second inner foamed region and a third stiffening region and further optionally a third inner foamed region and a fourth stiffening region in which inner foamed regions alternate with stiffening regions. Such inner foamed regions may be similar to the first inner foamed region discussed above for the embodiments of FIG. 4. In this way, the thickness of the supported elastomeric foam and its resistance to compression may be adjusted.

A dot patterned, pressure sensitive adhesive may be adhered to a facing surface of the seal comprising the supported elastomeric foam or multilayered supported elastomeric foam. The patterned adhesive is present as a "dot" which may have a diameter, for instance of about 0.97 mm and edge to edge spacing of each dot to the next closest dot as about 2.19 mm. According to embodiments, there is disclosed a seal comprising a multilayered supported elastomeric foam as disclosed herein having two outer reinforcement regions and a discontinuous, patterned adhesive, which in some embodiments may be applied in similar manner to any suitable elastomeric foam (e.g., with one reinforcement region), or to an alternative compressible sealing material. The configuration of the patterned adhesive can be characterized in terms of dot diameters and unit cell widths, and a percent coverage of the seal can be determined from these values according to the following equation, where U represents the unit cell width and D represents the "dot" width.

$$C = \frac{\pi D^2}{8U^2} \text{(For circular "dots")} \quad \text{Equation 1: Proportional Coverage}$$

$$C = \frac{D^2}{2U^2} \text{(For square "dots")}$$

When the supported elastomeric foam is compressed, in a second, compressed configuration, portions of the first and second surface are pressed into contact with the first and second rigid surfaces of a mechanical interface, while small pockets are formed around each of the adhesive regions compressing into the elastomeric foam. The contact between the first and second surfaces and the first and second rigid surfaces creates a seal against liquid intrusion along those surfaces. After compression, each of the reinforcement region and foamed region have compressed thicknesses totaling a compressed total thickness which is smaller than the initial, uncompressed thickness. Generally, the foamed region will compress to a greater degree than the reinforcement region.

Further details regarding the disclosure are described in conjunction with the following examples.

EXAMPLES

Thickness, Density, and Compressive Strain

To test the physical thickness, density, and percent compression metrics, the following procedures were carried out. First, each sample of multilayered supported elastomeric foam was cut with a punch to 2.263 cm diameter, weighed on a precision scale, and then placed on a platen on an INSTRON 5565 dynamic mechanical analyzer (Instron Tool Works, Inc., MA, USA). A compression disc of 1.786 cm diameter was placed on top of the sample. A compressive stress-strain test was begun where the analyzer head moves at a strain rate of 0.06 mm/min until it reaches a load of 0.74 N. Together with the mass and size of compression disc, this resulted in a pressure on the sample of 3.45 kPa. The thickness of the sample was extracted at 0.48 kPa, which is just above the noise floor of the load cell. Using this thickness and the mass measured earlier, the density of each sample was calculated. Once the analyzer reached 0.74 N, it continued compressing the sample at a strain rate of 0.6 mm/min while capturing load data on its load cell to create a stress-strain curve. The compressive strains on the sample were extracted at a pressure of 3 MPa and 10 MPa to represent this curve.

In the following Examples 1, 2, 3, and 9, a multilayered supported elastomeric foam was constructed from elastomeric matrices made in a similar manner to WO 2018/231267, Example 8. The elastomeric matrix was formed using two ePTFE porous layers, each having an initial thickness of 8.7 μm and density of about 0.47 g/cm$^3$ to form two reinforcement regions supporting both sides of a foamed region in a sandwiched configuration. A perfluoropolyether elastomer, SIFEL 2661 (Shin-Etsu Chemical Co., Ltd., Tokyo, JP) was selected as the elastomer and mixed with EXPANCEL 920 DU 20 expanding polymer spheres (Expancel, Sundsvall, Sweden) as the foaming agent, in a 6.91:1 mixing ratio by mass. The mixture was imbibed into both of the ePTFE porous layers and coated with a tool gap of 0.122 mm before being heat treated at approximately 150.5° C. for 5 minutes and 120° C. for 5 minutes to activate the foaming agent and begin the curing of the composite. Afterwards, the composite was further cured at 110° C. for 60 minutes. The resulting thickness and density of this elastomeric matrix is approximately 0.233 mm and 0.508 g/cm$^3$.

The elastomeric matrix produced is a foamed region sandwiched between two reinforcement regions and differs from the multilayered supported elastomeric foam described herein because it does not contain a second or further foamed region.

Example 1

A multilayered supported elastomeric foam was constructed using two supported elastomeric foam matrices or units described earlier. One face of one unit was coated with a perfluoropolyether elastomer, SIFEL 2618 (Shin-Etsu Chemical Co., Ltd., Tokyo, JP) with a thickness of 0.06 mm. Once coated, one face of the reinforcement region of the second unit was laid on top of the liquid elastomer coating. This liquid elastomer serves as an adhesive region between adjacent reinforcement regions of ePTFE at least partially imbibed with elastomer in which one reinforcement region comes from each supported elastomeric foam unit. This multilayered foam was then heat treated at 110° C. for 20 minutes to cure the elastomer adhesive layer. The density, initial thickness and strain and thickness at both 3 MPa and 10 MPa of the multilayered foam were measured and are shown in Table 1 below.

Figure 17:
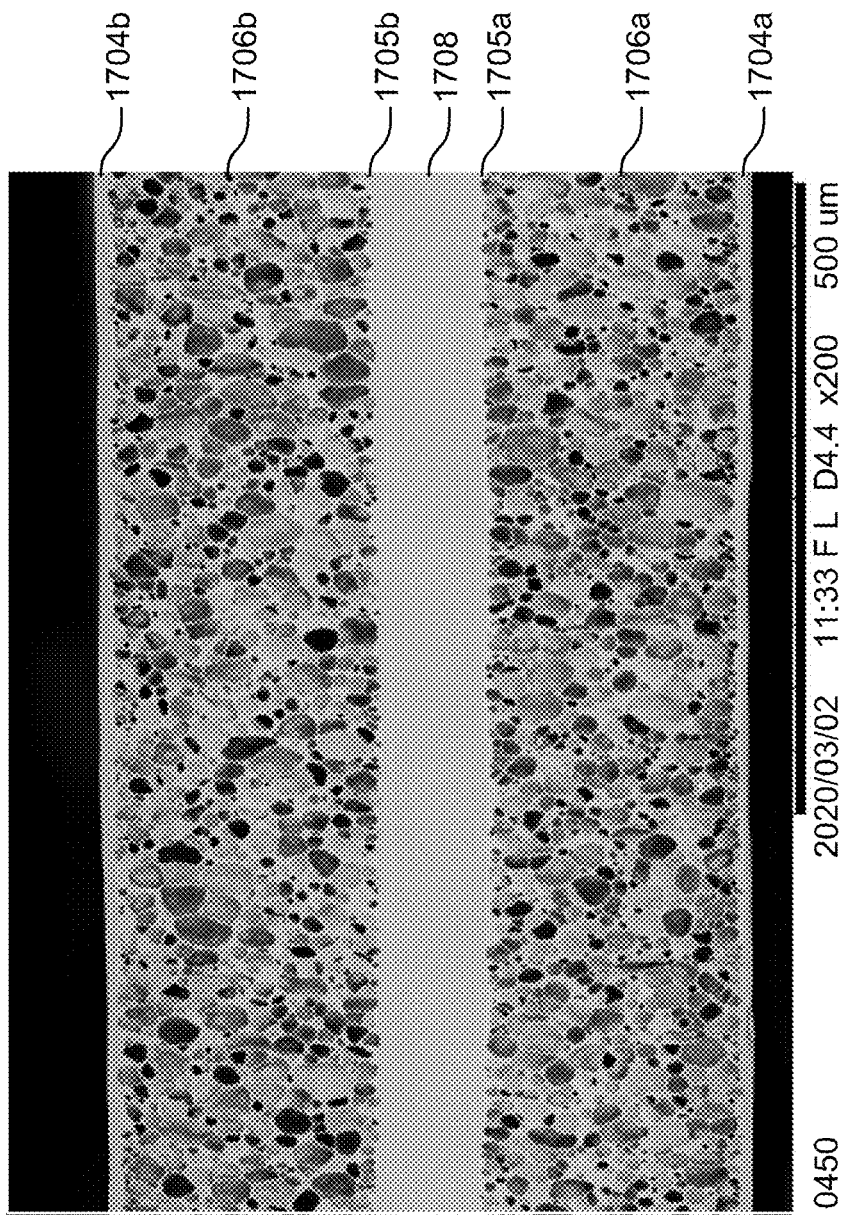
FIG. 17 is a scanning electron micrograph image of the cross-section of a multilayered supported elastomeric foam of Example 1 comprising two elastomeric matrices bonded with an adhesive region.

FIG. 17 is a scanning electron micrograph image of the cross-section of the multilayered supported elastomeric foam of Example 1 comprising two elastomeric matrices bonded with an adhesive region. A first outer elastomeric matrix comprises first outer reinforcement region 1704a formed of perfluoropolyether elastomer imbibed ePTFE, first outer foamed region 1706a comprising perfluoropolyether elastomer defining a plurality of gas filled cells and first inner reinforcement region 1705a formed of perfluoropolyether elastomer imbibed ePTFE. A second outer elastomeric matrix comprises second inner reinforcement region 1705b formed of perfluoropolyether elastomer imbibed ePTFE, second outer foamed region 1706b comprising foamed perfluoropolyether elastomer and second outer reinforcement region 1704b formed of perfluoropolyether elastomer imbibed ePTFE. Adhesive region 1708 formed of perfluoropolyether elastomer can be seen between the two elastomeric matrices. The two inner reinforcement regions 1705a, b are compressed compared to the two outer reinforcement regions 1704a, b and are imbibed with a different perfluoropolyether elastomer as the adhesive region 1708, although they are difficult to distinguish from the adhesive region 1708 in the image.

Example 2

A multilayered supported elastomeric foam was constructed using four elastomeric matrices described earlier. Double sided acrylic pressure sensitive adhesive transfer tape (3M, 463 adhesive) was placed onto one face of one elastomeric matrix. Once the tape was applied, one face of a second elastomeric matrix was layered on top of the adhesive tape and mild compressive force was applied to laminate the first and second elastomeric matrices. On the other side of the second elastomeric matrix, another piece of double sided adhesive transfer tape was applied and a third elastomeric matrix was then layered in similar fashion to the second elastomeric matrix. This step was carried out once more to create a multilayered foam with three layers of adhesive tape and four units of the elastomeric matrices. The density, initial thickness and strain and thickness at both 3 MPa and 10 MPa of the multilayered foam were measured and are shown in Table 1 below.

Figure 18:
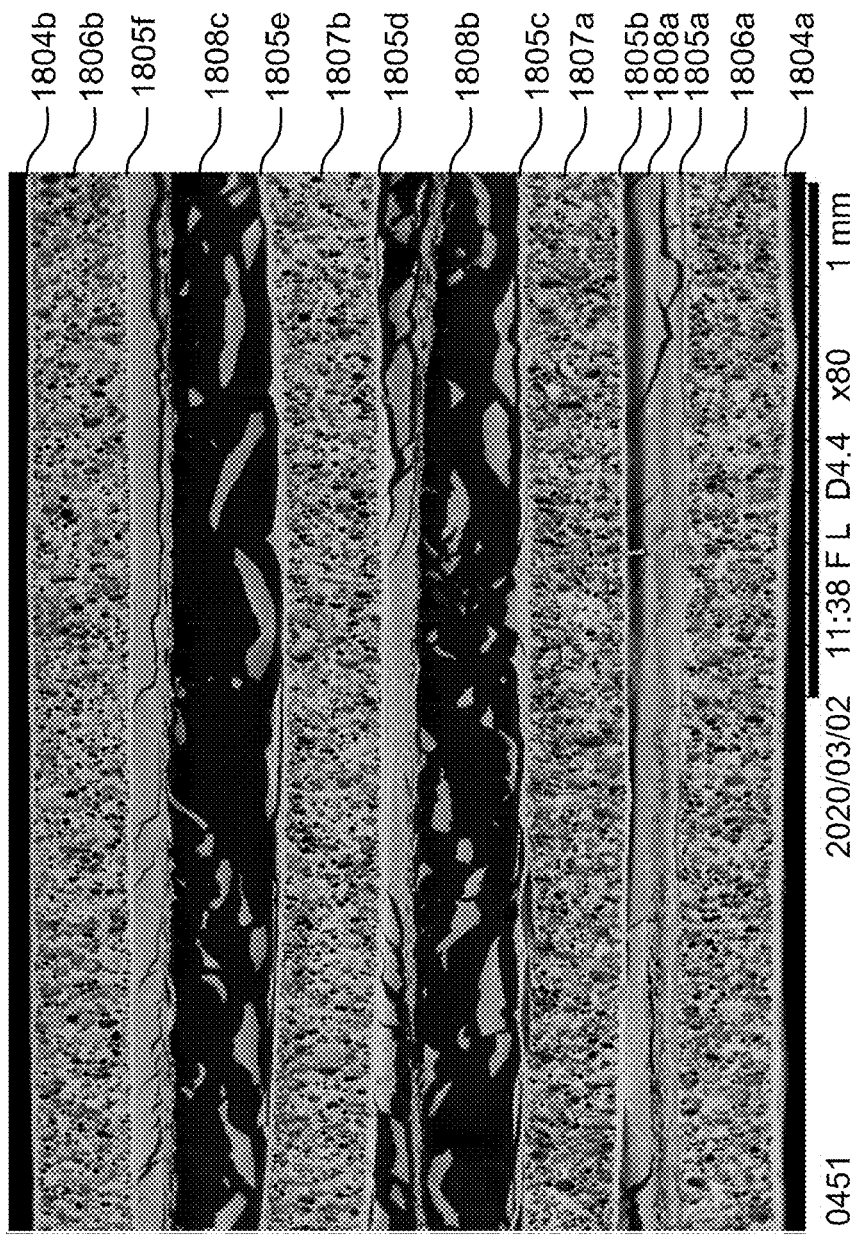
FIG. 18 is a scanning electron micrograph image of the cross-section of a multilayered supported elastomeric foam of Example 2 comprising four elastomeric matrices with each pair of adjacent elastomeric matrices bonded with an adhesive region.

FIG. 18 is a scanning electron micrograph image of the cross-section of a multilayered supported elastomeric foam of Example 2 comprising four elastomeric matrices with each pair of adjacent elastomeric matrices bonded with an adhesive region. A first outer elastomeric matrix comprises first outer reinforcement region 1804a formed of perfluoropolyether elastomer imbibed ePTFE, first outer foamed region 1806a comprising perfluoropolyether elastomer defining a plurality of gas filled cells and first inner reinforcement region 1805a formed of perfluoropolyether elastomer imbibed ePTFE. A first inner elastomeric matrix comprises second inner reinforcement region 1805b formed of perfluoropolyether elastomer imbibed ePTFE, first inner foamed region 1807a comprising perfluoropolyether elastomer defining a plurality of gas filled cells and third inner reinforcement region 1805c formed of perfluoropolyether elastomer imbibed ePTFE. A second inner elastomeric matrix comprises fourth inner reinforcement region 1805d formed of perfluoropolyether elastomer imbibed ePTFE, second inner foamed region 1807b comprising perfluoropolyether elastomer defining a plurality of gas filled cells and fifth inner reinforcement region 1805e formed of perfluoropolyether elastomer imbibed ePTFE. A second outer elastomeric matrix comprises sixth inner reinforcement region 1805f formed of perfluoropolyether elastomer imbibed ePTFE, second outer foamed region 1806b comprising perfluoropolyether elastomer defining a plurality of gas filled cells and second outer reinforcement region 1804b formed of perfluoropolyether elastomer imbibed ePTFE. First, second and third adhesive regions 1808a, b and c formed of acrylic pressure sensitive adhesive can be seen between each pair of adjacent elastomeric matrices.

Example 3

A multilayered supported elastomeric foam was constructed using two elastomeric matrices described earlier. One face of both matrices was evenly coated with a perfluoropolyether elastomer, SIFEL 2618 (Shin-Etsu Chemical Co., Ltd., Tokyo, JP) with a thickness of 0.11 mm. This liquid elastomer serves as an adhesive region. Once coated, one face of a strip 0.13 mm (5 mils) thick titanium sheet metal 6T-5 (Trinity Brand Industries) was laid on top of the liquid elastomer coating on one matrix. The second matrix was laid on top of the opposing face of the titanium sheet metal so the elastomer coating was in contact with the metal. Light pressure was applied to the top-most and bottom-most faces of this multilayer supported elastomeric foam to ensure good liquid contact. This multilayer supported elastomeric foam was then heat treated at 110° C. for 20 minutes to cure the elastomer adhesive regions to form a composite. The density, initial thickness and strain and thickness at both 3 MPa and 10 MPa of the multilayered foam were measured and are shown in Table 1 below.

Figure 19:
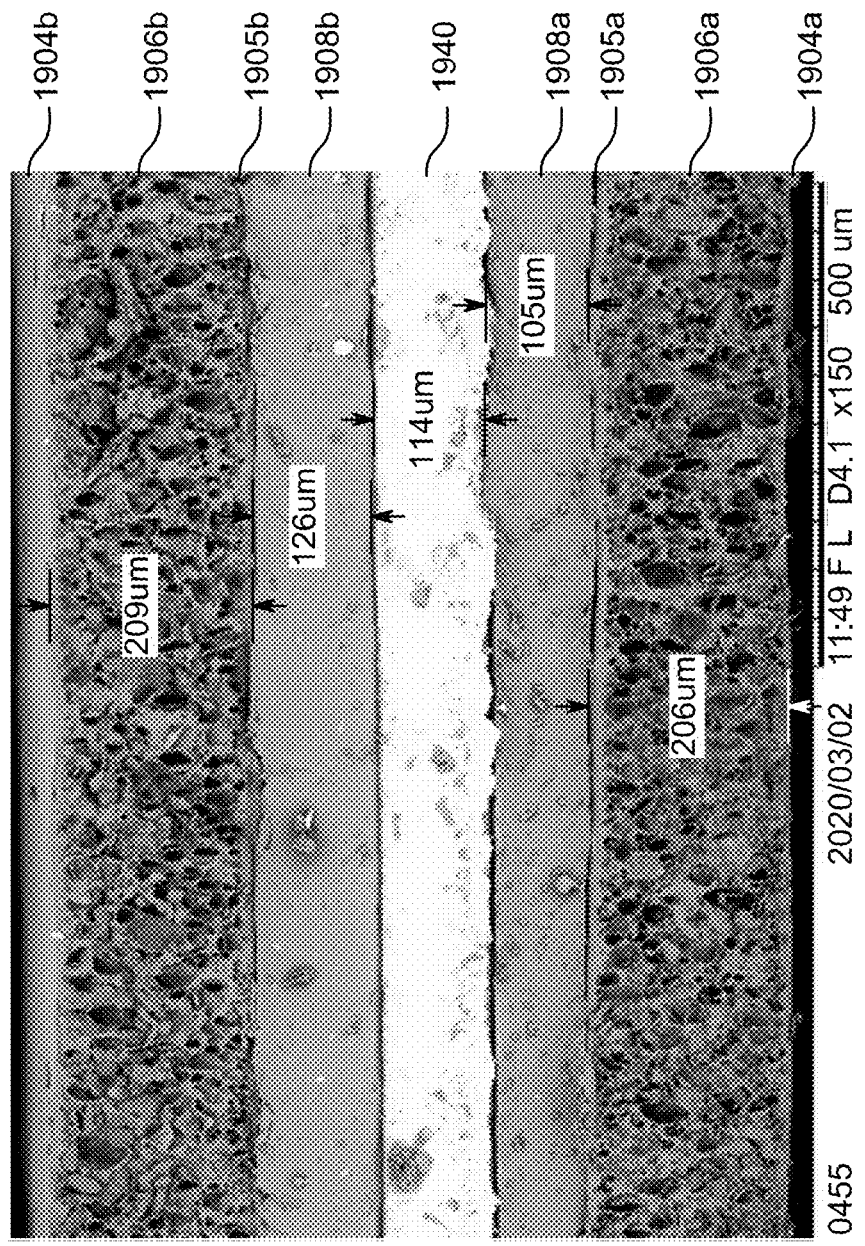
FIG. 19 is a scanning electron micrograph image of the cross-section of a multilayered supported elastomeric foam of Example 3 comprising two elastomeric matrices bonded with two adhesive regions and an inner stiffening region.

FIG. 19 is a scanning electron micrograph image of the cross-section of a multilayered supported elastomeric foam of Example 3 comprising two elastomeric matrices bonded with two adhesive regions and an inner stiffening region. A first outer elastomeric matrix comprises first outer reinforcement region 1904*a* formed of perfluoropolyether elastomer imbibed ePTFE, first outer foamed region 1906*a* comprising foamed perfluoropolyether elastomer and first inner reinforcement region 1905*a* formed of perfluoropolyether elastomer imbibed ePTFE. A second outer elastomeric matrix comprises second inner reinforcement region 1905*b* formed of perfluoropolyether elastomer imbibed ePTFE, second outer foamed region 1906*b* comprising foamed perfluoropolyether elastomer and second outer reinforcement region 1904*b* formed of perfluoropolyether elastomer imbibed ePTFE. First and second adhesive regions 1908*a, b* formed of perfluoropolyether elastomer can be seen between the two elastomeric matrices on either side of the inner stiffening region 1940 comprising titanium sheet metal.

Comparative Example

An elastomeric matrix was made in a similar manner to WO 2018/231267, Example 8. The elastomeric matrix was formed using two ePTFE porous layers, each having an initial thickness of 8.7 µm and density of about 0.47 g/cm³ to form two reinforcement regions supporting both sides of a foamed region in a sandwiched configuration. A perfluoropolyether elastomer, SIFEL 2661 (Shin-Etsu Chemical Co., Ltd., Tokyo, JP) was selected as the elastomer and mixed with EXPANCEL 920 DU 20 expanding polymer spheres (Expancel, Sundsvall, Sweden) as the foaming agent, in a 15.59:1 mixing ratio by mass. The mixture was imbibed into both of the ePTFE porous layers and coated with a tool gap of 0.467 mm before being heat treated at approximately 155° C. for 5 minutes and 110° C. for 5 minutes to activate the foaming agent and begin the curing of the composite. Afterwards, the composite was further cured at 110° C. for 60 minutes. The resulting thickness and density of this elastomeric matrix is approximately 0.777 mm and 0.633 g/cm³.

The density, initial thickness and strain and thickness at both 3 MPa and 10 MPa of the foam were measured and are shown in Table 1 below.

Example 4

A multilayered supported elastomeric foam was constructed using 3 ePTFE porous layers with a thickness of 0.015 mm and a density of 4 g/cm³. Two of the ePTFE layers are used to form the outer reinforcement regions supporting the foamed regions and internal reinforcement region. A perfluoropolyether elastomer, SIFEL 2661 (Shin-Etsu Chemical Co., Ltd., Tokyo, JP) was selected as the elastomer and mixed with EXPANCEL 920 DU 20 expanding polymer spheres (Expancel, Sundsvall, Sweden) as the foaming agent, in a 7:1 mixing ratio by mass. The mixture was imbibed into the two outer ePTFE porous layers and coated with a tool gap of 0.2 mm. After this mixture imbibed into the two ePTFE porous layers, the third ePTFE porous layer was laid on top of the wet elastomer mixture that had already been coated on one of the outer layers. Then the other imbibed ePTFE layer with wet elastomer mixture on one side was placed on top of the opposite side of the third ePTFE layer. This sample was then put in the oven at 150° C. for 10 min to cure. The density, initial thickness and strain and thickness at both 3 MPa and 10 MPa of the multilayered foam were measured and are shown in Table 1 below.

Figure 21:
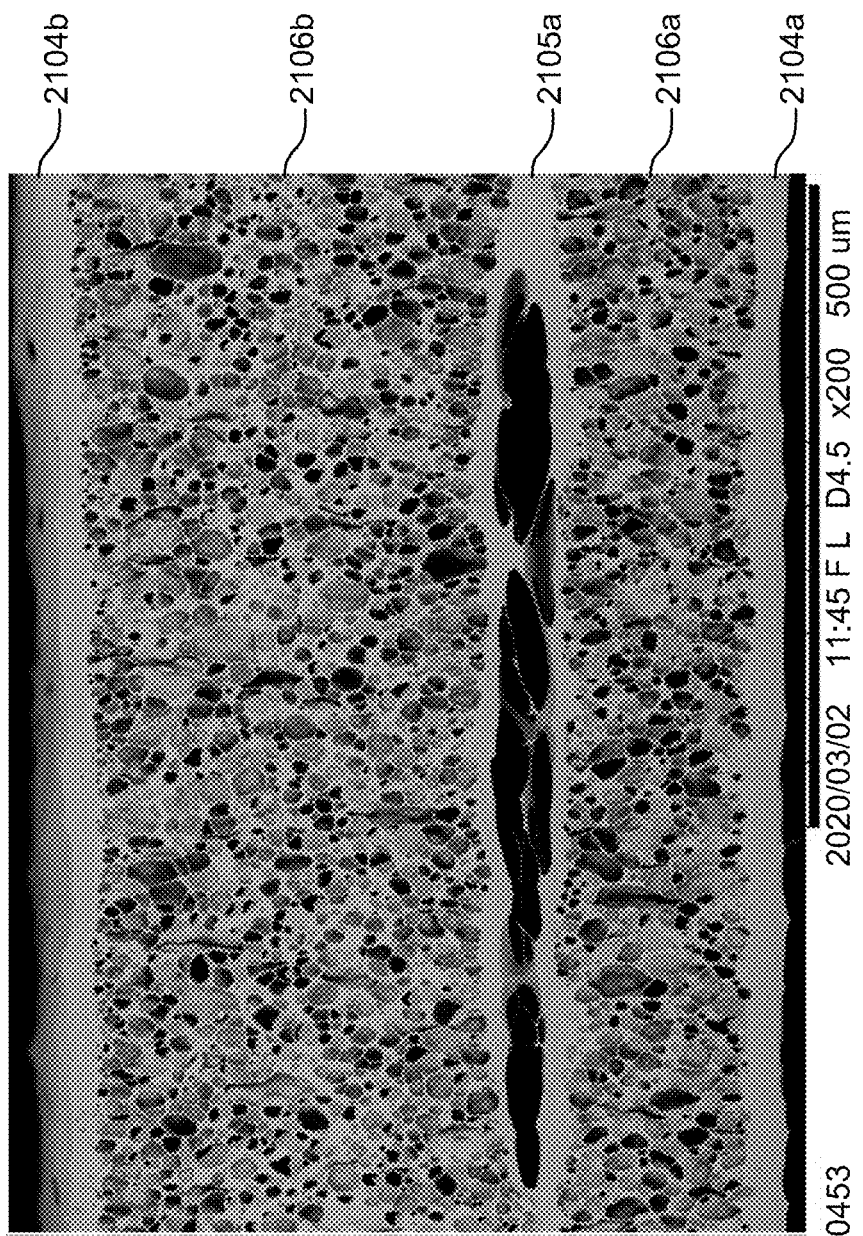
FIG. 21 is a scanning electron micrograph image of the cross-section of a multilayered supported elastomeric foam of Example 4 comprising three reinforcement regions with each reinforcement region separated by a foamed region.

FIG. 21 is a scanning electron micrograph image of the cross-section of a multilayered supported elastomeric foam of Example 4 comprising three reinforcement regions with each reinforcement region separated by a foamed region. The multilayered supported elastomeric foam comprises a first outer reinforcement region 2104*a* formed of perfluoropolyether elastomer imbibed ePTFE, first outer foamed region 2106*a* comprising perfluoropolyether elastomer defining a plurality of gas filled cells and first inner reinforcement region 2105*a* formed of ePTFE partially imbibed with perfluoropolyether elastomer from both first and second outer foamed regions 2106*a, b*. The multilayered supported elastomeric foam further comprises second outer foamed region 2106*b* comprising perfluoropolyether elastomer defining a plurality of gas filled cells and second outer reinforcement region 2104*b* formed of perfluoropolyether elastomer imbibed ePTFE. The partial imbibing of the ePTFE layer of the first inner reinforcement region 2105*a* with perfluoropolyether elastomer provides some compression resistance to the foam. As the degree to which the inner ePTFE layer is imbibed with elastomer is increased, the compression resistance of the multilayered supported elastomeric foam is increased. The tensile strength of the overall composite sealant in the plane of the reinforcement regions is greatly increased by the addition of a first inner reinforcement region. This is because the contribution to the tensile strength of the overall composite sealant is dominated by the reinforcement regions. For example, increasing the number of (identical) reinforcement regions from 2 to 3 would provide an approximately 50% increase in tensile strength. When slight compression is applied, any remaining porosity as a result of incomplete imbibing would be compressed and a tight seal would still be maintained.

Example 5

A multilayered supported elastomeric foam was constructed using 2 ePTFE porous layers and woven polyether ether ketone (PEEK) fiber fabric porous layer. A woven polyether ether ketone (PEEK) fiber fabric (woven mesh size 356×356 from McMaster-Carr) which is to form the inner reinforcement region was imbibed with a perfluoropolyether elastomer, SIFEL 2618 (Shin-Etsu Chemical Co., Ltd., Tokyo, JP). After imbibing the elastomer into the woven PEEK fiber layer, the excess elastomer was removed from the woven layer surfaces with a squeegee. The imbibed woven PEEK fiber layer was then cured in an oven at 110° C. for 10 minutes. An ePTFE porous layer with a thickness of 0.104 mm and a density of 0.04 g/cm³ was used to form one of the outer reinforcement regions supporting the foamed region. A perfluoropolyether elastomer, SIFEL 2661 (Shin-Etsu Chemical Co., Ltd., Tokyo, JP) was selected as the elastomer and mixed with EXPANCEL 920 DU 20 expanding polymer spheres (Expancel, Sundsvall, Sweden) as the foaming agent, in a 7:1 mixing ratio by mass. The mixture was imbibed into the ePTFE porous layer and coated with a tool gap of 0.2 mm. The imbibed PEEK fiber woven was placed on the wet elastomer mixture on the surface of the imbibed ePTFE porous layer. This composite was placed in an oven at 150° C. for 10 minutes to activate the foaming agent and at least partially cure the elastomer. The same mixture of elastomer and foaming agent was then imbibed into a second ePTFE porous layer having a thickness of 0.104 mm and a density of 0.04 g/cm$^3$ and coated with a tool gap of 0.2 mm. The coated porous ePTFE layer was placed upside down on the ePTFE elastomer foam PEEK composite so that the wet elastomer mixture was in contact with the imbibed PEEK woven fiber face. This composite was placed in an oven at 150° C. for 10 minutes to activate the foaming agent and at least partially cure the elastomer. The density, initial thickness and strain and thickness at both 3 MPa and 10 MPa of the multilayered foam were measured and are shown in Table 1 below.

Figure 22:
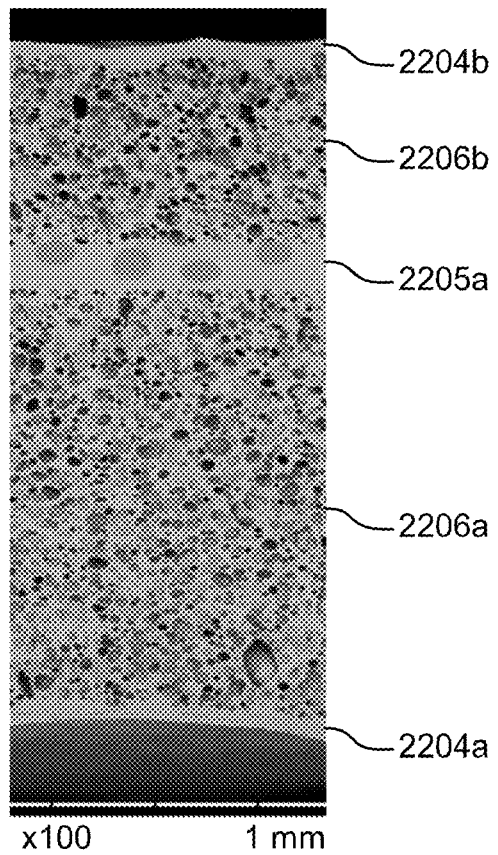
FIG. 22 is a scanning electron micrograph image of the cross-section of a multilayered supported elastomeric foam of Example 5 comprising three reinforcement regions with each reinforcement region separated by a foamed region in which the inner reinforcement region is made of a different material to the two outer reinforcement regions and functions as a stiffening region.

FIG. 22 is a scanning electron micrograph image of the cross-section of a multilayered supported elastomeric foam of Example 5 comprising three reinforcement regions with each reinforcement region separated by a foamed region in which the inner reinforcement region is made of a different material to the two outer reinforcement regions and functions as a stiffening region. The multilayered supported elastomeric foam comprises a first outer reinforcement region 2204a formed of perfluoropolyether elastomer imbibed ePTFE, first outer foamed region 2206a comprising foamed perfluoropolyether elastomer and first inner reinforcement region 2205a formed of a woven PEEK fiber fabric (woven mesh size 356×356 from McMaster-Carr) imbibed with a different perfluoropolyether elastomer to that of the first and second outer foamed regions 2206a, b. The multilayered supported elastomeric foam further comprises second outer foamed region 2206b comprising foamed perfluoropolyether elastomer and second outer reinforcement region 2204b formed of perfluoropolyether elastomer imbibed ePTFE. The inner porous PEEK fiber woven is much thicker than outer porous ePTFE layers. The imbibing of the perfluoropolyether elastomer into the porous PEEK fiber woven preserves the seal integrity even though a porous woven material is used as the stiffening region and provides a similar functional benefit to that achieved in Example 3 in shifting the compression behavior of the multilayered supported elastomeric foam. These differences can be seen in Table 1 below, in which the thickness at both 3 and 10 MPa for the multilayered supported elastomeric foams of Examples 3 and 5 is much greater than that of Example 4.

Example 6

A supported elastomeric foam was constructed using an ePTFE fiber 2×2 twill woven twisted ePTFE fiber sample with nominal 440dTex (400 denier) ePTFE filament commercially available from W. L. Gore & Associates part #V112450 twisted at 315 twists per meter (8 twists per inch) in the z-direction woven in a 2×2 Twill pattern at 26 picks per cm by 26 ends per cm (66 picks per inch by 66 ends per inch). That ePTFE woven porous layer was imbibed using a perfluoropolyether elastomer, SIFEL 2618 (Shin-Etsu Chemical Co., Ltd., Tokyo, JP). After imbibing this elastomer into the woven layer, the excess elastomer was squeegeed off of the imbibed layer surfaces. This imbibed layer was then put into the oven at 150° C. for 10 min. After that step, the supported elastomeric foam was constructed using an ePTFE porous layer with a thickness of 0.104 mm and a density of 0.04 g/cm$^3$ to form the other outer reinforcement region supporting the foamed region. A perfluoropolyether elastomer, SIFEL 2661 (Shin-Etsu Chemical Co., Ltd., Tokyo, JP) was selected as the elastomer and mixed with EXPANCEL 920 DU 20 expanding polymer spheres (Expancel, Sundsvall, Sweden) as the foaming agent, in a 9:1 mixing ratio by mass. The mixture was imbibed into the ePTFE porous layer and coated with a tool gap of 0.2 mm. After this mixture imbibed into the ePTFE support, the previously imbibed ePTFE woven layer described above was laid on top of the foam that had already been coated. This layer was then left to imbibe before putting the entire multilayered structure in the oven at 150° C. for 10 min. The density, initial thickness and strain and thickness at both 3 MPa and 10 MPa of the multilayered foam were measured and are shown in Table 1 below.

Figure 23:
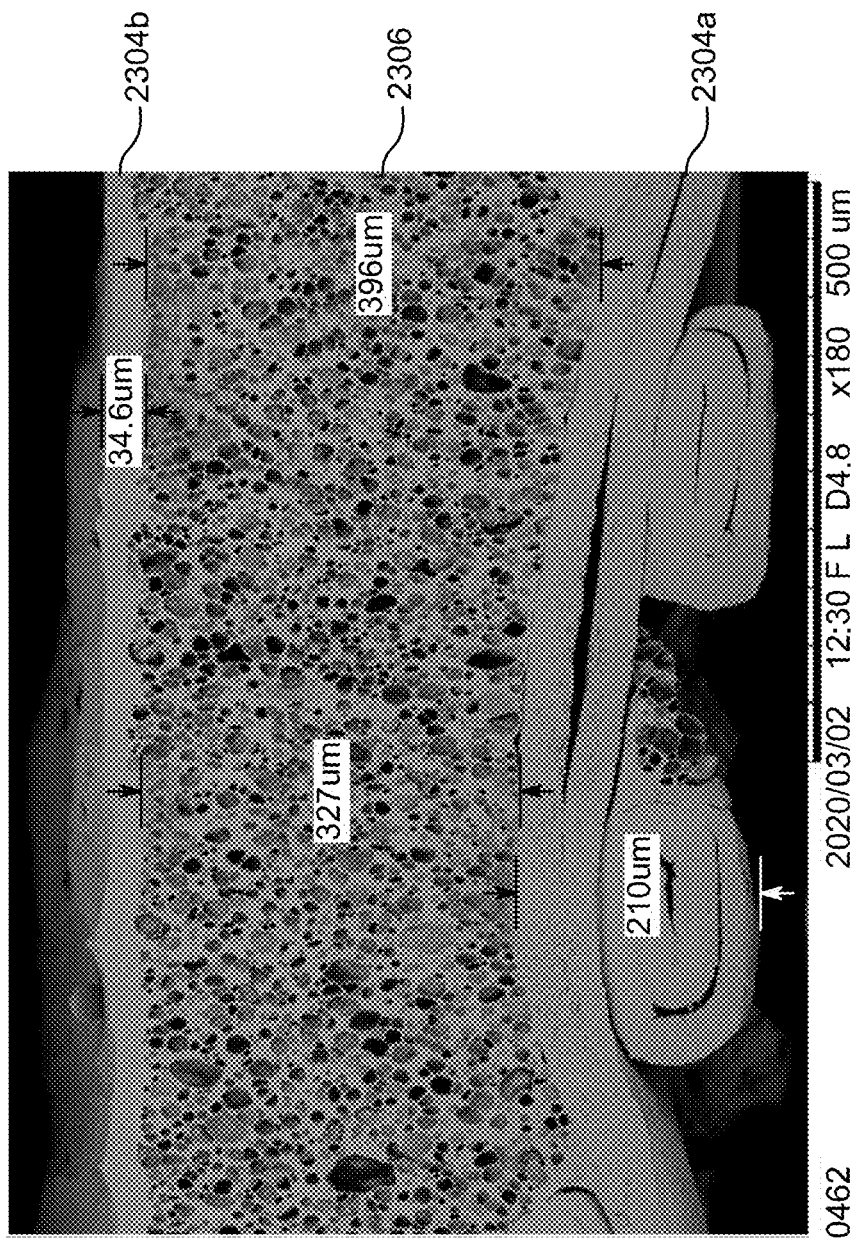
FIG. 23 is a scanning electron micrograph image of the cross-section of a supported elastomeric foam of Example 6 comprising a single elastomeric matrix in which the two outer reinforcement regions are made of different materials.

FIG. 23 is a scanning electron micrograph image of the cross-section of a supported elastomeric foam of Example 6 comprising a single elastomeric matrix in which the two outer reinforcement regions are made of different materials. The elastomeric matrix comprises first outer reinforcement region 2304a formed of perfluoropolyether elastomer imbibed ePTFE, first outer foamed region 2306 comprising foamed perfluoropolyether elastomer and second outer reinforcement region 2304b comprising perfluoropolyether elastomer imbibed woven ePTFE. Such a woven ePTFE fabric provides abrasion resistance to an outer surface of the multilayered supported elastomeric foam.

Example 7

A supported elastomeric foam was constructed using an ePTFE porous layer and a woven PEEK fiber fabric porous support. A woven polyether ether ketone (PEEK) fiber fabric (woven mesh size 356×356 from McMaster-Carr) which is to form a reinforcement region was imbibed with a perfluoropolyether elastomer, SIFEL 2618 (Shin-Etsu Chemical Co., Ltd., Tokyo, JP). After imbibing the elastomer into the woven PEEK fiber layer, the excess elastomer was removed from the woven layer surfaces with a squeegee. The imbibed woven PEEK fiber layer was then cured in an oven at 110° C. for 10 minutes. An ePTFE porous layer with a thickness of 0.008 mm and a density of 0.18 g/cm$^3$ was used to form another reinforcement region supporting the foamed region. A perfluoropolyether elastomer, SIFEL 2661 (Shin-Etsu Chemical Co., Ltd., Tokyo, JP) was selected as the elastomer and mixed with EXPANCEL 920 DU 20 expanding polymer spheres (Expancel, Sundsvall, Sweden) as the foaming agent, in a 9:1 mixing ratio by mass. The elastomer mixture was imbibed into the ePTFE porous layer and coated with a tool gap of 0.2 mm. The imbibed PEEK fiber woven was placed on the wet elastomer mixture on the surface of the imbibed ePTFE porous layer. This composite was placed in an oven at 150° C. for 10 minutes to activate the foaming agent and at least partially cure the elastomer. The density, initial thickness and strain and thickness at both 3 MPa and 10 MPa of the supported elastomeric foam were measured and are shown in Table 1 below.

Example 7 provides a further example of a supported elastomeric foam comprising a single elastomeric matrix in which the two outer reinforcement regions are made of different materials. Such a structure in shown in FIG. 13. The elastomeric matrix 1318 comprises a first outer reinforcement region 1304a formed of perfluoropolyether elastomer imbibed ePTFE, a first outer foamed region 1306 comprising foamed perfluoropolyether elastomer and a second outer reinforcement region 1304*b* comprising perfluoropolyether elastomer imbibed woven PEEK fiber.

Example 8

A supported elastomeric foam was constructed using an ePTFE porous layer with a thickness of 0.104 mm and a density of 0.04 g/cm$^3$ to form one of the reinforcement regions supporting the foamed region. A perfluoropolyether elastomer, SIFEL 2661 (Shin-Etsu Chemical Co., Ltd., Tokyo, JP) was selected as the elastomer and mixed with EXPANCEL 920 DU 20 expanding polymer spheres (Expancel, Sundsvall, Sweden) as the foaming agent, in a 9:1 mixing ratio by mass. The mixture was imbibed into the ePTFE porous layer and coated with a tool gap of 0.2 mm. After this mixture imbibed into the ePTFE layer, a biaxially oriented polypropylene (BOPP) film (Winter-Wolff International) of thickness 5.8 micrometers was laid on top of the foam that had already been coated. The entire stack was then heated in an oven at 150° C. for 10 min. The density, initial thickness and strain and thickness at both 3 MPa and 10 MPa of the supported elastomeric foam were measured and are shown in Table 1 below.

Figure 24:
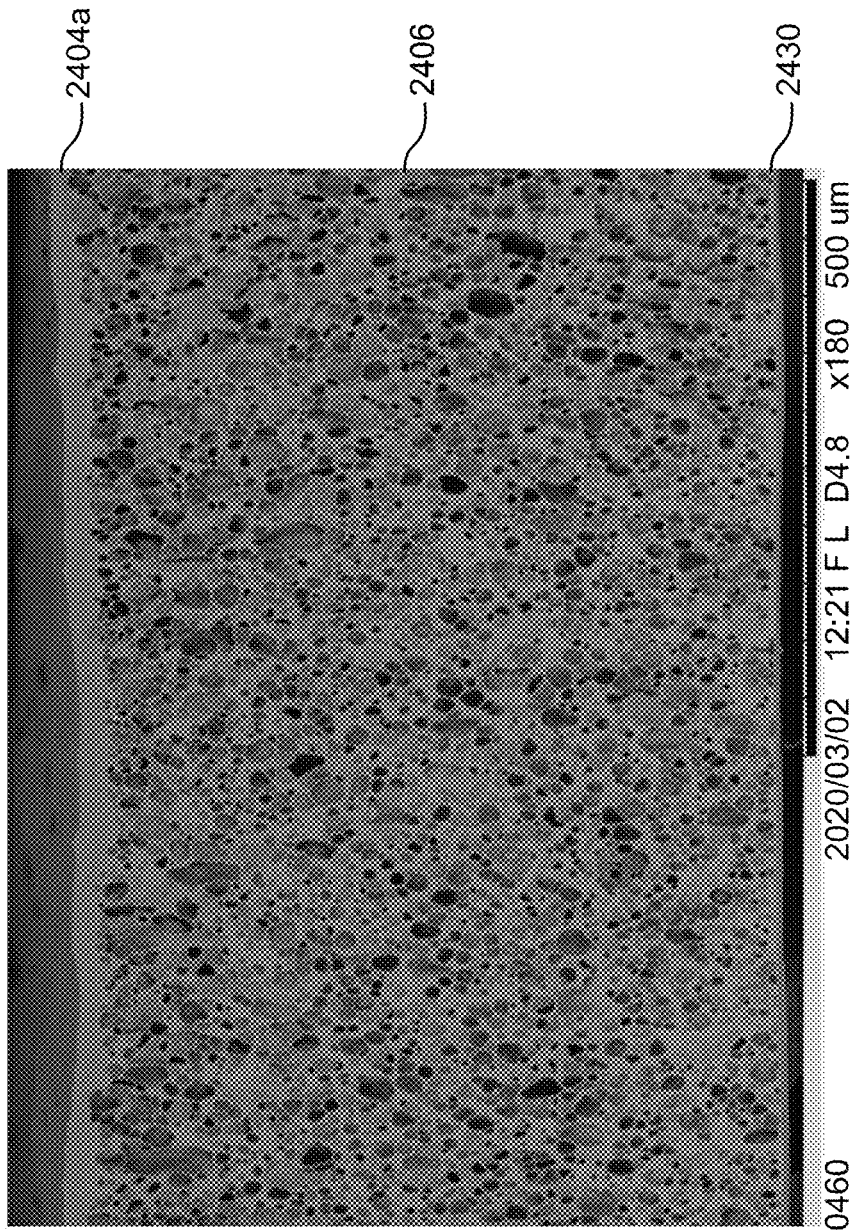
FIG. 24 is a scanning electron micrograph image of the cross-section of a supported elastomeric foam of Example 8 comprising a reinforcement region and a non-porous surface region on either side of a foamed region.

FIG. 24 is a scanning electron micrograph image of the cross-section of a supported elastomeric foam of Example 8 comprising a reinforcement region and a non-porous surface region on either side of a foamed region. The supported elastomeric foam comprises a first outer reinforcement region formed of perfluoropolyether elastomer imbibed ePTFE 2404*a*, a first outer foamed region comprising foamed perfluoropolyether elastomer 2406 and a first surface region comprising a BOPP film 2430. Such a dense BOPP film provides a low friction outer surface of the supported elastomeric foam. When applied to an adjacent mating surface which is in direct contact with the BOPP film, the supported elastomeric foam and mating surface would be more easily separated, allowing perioding servicing and inspection.

Example 9

A supported elastomeric foam was constructed using an elastomeric matrix described earlier. One face of the outer reinforcement region of the elastomeric matrix, which comprises an ePTFE porous layer imbibed with elastomer, was coated with a perfluoropolyether elastomer, SIFEL 2618 (Shin-Etsu Chemical Co., Ltd., Tokyo, JP) in a thin layer. This liquid elastomer will serve as an adhesive region. Once coated, one face of a BOPP film (Winter-Wolff International) of thickness 5.8 micrometers was laid on top of the liquid elastomer coating. This sandwich was then heat treated at 110° C. for 10 minutes to cure the elastomer adhesive region. The density, initial thickness and strain and thickness at both 3 MPa and 10 MPa of the multilayered foam were measured and are shown in Table 1 below.

The supported elastomeric foam of Example 9 has a structure shown FIG. 14. The elastomeric matrix 1418 comprises a first outer reinforcement region 1404*a* formed of perfluoropolyether elastomer imbibed ePTFE, a first outer foamed region 1406 comprising foamed perfluoropolyether elastomer and a second outer reinforcement region 1404*b* comprising perfluoropolyether elastomer imbibed ePTFE. An adhesive region 1408 of perfluoropolyether elastomer bonds the second outer reinforcement region 1404*b* to the surface region 1430 comprising a non-porous BOPP film.

Discussion

The density, initial thickness and strain and thickness at both 3 MPa and 10 MPa of the foams of Examples 1-9 and the Comparative Example were measured and are shown in Table 1 below.

TABLE 1

| Foam | Density (g/cm3) | Initial Thickness (mm) | 3 MPa-Strain (%) | 3 MPa Thickness (mm) | 10 MPa-Strain (%) | 10MPa-Thickness (mm) |
|---|---|---|---|---|---|---|
| Example 1 | 0.644 | 0.5017 | 55.9 | 0.221 | 64.9 | 0.1761 |
| Example 2 | 0.703 | 1.1845 | 42.8 | 0.6779 | 51.4 | 0.5761 |
| Example 3 | 1.198 | 0.9226 | 48 | 0.4795 | 53.9 | 0.4256 |
| Example 4 | 0.654 | 0.5555 | 54.2 | 0.2543 | 65.3 | 0.193 |
| Example 5 | 0.683 | 1.3634 | 56.6 | 0.5923 | 66.2 | 0.461 |
| Example 6 | 0.927 | 0.7278 | 45.4 | 0.3976 | 52.9 | 0.3425 |
| Example 7 | 0.664 | 0.8651 | 57.6 | 0.3666 | 64.6 | 0.3062 |
| Example 8 | 0.654 | 0.6415 | 57.4 | 0.2735 | 64.7 | 0.2264 |
| Example 9 | 0.667 | 0.2421 | 54.8 | 0.1094 | 63.2 | 0.089 |
| Comparative Example | 0.633 | 0.7774 | 62.1 | 0.2948 | 68.9 | 0.2418 |

The multilayered supported elastomeric foam of Example 1 is formed from two elastomeric matrices bonded by an adhesive region of perfluoropolyether elastomer with an initial thickness of 0.5017 mm. The multilayered supported elastomeric foam of Example 2 contains four such matrices with each pair of adjacent matrices bonded by an adhesive region of adhesive tape with an initial thickness of 1.1845 mm. Thus, interfaces of a given thickness can be sealed by selecting number of elastomeric matrices to provide a desired initial thickness. Furthermore, in the foam of Example 1, the thickness at 3 MPa is 44% of the initial thickness. This is further reduced to 35% of the initial thickness at 10 MPa. In the foam of Example 2, the thickness at 3 MPa is 57% of the initial thickness. This is further reduced to 49% of the initial thickness at 10 MPa. Thus, the selection of the type of adhesive region and the number of elastomeric matrices comprising reinforcement regions can provide different compression characteristics to the multilayered foam, allowing the selection of the compressed thickness at which the multilayered supported elastomeric foam becomes increasingly resistant to further compression to provide load protection to the interface.

The Comparative Example has a thickness at 3 MPa of 38% of the initial thickness, whilst at 10 MPa it is 31% of the initial thickness. The elastomeric matrix of the Comparative Example is made with one foam region instead of two and so is able to compress more than the multilayered supported elastomeric foam of Example 1. The multilayered supported elastomeric foam of Example 3 is formed of two elastomeric matrices bonded by two adhesive regions of perfluoropolyether elastomer with an intervening titanium sheet metal stiffening region. The stiffening region provides increased resistance to compression. The thickness at 3 MPa is 52% of the initial thickness, whilst at 10 MPa it is 46% of the initial thickness. The multilayered supported elastomeric foam of Example 1 also contains two foam regions in a similar manner to that of Example 3, but does not contain a stiffening region. The foam of Example 3 is therefore not as compressible as Example 1.

Figure 20:
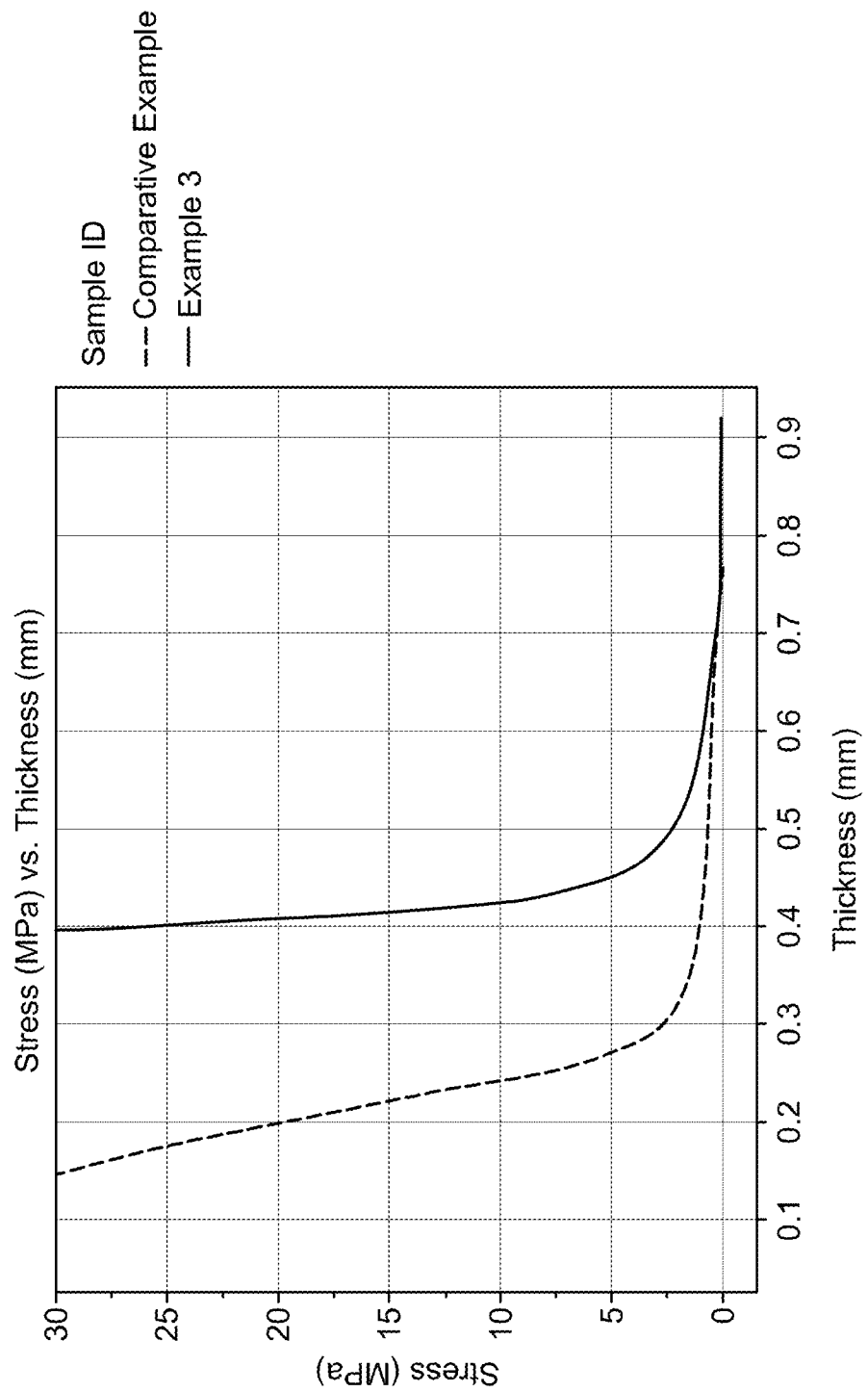
FIG. 20 is a graph of stress versus thickness for the multilayered supported elastomeric foam of Example 3 and the Comparative Example.

FIG. 20 shows plots of stress versus thickness for the multilayered supported elastomeric foam of Example 3 and the Comparative Example. It is apparent that the introduction of a stiffening layer between the two elastomeric matrices in Example 3 can move the point at which the gradient of the stress versus thickness significantly increases (which can be seen as the region of abrupt change in the gradient of the curve), also known as the compression knee, from about 0.25 to 0.30 mm for the foam of the Comparative Example to about 0.43 to 0.48 mm for the foam of Example 3. The compression knee represents that point at which the foam becomes significantly stiffer in compression. A similar effect can be seen in the change in slope of a curve of stress versus strain indicative of the compressive modulus. FIG. 20 shows that the multilayered supported elastomeric foams described herein allow the compression knee to be adjusted to a desired value without sacrificing the initial thickness reduction of the foam at low stress so that it may function as a sealant. The stiffening point of the multilayered supported elastomeric foam of the invention under compression can therefore be tuned to a larger thickness if the gap in the joint to be sealed is large, and the load retention improved.

The multilayered supported elastomeric foam of Example 4 comprises three reinforcement regions, with each pair of adjacent reinforcement regions separated by a foamed region. The elastomer forming each foamed region is also imbibed into the two contacting reinforcement regions such that an integral structure is formed without the need for intervening adhesive regions. The foam of Example 4 exhibits significantly higher tensile strengths in the plane of the reinforcement regions because the tensile strength of the foam is improved by the porous layers forming the reinforcement regions rather than the elastomer or foaming agent.

The multilayered supported elastomeric foam of Example 5 comprises three reinforcement regions, with each pair of adjacent reinforcement regions separated by a foamed region. The elastomer forming each foamed region is also imbibed into the two contacting reinforcement regions such that an integral structure is formed without the need for intervening adhesive regions. The inner reinforcement region is formed of a plain woven PEEK fiber fabric, which is fully imbibed with elastomer from the two foamed regions with which it is in contact. The multilayered supported elastomeric foam of Example 5 has thickness at 3 MPa which is 43% of the initial thickness, whilst at 10 MPa it is 34% of the initial thickness. Thus, the fully imbibed woven PEEK fiber fabric alters the compression behavior of the multilayered supported elastomeric foam. In Example 1, the thickness of the middle adhesive layer also impacts the compression behavior. A comparison of the SEM of Example 1 shown in FIG. 17 and that of Example 5 shown in FIG. 22, the difference in % thickness of the adhesive in Example 1 which is relatively high and the % thickness of the imbibed PEEK fiber fabric which is relatively low is apparent. This means that the imbibed PEEK fiber fabric is having a stiffening impact on the composite as is evident from the similarity between the % of initial thickness at 3 MPa and 10 MPa for Examples 1 and 5.

The supported elastomeric foam of Example 6 comprises a single elastomeric matrix in which the two outer reinforcement regions are made of different materials. The elastomeric matrix comprises a first outer reinforcement region comprising perfluoropolyether elastomer imbibed ePTFE and a second outer reinforcement region comprising perfluoropolyether elastomer imbibed woven ePTFE separated by a first outer foamed region 2306 comprising foamed perfluoropolyether elastomer. The supported elastomeric foam of Example 6 has thickness at 3 MPa which is 55% of the initial thickness, whilst at 10 MPa it is 47% of the initial thickness. The imbibed woven ePTFE reinforcement region provides an abrasion resistant outer surface, allowing the supported elastomeric foam to be used as a seal in more aggressive environments.

The supported elastomeric foam of Example 7 comprises a single elastomeric foam matrix in which the two outer reinforcement regions are made of different materials. The elastomeric matrix comprises a first outer reinforcement region formed of perfluoropolyether elastomer imbibed ePTFE, a second outer reinforcement region comprising perfluoropolyether elastomer imbibed woven PEEK fiber separated by a first outer foamed region comprising foamed perfluoropolyether elastomer. The supported elastomeric foam of Example 7 has thickness at 3 MPa which is 42% of the initial thickness, whilst at 10 MPa it is 35% of the initial thickness. The imbibed PEEK fiber woven porous layer provides good chemical resistance and thermal properties.

The supported elastomeric foam of Example 8 comprises a reinforcement region and a non-porous surface region on either side of a foamed region. The supported elastomeric foam comprises a first outer reinforcement region formed of perfluoropolyether elastomer imbibed ePTFE and a first surface region comprising a BOPP film separated by a first outer foamed region comprising foamed perfluoropolyether elastomer. The supported elastomeric foam of Example 8 has thickness at 3 MPa which is 43% of the initial thickness, whilst at 10 MPa it is 35% of the initial thickness. These reductions in thickness under compression are comparable to the multilayered supported elastomeric foam of Example 1 which contains two elastomeric matrices, but has a smaller initial thickness and Example 7, which contains a single elastomeric matrix but has woven PEEK fiber rather than a BOPP film. It is apparent that an outer reinforcement region comprising a BOPP film provides a similar reinforcement effect (in terms of reduction in thickness under compression) to that of two elastomeric matrices, or a single matrix with elastomer imbibed ePTFE and woven PEEK fiber reinforcement regions, but with an initial thickness between that of the foams of Examples 1 and 7. The BOPP film forming the first surface region provides a low friction surface which exhibits a low surface adhesion, enabling the supported elastomeric foam to be more easily removed from its mating surface when forming a seal, allowing servicing and inspection.

The supported elastomeric foam of Example 9 comprises an elastomeric matrix bonded to a non-porous surface region by an adhesive region. The elastomeric matrix comprises a first outer reinforcement region formed of perfluoropolyether elastomer imbibed ePTFE and a second outer reinforcement region formed of perfluoropolyether elastomer imbibed ePTFE separated by a foamed region. A first surface region comprising a BOPP film is bonded to one of the outer reinforcement regions by an adhesive region comprising a layer of the perfluoropolyether elastomer. The supported elastomeric foam of Example 9 has thickness at 3 MPa which is 38% of the initial thickness, whilst at 10 MPa it is 31% of the initial thickness. The BOPP film forming the first surface region provides a low friction surface which exhibits a low surface adhesion, enabling the supported elastomeric foam to be more easily removed from its mating surface when forming a seal, allowing servicing and inspection.

Example 10

A multilayered supported elastomeric foam for the protection of an electronic component was constructed. The construction process is shown in FIGS. 25a-d. Two metal plates were provided and coated with primer. Two through-holes for fastening means were precision drilled by laser (BlueRing Stencils, Lumerton NJ) in each metal plate to provide first and second (lower and upper) base plates 2562a, b. Two fastening means, in this case stud and collar fasteners, were provided and the shafts 2544a, b, of each stud were inserted through the holes in the first base plate 2562a. Two elastomeric matrices as described earlier were prepared. Two though-holes for fastening means were precision cut in each elastomeric matrix to provide first and second elastomeric matrices 2518a, b.

Two 0.51 mm (0.02") thick stainless steel plates were provided. Two through-holes for the fastening means and a parabolic shaped region were precision cut by laser (BlueRing Stencils, Lumerton NJ) to provide two stiffening regions 2540a, b. The through-holes of the first and second stiffening regions 2540a, b were aligned with the shafts 2544a, b of the stud fasteners and inserted such that the first stiffening region 2540a was in contact with the first elastomeric matrix 2518a. The second stiffening region 2540b was in contact with the first stiffening region 2540b. An electronic component, in this case a force sensing resistor 2554 (FSR 400, Interlink Electronics and purchased from Sparkfun), with a nominal thickness of 0.35 mm was placed in the parabolic shaped region excised from the first and second stiffening regions 2540a, b with the connections exiting the multilayered structure through the exposed excised portion to provide the configuration shown in FIG. 25b.

Figure 25A:
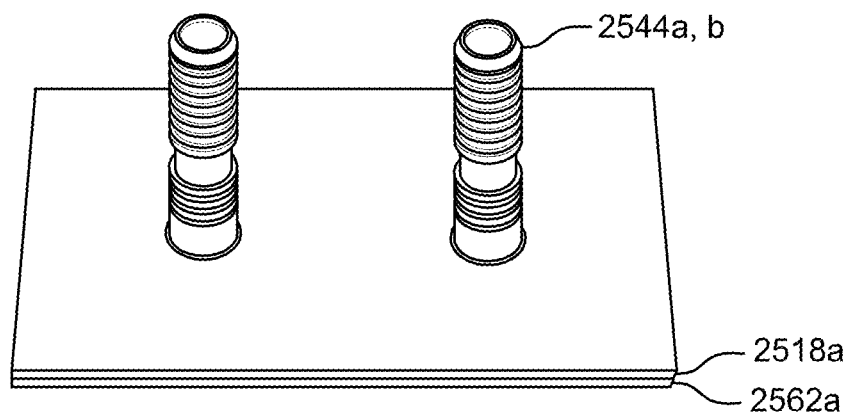
FIGS. 25a-d are top-down views of the sequential construction of an embodiment of multi-layered supported elastomeric foam with a compression knee or compression stop for the protection of an electronic component.
Figure 25B:
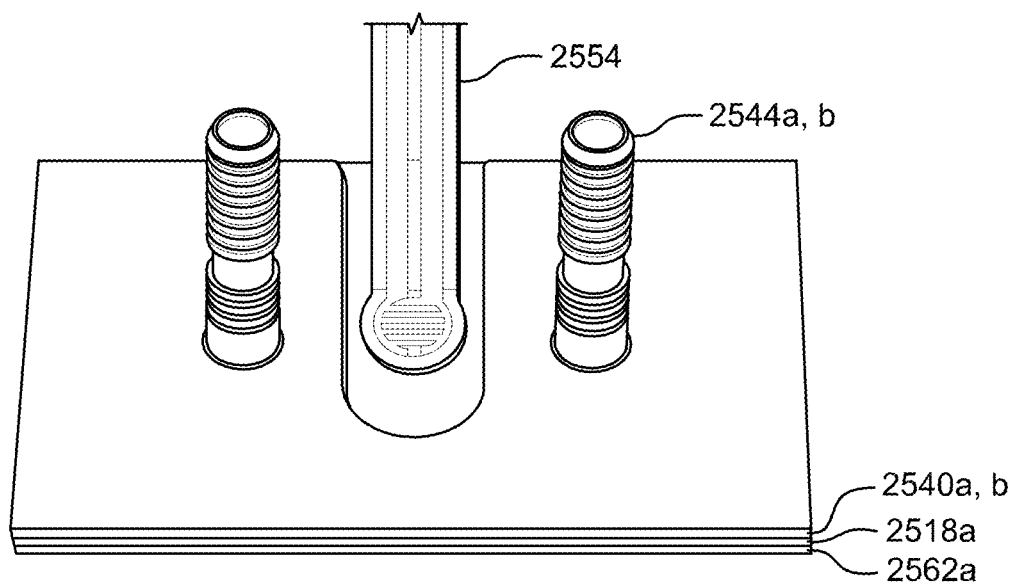
Figure 25C:
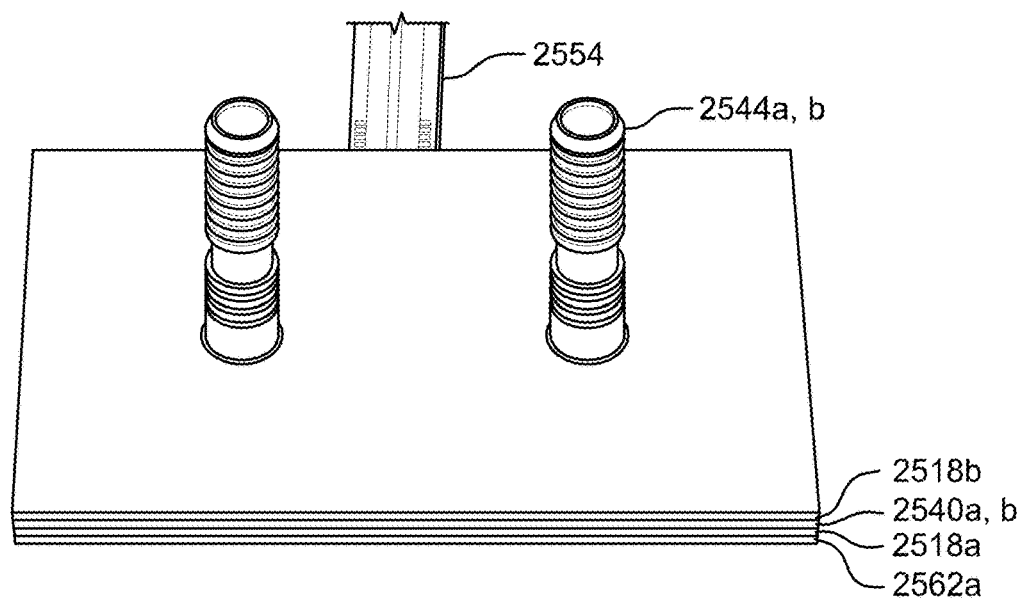
Figure 25D:
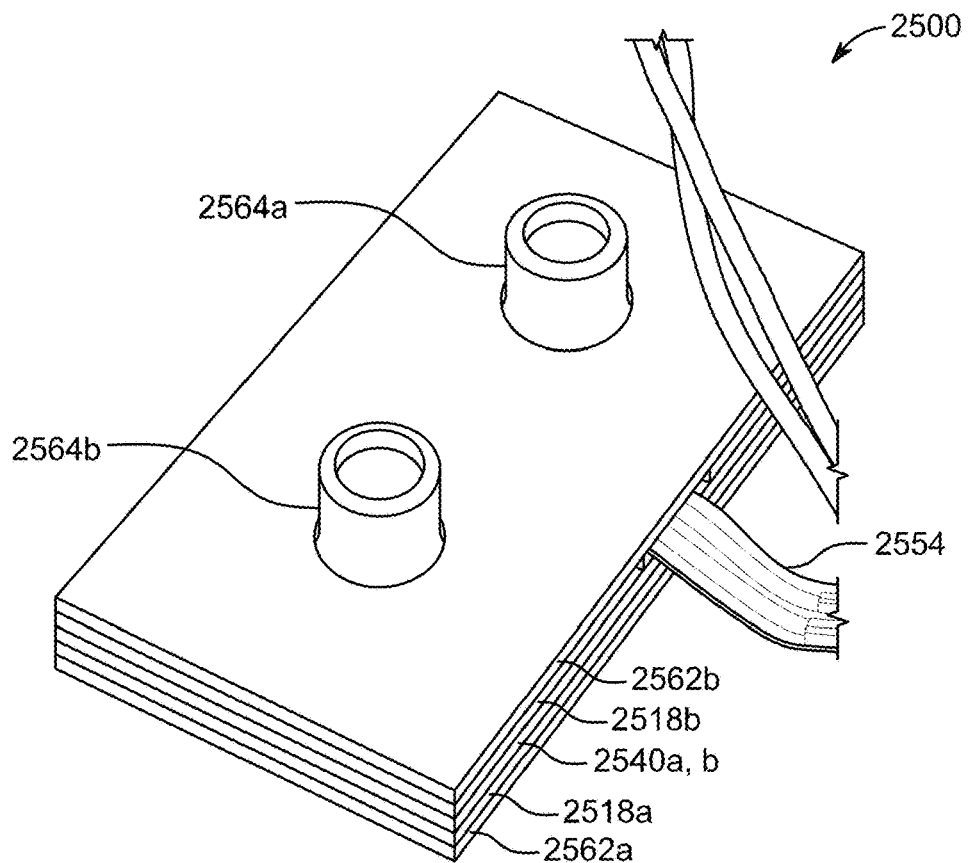

The two through-holes of the second elastomeric matrix 2518b were aligned with the shafts 2544a, b of the stud fasteners and threaded on such that the second elastomeric matrix 2518b was in contact with the second stiffening region 2540b as shown in FIG. 25c. Next, the two through-holes of the second base plate 2562b were aligned with the shafts 2544a, b of the stud fasteners and threaded on such that the second base plate 2562b was in contact with the second elastomeric matrix 2518b. The collars 2564a, b were then placed onto the shafts 2544a, b of the stud fasteners and tightened to attach all the layers and provide a multilayered supported elastomeric foam 2500 as shown in FIG. 25d. FIG. 25d further shows two wires which extend from force sensing resistor 2554.

The force sensing resistor 2554 showed no measurable change in resistance even when a load in excess of 1814 kg (4000 lbs) was applied to compress the first and second base plates 2518a, b together. This shows that the first and second stiffening regions protected the resistor from compression.

A multilayered supported elastomeric foam for the protection of an electronic component can also be provided in which the electronic component is completely encapsulated within the multilayered supported elastomeric foam. In this case one or more stiffening regions, rather than having a parabolic shaped or other region for housing the electronic component which is continuous with an external edge of the one or more stiffening regions, has a region for housing the electronic component situated entirely within the external perimeter of the one or more stiffening regions. The electronic component would therefore be protected from the external environment by the surrounding multilayered supported elastomeric foam. Such an electronic component could be powered wirelessly, for instance by near field inductive or capacitive coupling. In one embodiment, the electronic component could be a sensor for the detection of a liquid. When such a sensor is wirelessly powered, it could transmit a signal indicating whether a liquid had been detected, reporting when the multilayered elastomeric foam had been damaged to allow liquid ingress to the sensor.

As used herein and in the appended claims, the singular forms "a", "an", and "the" include plural references unless the context clearly dictates otherwise. Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

While the following is amenable to various modifications and alternative forms, specific embodiments have been shown by way of non-limiting examples in the drawings and are described in detail below. The description covers all modifications, equivalents, and alternatives thereof.

What is claimed is:

1. A supported elastomeric foam comprising:
an elastomeric matrix comprising an elastomer, and comprising:
a first foamed region comprising a plurality of gas filled cells defined by the elastomer, the first foamed region having first and second sides positioned opposite one another;
a first reinforcement region comprising a first porous layer having an interconnected network of pores at least partially imbibed with the elastomer on the first side of the first foamed region;
a first surface region oriented on the second side of the first foamed region, wherein the first surface region is a non-porous surface layer; and
one or more stiffening regions positioned adjacent to the first reinforcement region; and
said supported elastomeric foam further comprising:
a second foamed region, the second foamed region comprising a plurality of gas filled cells defined by the elastomer, the second foamed region having first and second sides positioned opposite one another;
a second reinforcement region comprising a second porous layer having an interconnected network of pores at least partially imbibed with the elastomer on the second side of the second foamed region;
wherein said first and second foamed regions are separated by the first reinforcement region, the one or more stiffening regions, and the second reinforcement region;
wherein the one or more stiffening regions are located between first reinforcement region and the second reinforcement region;

wherein the first and second porous layers independently comprise one of a woven material, a fibrous material or a porous film; and wherein the one or more stiffening regions is selected from a metal, a non-porous stiff polymer including modified tetrafluoroethylene polymers (TFM), and a porous stiff polymer including polyether ether ketone (PEEK).

2. The foam of claim 1 wherein the first surface region is in contact with the second side of the foamed region.

3. The foam of claim 1 wherein the non-porous surface layer is densified ePTFE or BOPP.

4. The foam of claim 1 further comprising an adhesive region between the first foamed region and the first surface region.

5. The foam of claim 1, wherein the foam further comprises a second surface layer oriented on the first side of the second foamed region.

6. The foam of claim 5, further comprising an adhesive region between the second foamed region and the second surface layer.

7. The foam of claim 1, wherein the first or second porous layer is fully imbibed with the elastomer.

8. The foam of claim 1, wherein the first or second reinforcement region is substantially free of gas filled cells.

9. The foam of claim 1, wherein the elastomer is a first elastomer and the foam further comprises a second elastomer, wherein the first and second elastomers are mixed together.

10. The foam of claim 1, wherein the woven material comprises a polyether ether ketone (PEEK) fiber woven or an expanded polytetrafluoroethylene (ePTFE) fiber woven, the fibrous material includes a fiberglass material, or the porous film, includes an expanded fluoropolymer film.

11. The foam of claim 1, wherein the first or second porous layer comprises an ePTFE film having a thickness from about 1 to 100 μm.

12. The foam of claim 1, wherein the elastomer comprises a silicone or a fluoroelastomer.

13. The foam of claim 1, wherein the first or second foamed region is independently formed from one of: a foamed mixture comprising the elastomer and a foaming agent, a chemical foaming agent added to the elastomer, or a foamed mixture comprising the elastomer and a heat activated dry foaming agent optionally comprising heat activated expanding polymer spheres.

14. The foam of claim 1, wherein at least one of said at least one reinforcement region has stiffening characteristics.

15. The foam of claim 1, further comprising one or more holes extending through at least one of the regions of the supported elastomeric foam.

16. The foam of claim 1, wherein the one or more stiffening regions comprise a material which exhibits a compression of less than 25% when placed under a stress of from 10 to 100 MPa.

* * * * *